US010004359B2

(12) United States Patent
Hoare et al.

(10) Patent No.: US 10,004,359 B2
(45) Date of Patent: Jun. 26, 2018

(54) BENCH MIXER

(71) Applicant: BREVILLE PTY LIMITED, Alexandria, New South Wales (AU)

(72) Inventors: Richard Hoare, Lane Cove (AU); Samuel Adeloju, Randwick (AU); Mark Thomas, Leichhardt (AU); Tristan Brega, Kyabram (AU); Ze Kang Lai, Glenfield (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 196 days.

(21) Appl. No.: 14/408,567

(22) PCT Filed: Jun. 21, 2013

(86) PCT No.: PCT/AU2013/000669
§ 371 (c)(1),
(2) Date: Dec. 17, 2014

(87) PCT Pub. No.: WO2013/188925
PCT Pub. Date: Dec. 27, 2013

(65) Prior Publication Data
US 2015/0150416 A1 Jun. 4, 2015

(30) Foreign Application Priority Data
Jun. 22, 2012 (AU) .............................. 2012902629

(51) Int. Cl.
*A47J 43/07* (2006.01)
*B01F 7/00* (2006.01)
(Continued)

(52) U.S. Cl.
CPC ....... *A47J 43/0711* (2013.01); *B01F 7/00208* (2013.01); *B01F 7/00583* (2013.01); *B01F 7/1615* (2013.01); *B01F 7/30* (2013.01)

(58) Field of Classification Search
CPC ................ A47J 43/0711; A47J 43/1087; A47J 43/1037; A47J 43/1043; B01F 7/00208;
(Continued)

(56) References Cited

U.S. PATENT DOCUMENTS

| 1,783,437 A | 12/1930 | Laib |
| 2,753,160 A | 7/1956 | Gunn, Sr. |

(Continued)

FOREIGN PATENT DOCUMENTS

| CN | 201959762 U | 9/2011 |
| DE | 12 34 955 B | 2/1967 |

(Continued)

OTHER PUBLICATIONS

International Search Report and Written Opinion for PCT/AU2013/000669, dated Sep. 18, 2013.
(Continued)

*Primary Examiner* — Walter D. Griffin
*Assistant Examiner* — Marc C Howell
(74) *Attorney, Agent, or Firm* — Marshall, Gerstein & Borun LLP

(57) ABSTRACT

A bench mixer has a combined whisk and scraper attachment. In preferred embodiments, the mixer has a processor configured to access data indicative of a respective power limit to be applied to a motor for each of a plurality of user selectable speed settings and monitors motor speed to compare against a user selected speed setting. The processor increases the power applied to the motor, up to a respective power limit if the current speed is lower than the user selected speed setting.

21 Claims, 49 Drawing Sheets

(51) Int. Cl.
  *B01F 7/16* (2006.01)
  *B01F 7/30* (2006.01)
(58) Field of Classification Search
  CPC ........ B01F 2015/00649; B01F 7/00583; B01F 7/1615; B01F 7/30
  USPC ............................. 366/344, 309, 312; 99/348
  See application file for complete search history.

(56) References Cited

U.S. PATENT DOCUMENTS

| | | | | |
|---|---|---|---|---|
| 3,243,165 | A | * | 3/1966 | De Woody .............. B01F 7/001 403/290 |
| 2004/0240313 | A1 | | 12/2004 | Fallowes |
| 2006/0171251 | A1 | | 8/2006 | Busick |
| 2007/0014187 | A1 | | 1/2007 | Kaas |
| 2007/0036028 | A1 | * | 2/2007 | Yoshioka ................ B01F 7/001 366/312 |
| 2012/0081993 | A1 | | 4/2012 | Annis et al. |
| 2013/0135964 | A1 | * | 5/2013 | Seidler ................ A47J 43/0711 366/343 |

FOREIGN PATENT DOCUMENTS

| | | |
|---|---|---|
| WO | WO-2007/011745 A2 | 1/2007 |
| WO | WO-2010/130826 A2 | 11/2010 |
| WO | WO 2011141690 A1 * 11/2011 | .......... A47J 43/0711 |

OTHER PUBLICATIONS

International Preliminary Report on Patentability for PCT/AU2013/000669, dated Dec. 23, 2014.
Examination Report for Australian Patent Application No. 2013277942, dated Sep. 26, 2017.
First Office Action for Chinese Patent Application No. 201380044146.X.
Second Office Action for Chinese Patent Application No. 201380044146.X.
Third Office Action for Chinese Patent Application No. 201380044146.X.
Extended European Search Report for European Patent Application No. 13806402.7, dated Apr. 12, 2016.
Decision of Final Rejection for Chinese Patent Application No. 201380044146.X, dated Sep. 30, 2017.

* cited by examiner

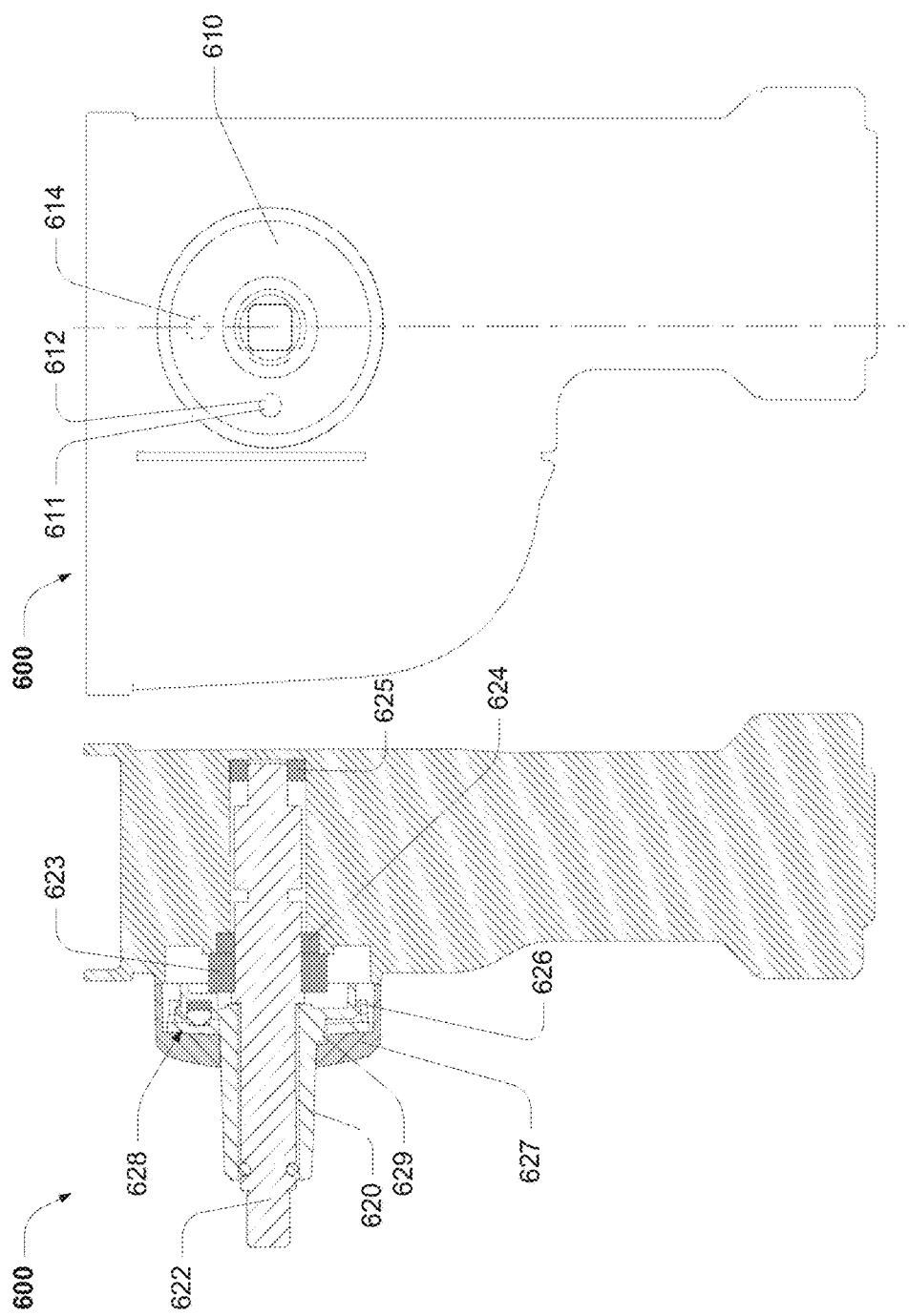

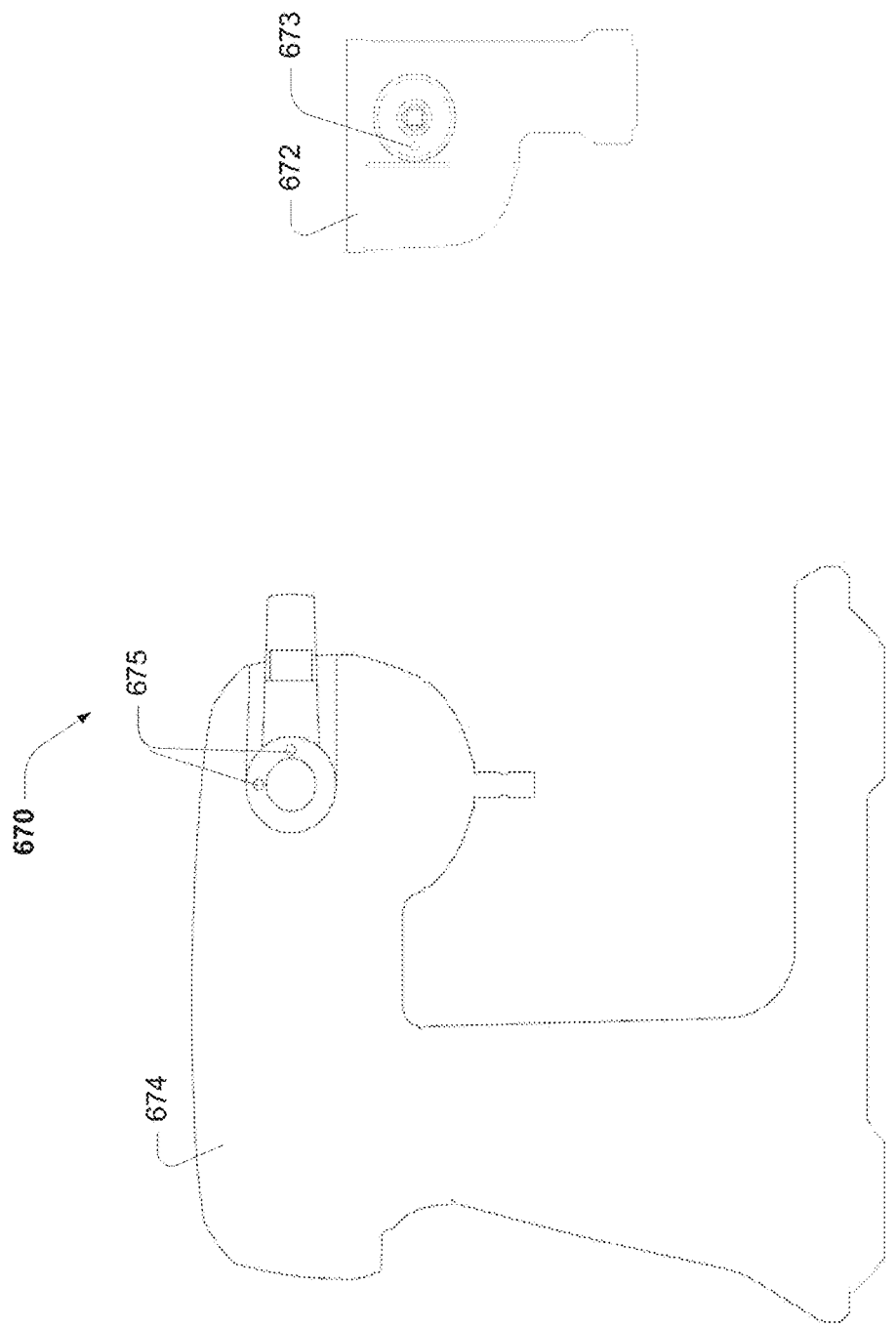

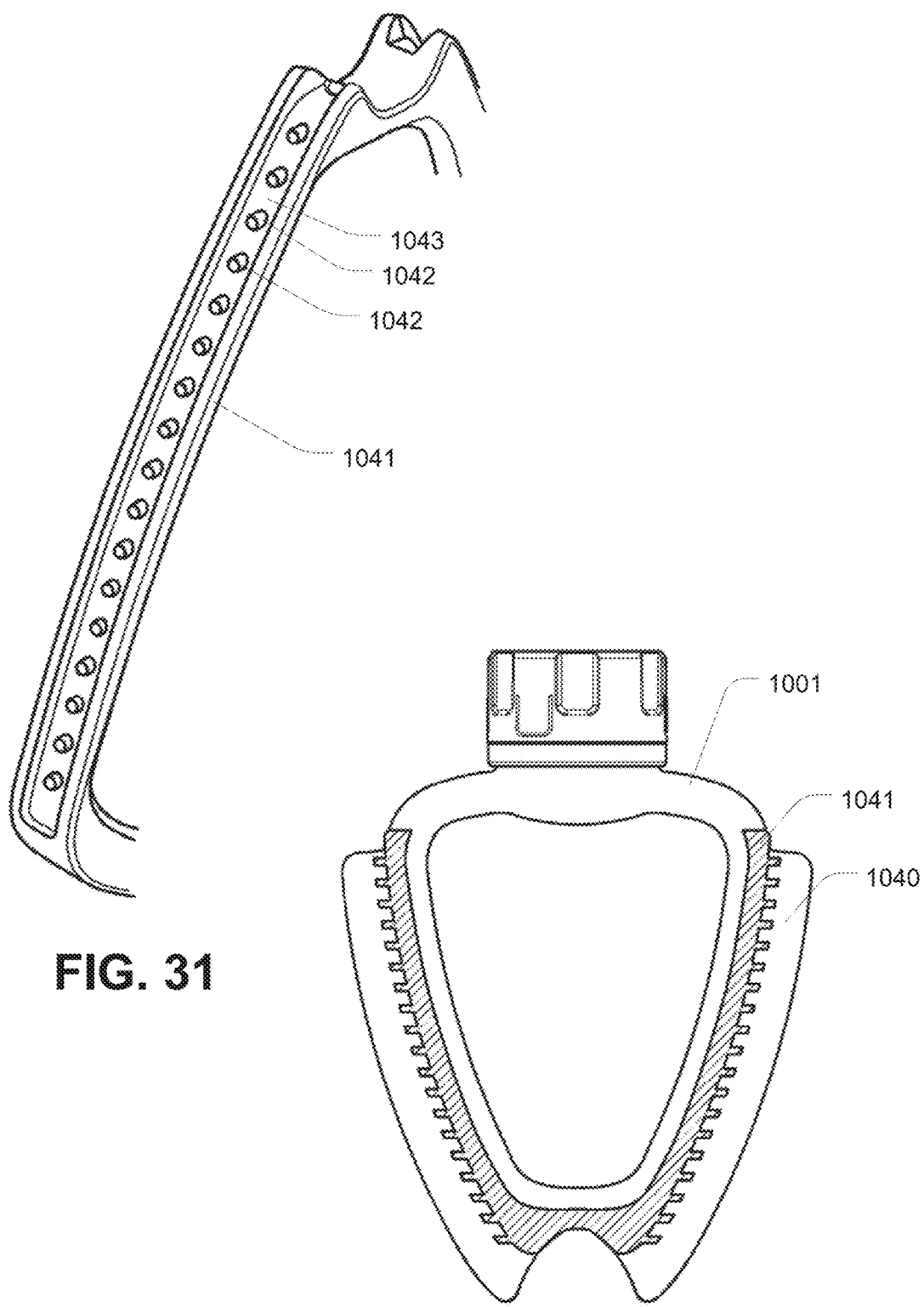

BENCH MIXER

FIELD OF THE INVENTION

The present invention relates to kitchen appliances and in particular to motorised kitchen appliances.

The invention has been developed primarily for use as a bench mixer appliance and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

OBJECT OF THE INVENTION

It is an object of the present invention to overcome or ameliorate at least one of the disadvantages of the prior art, or to provide a useful alternative.

It is an object of the invention in a preferred form to provide a scraper whisk apparatus for a mixing appliance.

It is an object of the invention in a preferred form to provide a power outlet drive attachment for a bench mixer appliance.

It is an object of the invention in a preferred form to provide a motor control module for a bench mixer appliance.

SUMMARY OF THE INVENTION

According to an aspect of the invention there is provided a scraper whisk apparatus, the apparatus comprising:
  a whisk cage element having a plurality of wire whisk elements; and
  a scraper element.

Preferably, the scraper element comprises one or more a scraper arm portions, each having a scraper blade portion. More preferably, the scraper element comprises a pair of scraper arm portions. Most preferably, the scraper elements are joined by a bridging portion.

Preferably, the scraper element and the whisk cage element are releasablly engagable. More preferably, the scraper element and the whisk cage element are releasablly engaged to form the scraper whisk apparatus.

Preferably, the scraper whisk apparatus has a coupling assembly that is releasablly couplable to a bench mixer. More preferably, coupling assembly can be in the form of a bayonet fixture. Most preferably, the scraper whisk apparatus is used with a bench mixer.

Preferably, the scraper whisk apparatus can be used in a range of whisking operations outside those operations that are exclusive to a bench mixer.

According to an aspect of the invention there is provided a power outlet drive apparatus, the apparatus comprising:
  a coupling element for engaging a power takeoff coupling; and
  configuration elements wherein orientation can be sensed for referencing an operating condition.

Preferably, the configuration elements include one or more pin protrusions, such that orientation can be mechanically sensed for referencing an predefined operating condition. More preferably, the configuration elements are located on a circumferential collar. Most preferably the collar can be rotated to a selected orientation.

Preferably, the configuration elements include one or more magnet element, such that orientation can be passively sensed for referencing an operating condition. More preferably, the configuration elements are located on a circumferential collar. Most preferably the collar can be rotated to a selected orientation.

Preferably, the power outlet drive apparatus comprises a main body element, and can be configured to perform any one of the following operations: a meat grinder attachment, a sausage extruder attachment, or a pasta extruder attachment. More preferably, the a power outlet drive apparatus has a coupling assembly that is releasablly couplable to a bench mixer power take off. Most preferably, the a power outlet drive apparatus is used with a bench mixer.

According to an aspect of the invention there is provided a motor power control apparatus having a processor element configured to
  access data indicative of a respective power limit to be applied to a motor for each of a plurality of user selectable speed setting;
  monitor motor speed and compare against the user selected speed setting;
  if the current speed is lower than the user selected speed setting, increase power applied to the motor, up to a respective power limit.

According to an aspect of the invention there is provided a motor power control method, the method comprising the steps of:
  maintaining data indicative of a respective power limit to be applied to a motor for each of a plurality of user selectable speed setting;
  monitoring motor speed, comparing against the user selected speed setting;
  if the current speed is lower than the user selected speed setting, increasing power applied to the motor, up to a respective power limit.

Preferably, the motor power control method or apparatus is included in a bench mixer. More preferably, motor power control method or apparatus can be in the form of a software module. Most preferably, the motor power control method or apparatus is used with a bench mixer.

BRIEF DESCRIPTION OF THE DRAWINGS

A preferred embodiment of the invention will now be described, by way of example only, with reference to the accompanying drawings in which:

FIG. 16A-FIG. 16B show an embodiment attachment body having a single-pin construction;

FIG. 19 shows an embodiment construction for coupling a power outlet drive apparatus to a bench mixer;

FIG. 30 is a front perspective view, partially sectioned, illustrating an accessory with an over-moulded scraper blade.

FIG. 31 shows a portion of an accessory, without over moulding.

PREFERRED EMBODIMENT OF THE INVENTION

Scraper Whisk Apparatus

Figure 1A:
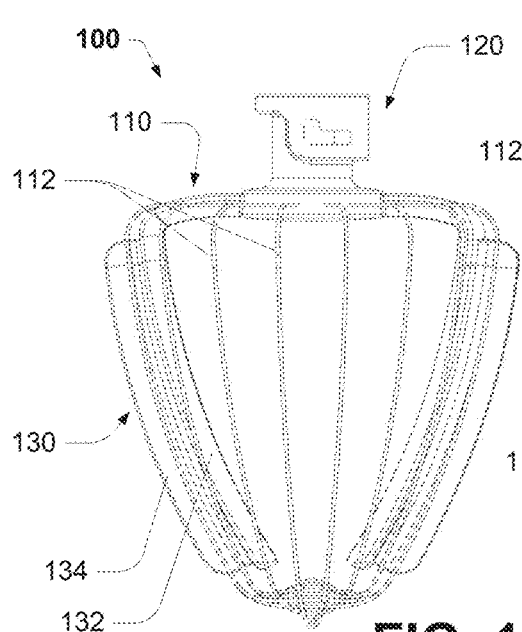
FIG. 1A-FIG. 1D are views of an embodiment scraper whisk apparatus according to the invention.
Figure 1B:
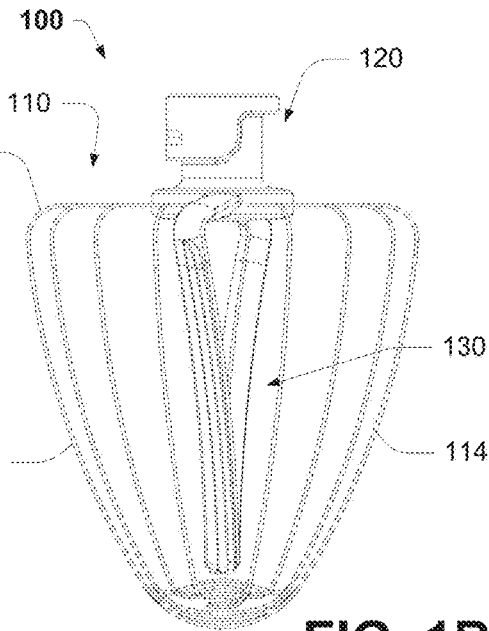
Figure 1C:
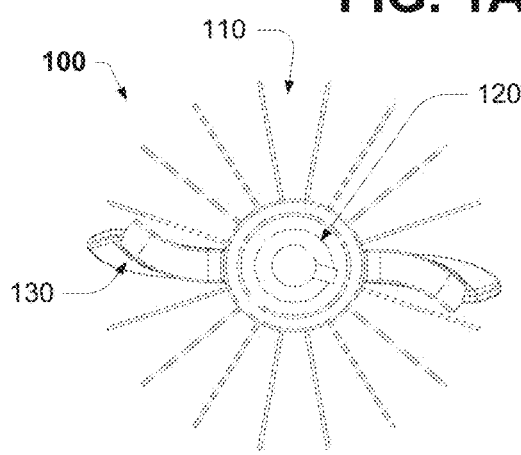
Figure 1D:
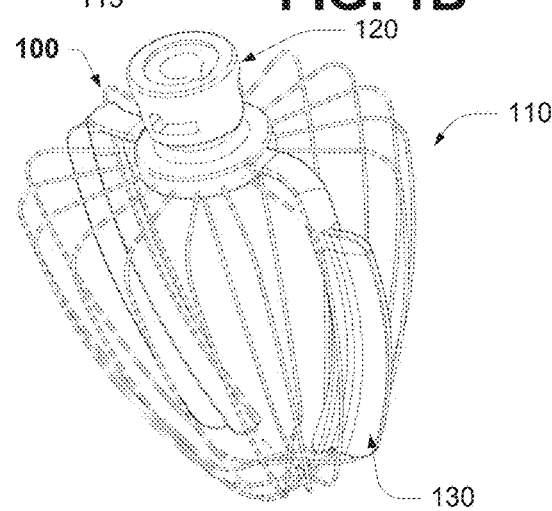

Embodiments of an improved scraper whisk apparatus are shown in FIG. 1A through FIG. 9G. It would be understood that each embodiment scraper whisk apparatus (for example scraper whisk apparatus 100 shown in FIG. 1A) includes a whisk cage element 110 comprising a plurality of wire whisk elements 112. The scraper whisk apparatus (or attachment) can be releasablly couplable to a bench mixer.

The whisk cage element 110 is formed by a plurality of wire whisk elements, designed generally by the numeral 112. The wire whisk element is supported proximal to a coupling assembly 120. The whisk cage element 110 is typically formed by the plurality of wire whisk elements 112 being diametrically disposed, and radially separated, about an axis of the coupling assembly 120.

The scraper whisk apparatus further includes a scraper element 130. The scraper element 130 typically comprising a scraper arm portion 132 and/or scraper blade portion 134. It will be appreciated that the scraper blade portion and the scraper arm portion can be integrally formed, for example wherein the scraper blade portion is overmolded about the scraper arm.

It will be appreciated that a wire whisk element 112, a whisk base (or apex) portion 113, and a pair of outwardly (radially) extending whisk side portions 114 integrally connected to and diverging from the respective whisk base portion 113. The whisk side portions are typically arcuate. Another pair of rectilinear whisk coupling portions 114 integrally connected to the ends of the whisk side portions 114, and inwardly extend toward each other to converge (and be supported) proximal to a coupling assembly 120. The free end of the wire whisk elements being supported proximal to a coupling assembly 120.

The whisk base portion can be a reversely bent central apex base portion, or a substantially flat base portion, or have a concave withdrawn base portion. It will be appreciated that the whisk base portions can be spatially separated by incorporating a different base portion for each wire whisk portion, while maintaining substantially identical whisk side portions and whisk coupling portions. Alternatively, the wire whisk element can be substantially identical.

In this embodiment, it will be appreciated that the overlapping reversely bent wire lengths reduces the "dead zone", and that without these there a dead zone can be defined within the vortex. The construction provides an agitation (or rumble) zone for introducing air to the mixture, which aids in preparation of egg whites and assists in providing a silky even texture.

By way of example only, each of the wire whisk elements are formed from an axially elongated generally cylindrical length of resilient stainless steel wire having a uniform cross section throughout its entire length.

Figure 2:
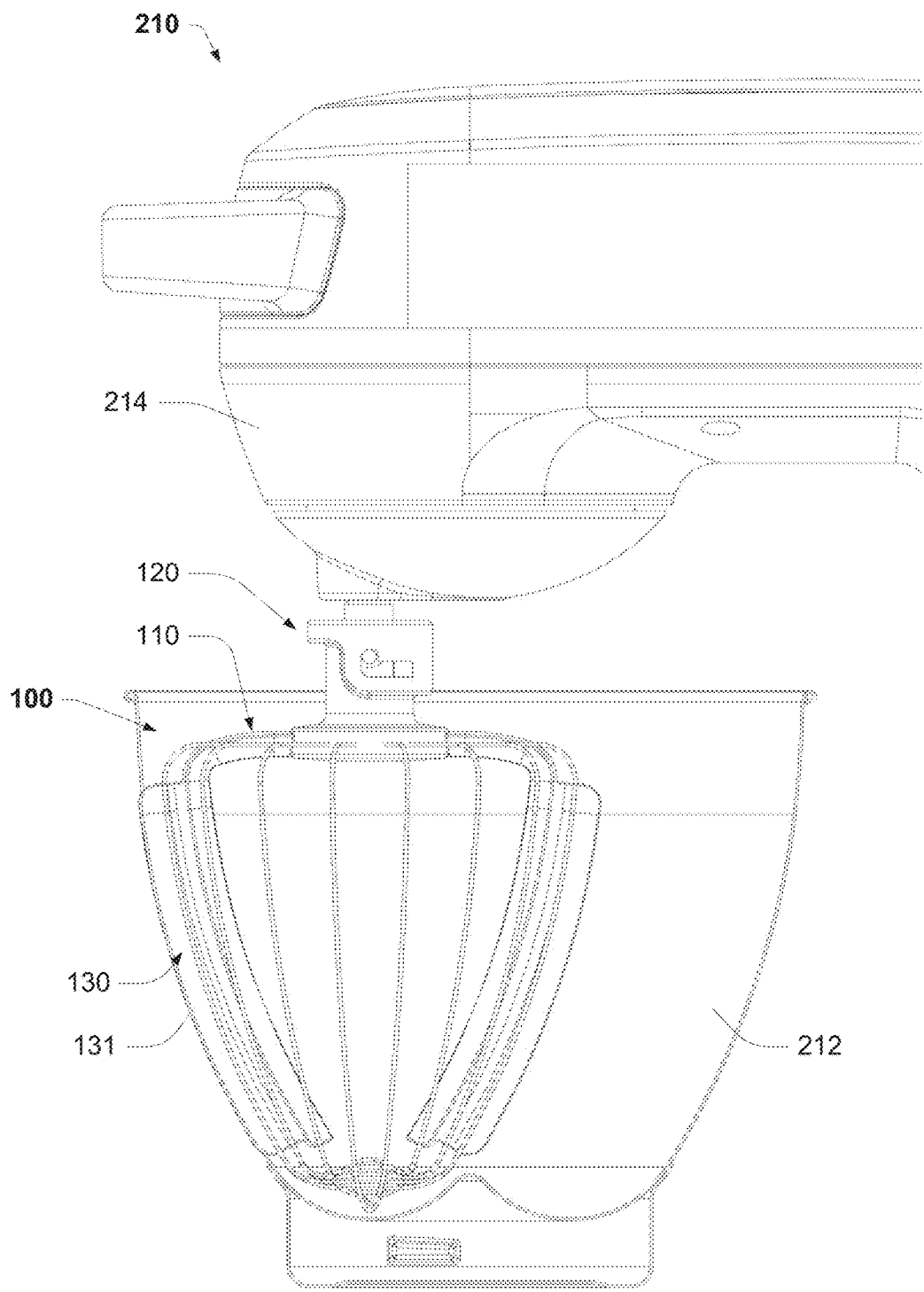
FIG. 2 is a side view of a scraper whisk apparatus of FIG. 1A used with a bench mixer appliance.
Figures 3A, 3B:
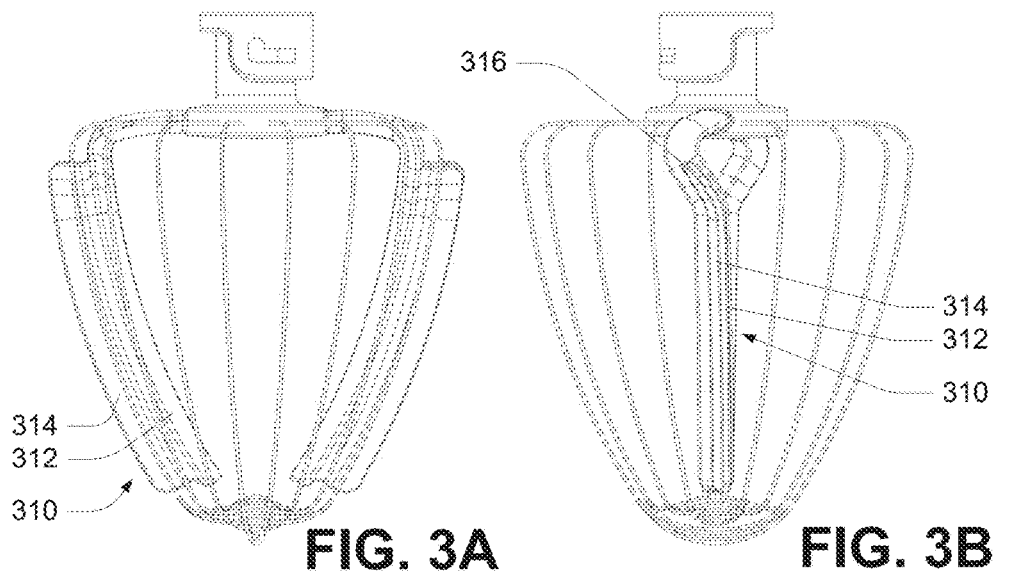
FIG. 3A-FIG. 3D are views of an embodiment scraper whisk apparatus according to the invention.
Figures 3C, 3D:
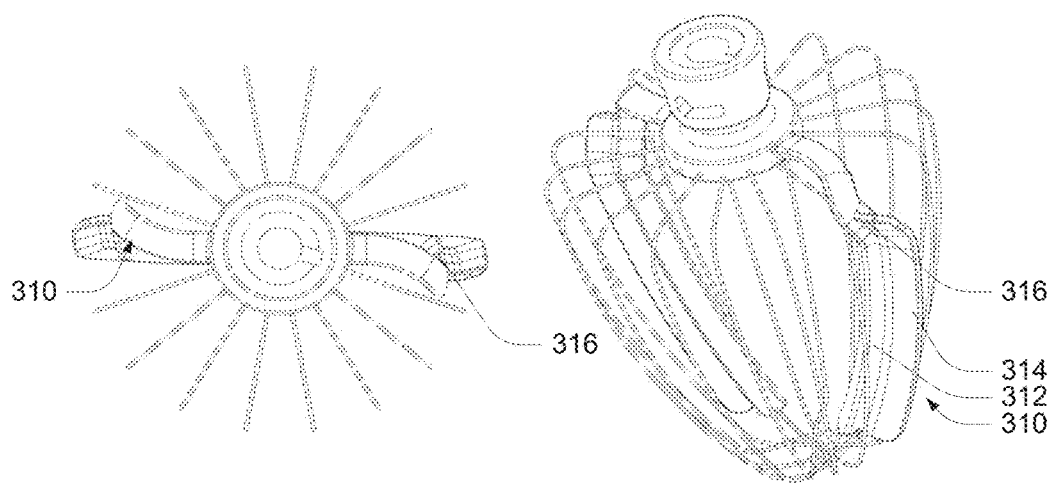
Figures 4A, 4B:
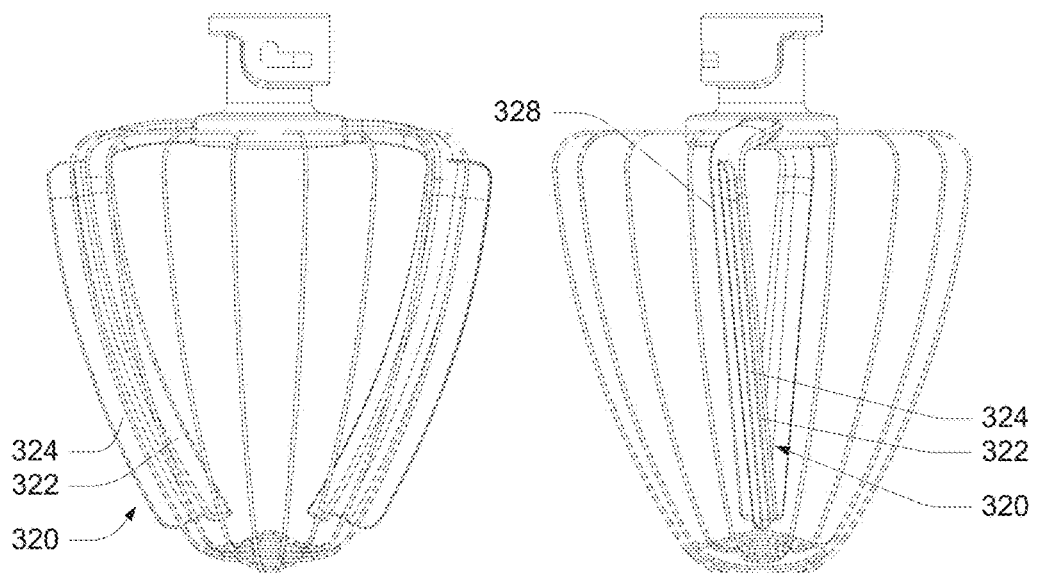
FIG. 4A-FIG. 4D are views of an embodiment scraper whisk apparatus according to the invention.
Figures 4C, 4D:
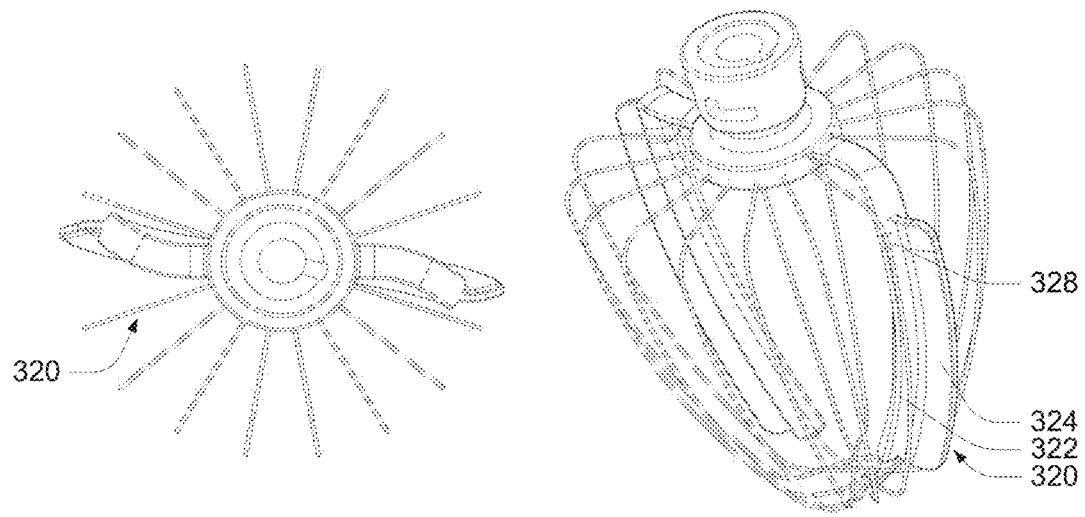
Figures 5A, 5B:
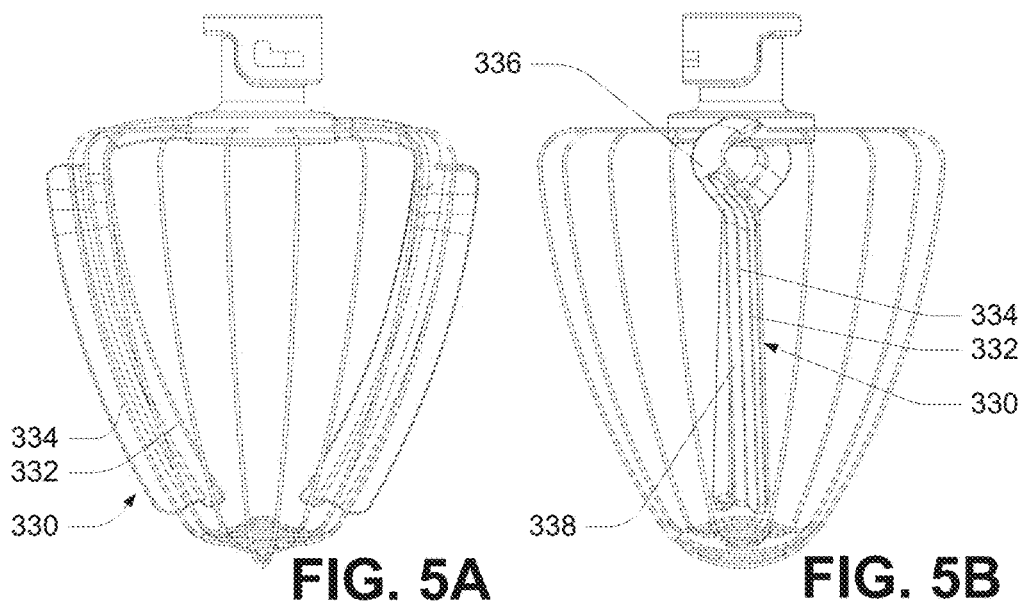
FIG. 5A-FIG. 5D are views of an embodiment scraper whisk apparatus according to the invention.
Figures 5C, 5D:
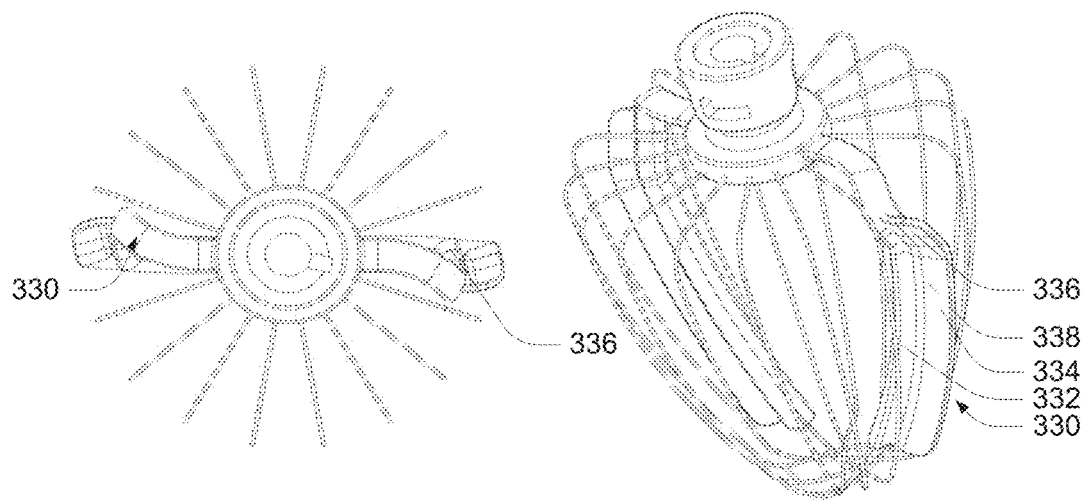
Figure 6A:
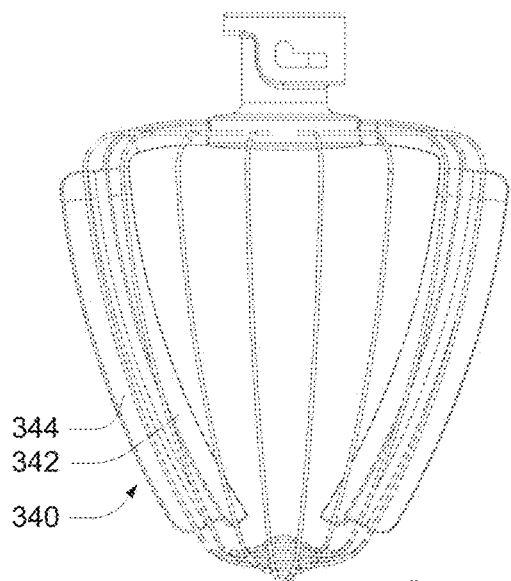
FIG. 6A-FIG. 6D are views of an embodiment scraper whisk apparatus according to the invention.
Figure 6B:
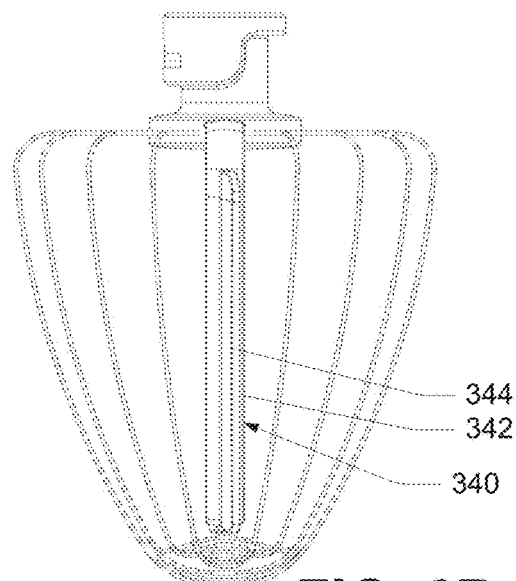
Figure 6C:
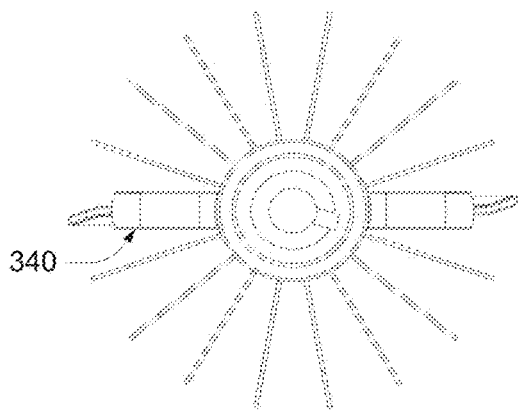
Figure 6D:
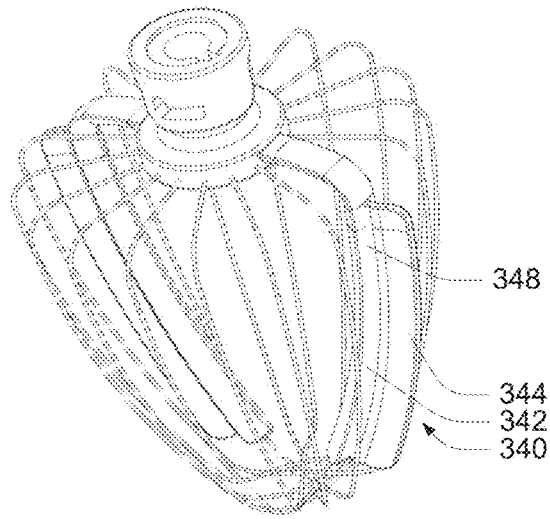
Figure 7A:
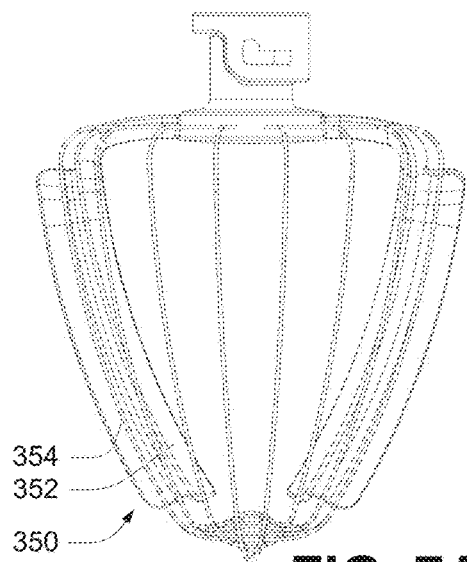
FIG. 7A-FIG. 7D are views of an embodiment scraper whisk apparatus according to the invention.
Figure 7B:
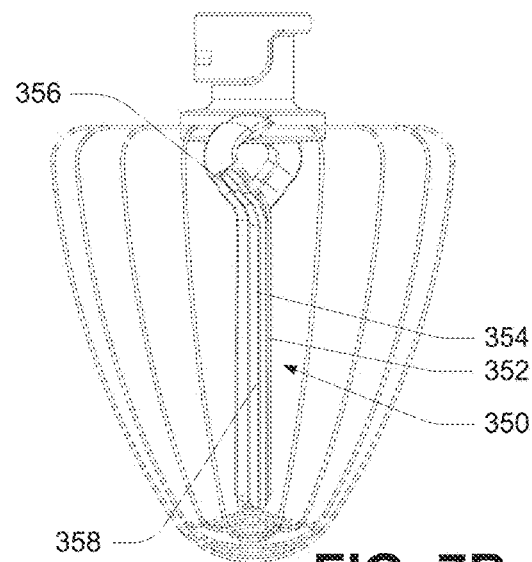
Figure 7C:
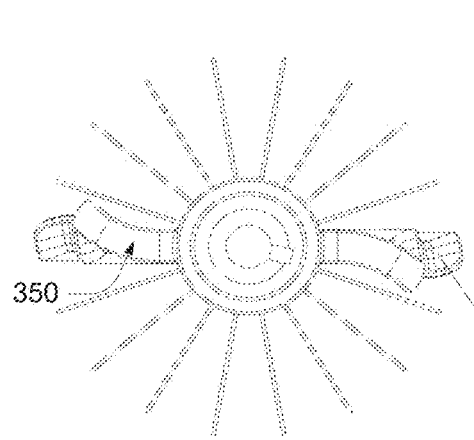
Figure 7D:
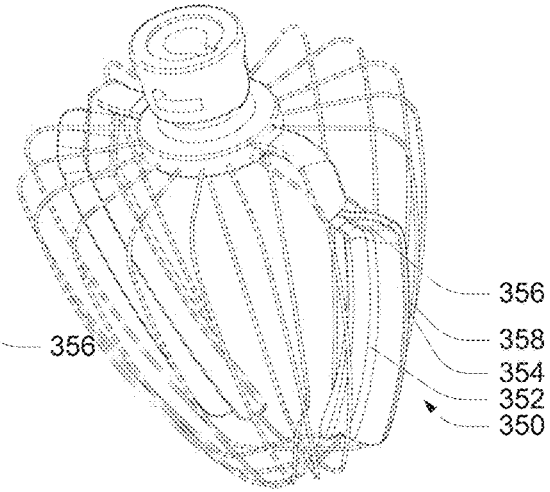

As shown in FIG. 2, when operating in a mixer appliance 210, the scraper element 130 (more particularly a forward flexible edge 131), is configured to rotate about the coupling assembly and contact the mixing bowl 212. The scraper arm portion and/or scraper blade portion can be arcuate to enable contact with the mixing bowl, substantially along the whole length, and/or enable contact with the mixing bowl while raising the head assembly 214. The coupling assembly can be in the form of a bayonet fixture to enable releasable coupling to a planetary drive shaft of a bench mixer. It will be appreciated that a planetary bench mixer has a bowl fastened to a base at a predetermined location and configuration.

FIG. 1A through FIG. ID show an embodiment scraper whisk apparatus having a pair of scraper elements. The scraper whisk apparatus can include a scraper element that is integrally formed therein, fixedly coupled therein or releasablly coupled thereto. The scraper elements typically extend substantially radially outwardly with respect to an axis of rotation of the coupling assembly.

FIG. 1A through FIG. 1D show an example embodiment scraper whisk apparatus having a pair of diametrically disposed scraper elements. However, it will be appreciated that one or more scraper arms with a scraper blade can compliment a whisking cage assembly for improved whisking performance. Each scraper element being independent of the other for enabling improved flex and dampening as it makes a pass against (contacting) the bowl wall, and increasing surface contact of the blade. Although two scraper elements are preferred, it will be appreciated that one or more scraper elements can be used.

The scraper elements (typically the scraper blade portion 134 and arm portion 132) have a leading upper portion to throw and/or fold debris on the bowl wall back down into the mixture. In this example, the scraper blade portion has a curved edge engaging profile. The scraper blade portion can be angled away from a direction of rotation to dampen contact with bowl and lessen disruption of planetary action.

The scraper elements are typically made of a polymer (or co-polymer) to allow them to flex during contact. It will be appreciated that a co-polymer can include plastic and silicon based material that are not typically classed as polymers. The scraper elements can have a trajectory bringing it within the whisk cage profile to provide room to flex. The forward flexible edge of the scraper blade portion is preferably defined of a material softer than the scraper arm portion, for increasing surface area contact with the bowl wall.

In an example embodiment, the wire whisk elements can have a profile that conforms to the bowl wall. The profile of wire whisk elements can intimately compliment the bowl wall, and in use enables intimate contact with the bowl wall along the respective side portions (substantially full length). The whisk side portion can conform with the profile of the bowl wall, while that whisk base portion and the whisk coupling portion have been drawn out (or extended) sufficiently to enable substantially full length engagement between the whisk side portion and the bowl wall. The scraper elements are spaced apart from (typically located equidistant between) the wire whisk elements—such that so that scraper elements do not contact the wire whisk elements during typical operation and flex.

As shown in FIG. 2, by way of example, scraper blade portion is dimensioned to be wider than the space between the scraper arm portion and the bowl wall, such that the that the blade is biased to make contact along substantially its full length. The flexibility of the blade portion can allow it to trail its coupling location to the scraper arm portion to increase contact surface area and thereby provide an improved scraping function. The scraper element is configured to abuttingly engage the bowl base and wall profile to reduce dead spots in the mixture.

It will be appreciated that the flexibility of the blade portion can also allow the scraper arm to be pushed toward the bowl wall the mixer head is lifted, thereby to reduce the amount of debris left by the scraper element prior to drive motor disengaging at a predetermined tilt of head.

FIG. 3A through FIG. 3D show an alternative embodiment scraper whisk apparatus in which a scraper element 310 (typically comprising a scraper arm portion 312 and/or scraper blade portion 314) includes kick down portion 316 in an upper region to direct and/or fold debris on the bowl wall back into the mixture.

FIG. 4A through FIG. 4D show an alternative embodiment scraper whisk apparatus in which a scraper element 320 (typically comprising a scraper arm portion 322 and/or scraper blade portion 324) includes a substantially straight portion 328 that is angled (the top leading into the direction of rotation) to direct and/or fold on the bowl wall back debris back down into the mixture.

FIG. 5A through FIG. 5D show an alternative embodiment scraper whisk apparatus in which a scraper element 330 (typically comprising a scraper arm portion 332 and/or scraper blade portion 334) includes an substantial/prominent kick down portion 336 in upper region and a substantially straight portion 338 that is angled (the top leading into the direction of rotation) to direct and/or fold on the bowl wall back debris back down into the mixture.

FIG. 6A through FIG. 6D show an alternative embodiment scraper whisk apparatus in which a scraper element 340 (typically comprising a scraper arm portion 342 and/or scraper blade portion 344) includes a substantially straight portion 348 that is substantially vertical to resist mixture rising against the bowl wall. This configuration operates well in tall bowls, particularly where spreading the mixture across greater surface area is advantageous.

FIG. 7A through FIG. 7D show an alternative embodiment scraper whisk apparatus in which a scraper element 350 (typically comprising a scraper arm portion 352 and/or scraper blade portion 354) includes a substantial/prominent kick down portion 356 in upper region to direct and/or fold on the bowl wall back debris back down into the mixture and a substantially straight portion 358 that is substantially vertical to resist mixture rising against the bowl wall.

Figure 8:
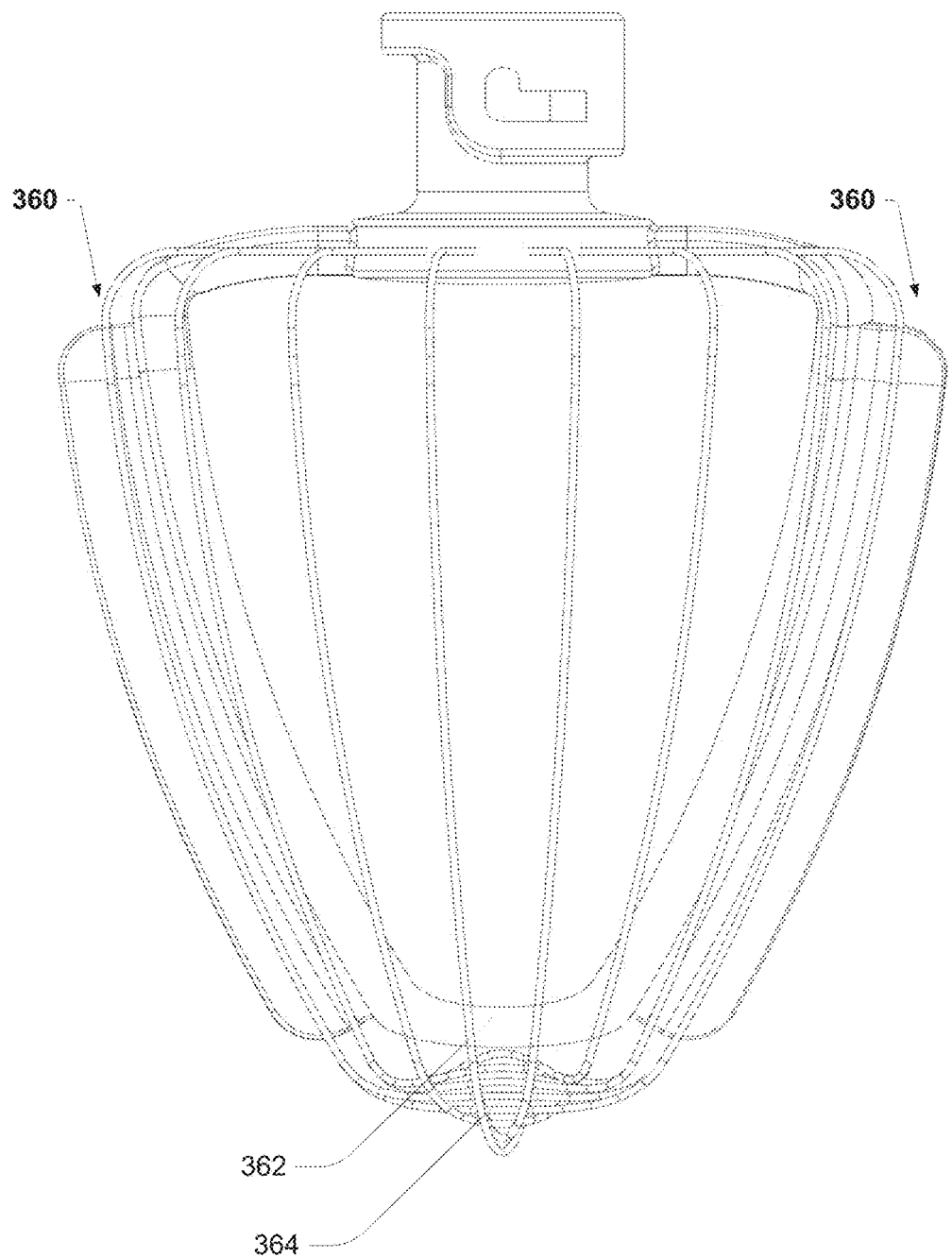
FIG. 8 is a side views of an embodiment scraper whisk apparatus according to the invention.

FIG. 8 shows, by way of example only, that opposing a scraper elements 360 can be joined by a bridging portion 362 in a lower region, across centre intersection. The bridging portion can be displaced above the wire junction 364 so that it does not contact the wire. It will be appreciated that the bridging portion can: add structural integrity, decreasing flex of the scraper elements, and improve contact with bowl wall.

FIG. 9A through FIG. 9G show an alternative embodiment scraper whisk apparatus 370 wherein a whisk cage element 372 is releasablly couplable to a scraper element 374. A locking element 376 operatively associated with the scraper element 374 can retain the whisk cage element 372. In this example embodiment, a 'L' shaped flange 379 abuts the coupling assembly (coupling assembly can be in the form of a bayonet fixture) and is received by the locking element 376. The locking element 376 is threadedly engaged to the scraper element 374 and can be rotated to descend over the 'L' shaped flange 379 to retain the whisk cage element 372. It will be appreciated that the whisk cage element 372 can be releasablly engaged to one of a plurality of alternative scraper elements.

Figure 9A:
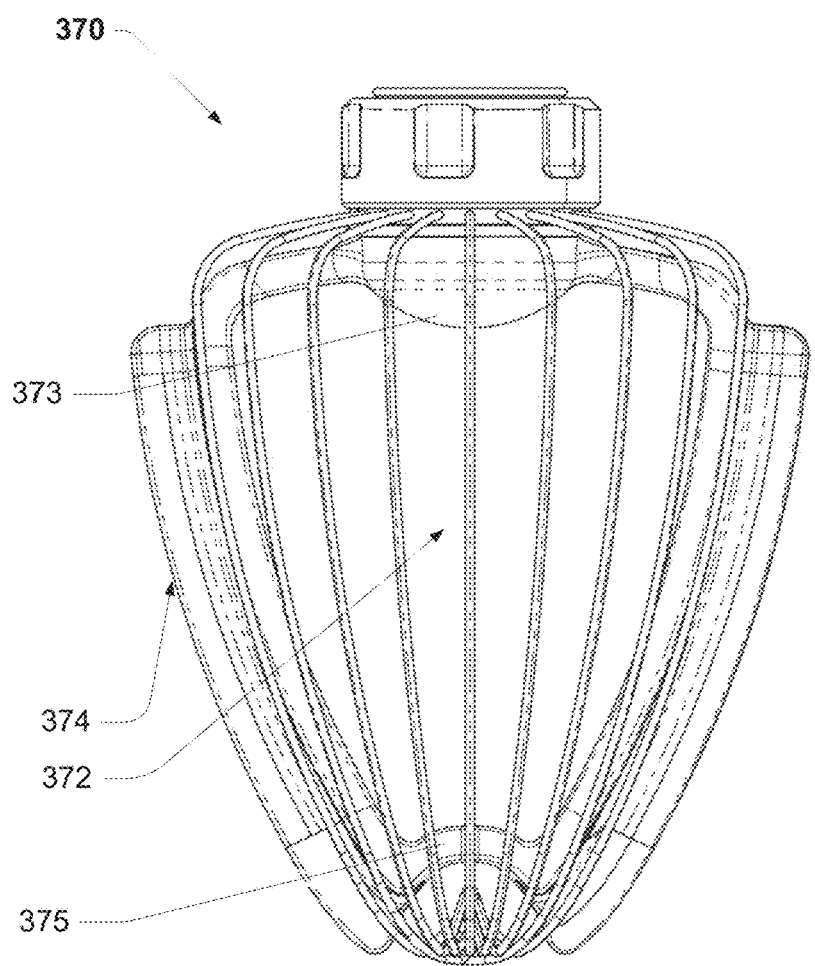
FIG. 9A-FIG. 9G are views of an embodiment scraper whisk apparatus according to the invention.
Figure 9B:
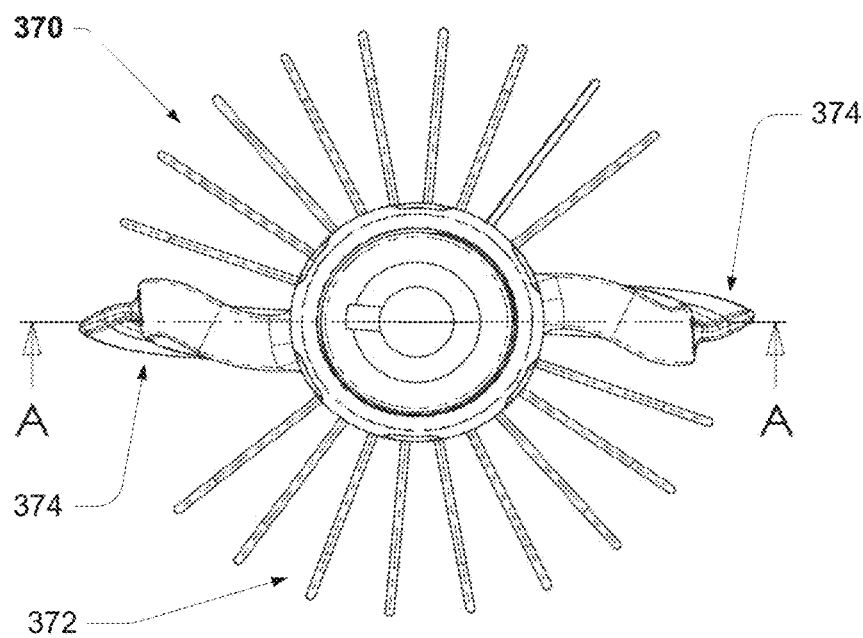
Figure 9C:
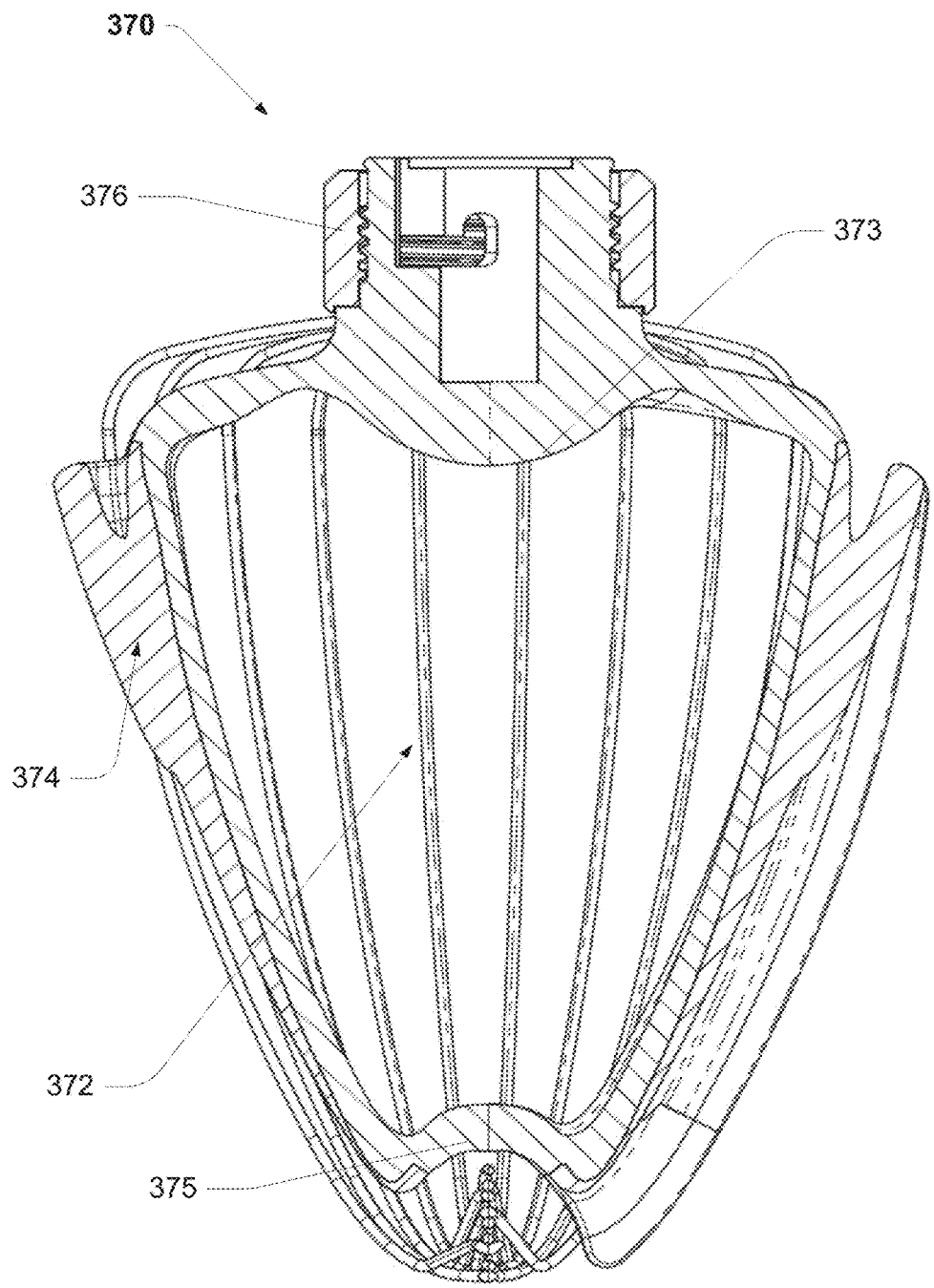
Figure 9D:
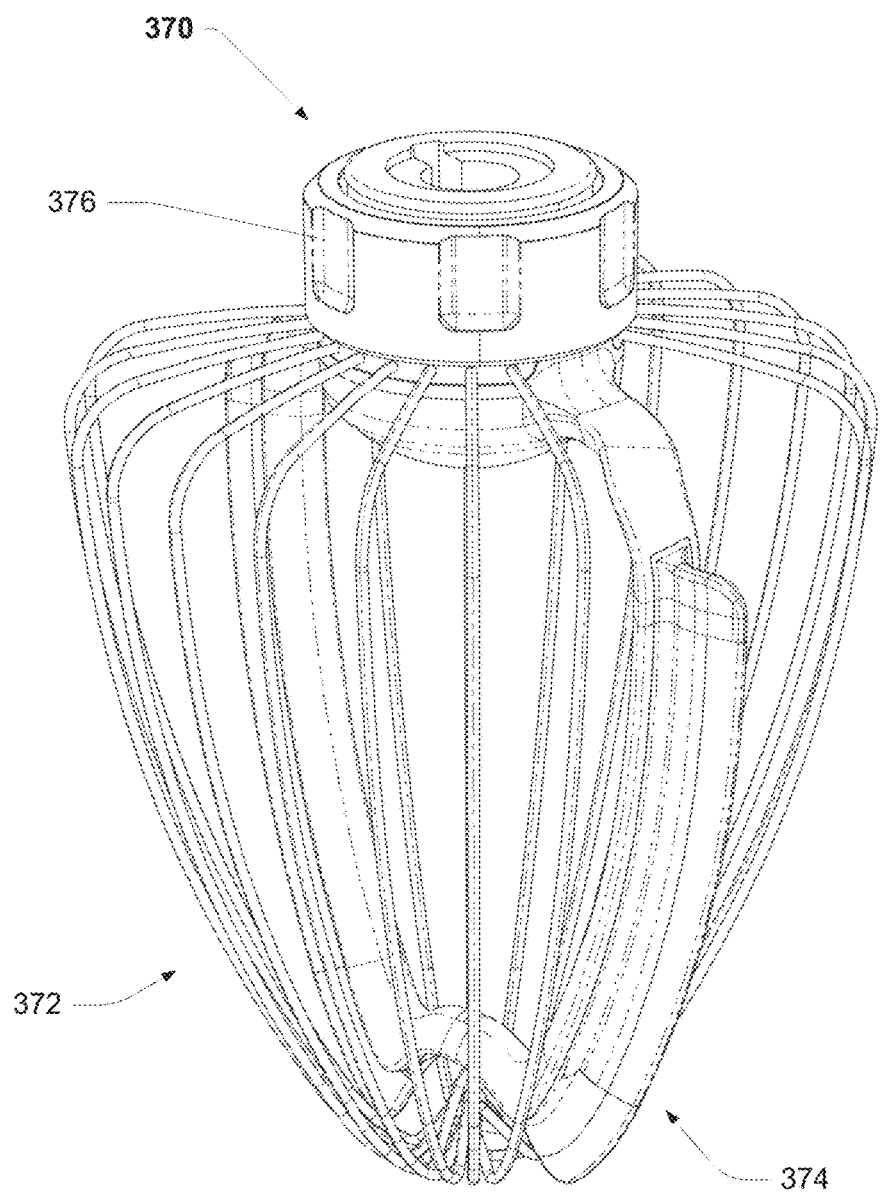
Figure 9E:
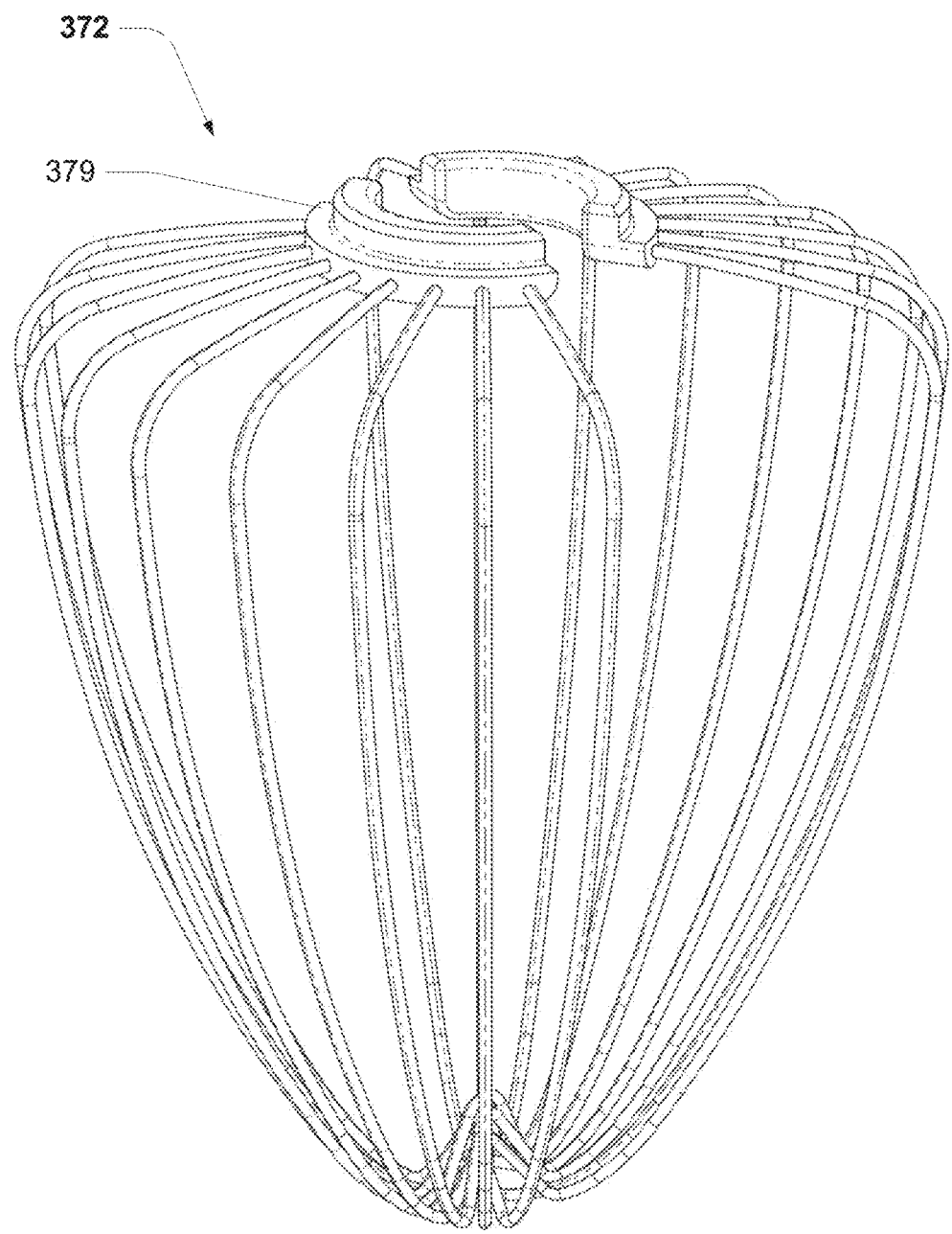
Figure 9F:
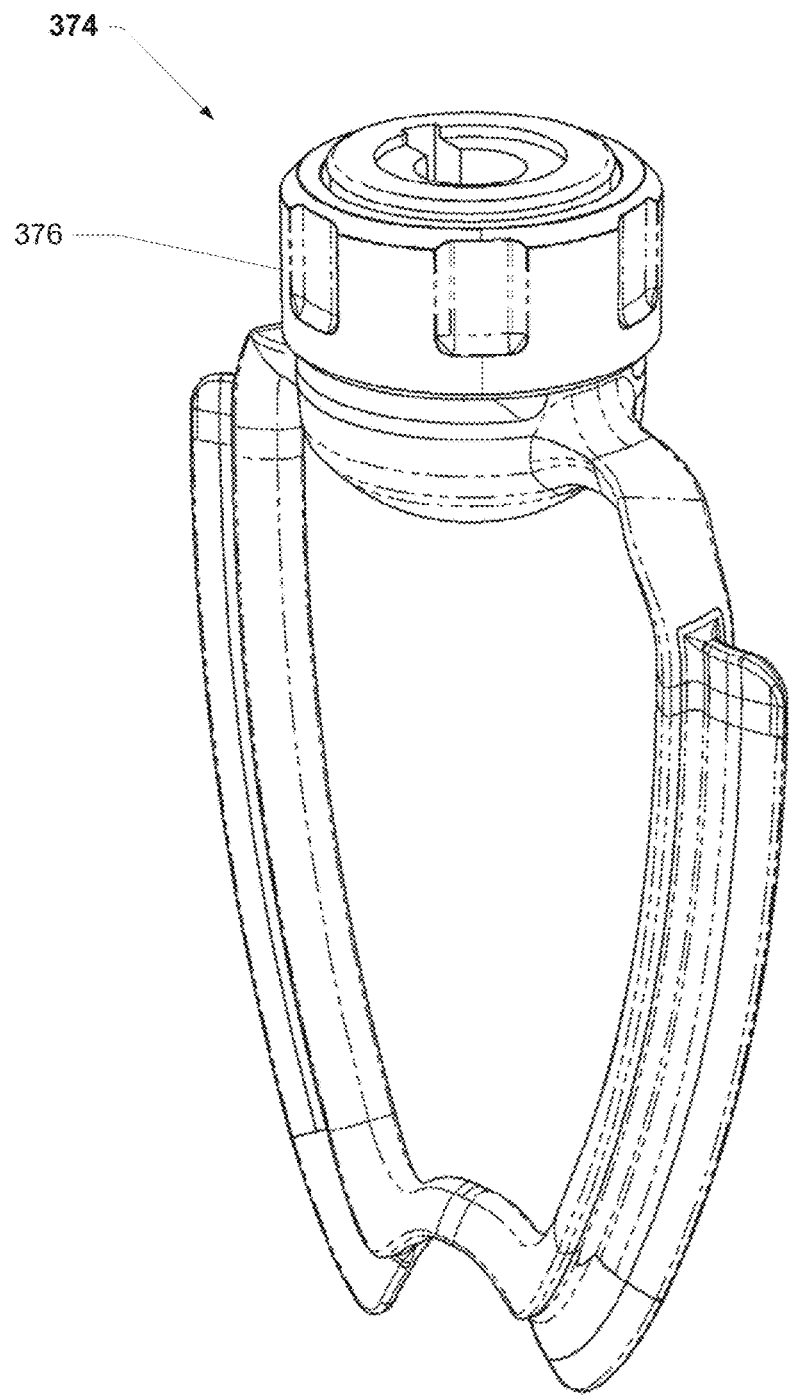
Figure 9G:
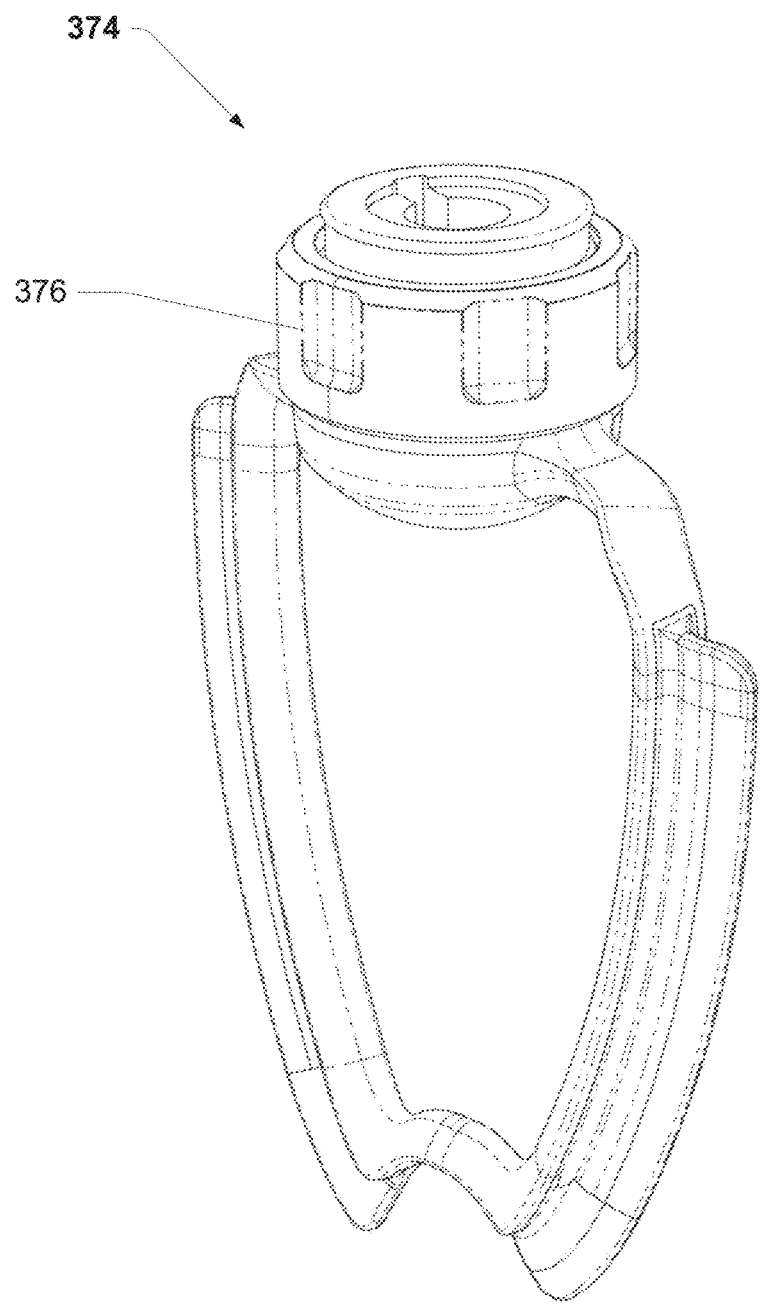

Alternative embodiments can include any one or more of the following:
- an arced bridge (375, as shown in FIG. 9A) for interconnecting opposing arms to provide greater structural integrity and allowing the intersection to be located within the cage;
- elongated scraper blades (374, as shown in FIG. 9A) can increase wall contact and improve agitation of debris lower in the bowl;
- domed element (373, as shown in FIG. 9A) can be located under the attachment coupling to promote viscous debris to runoff back into the mixture;
- scraper blade blades (374, as shown in FIG. 9B) can be trailing such that it does not have to be perpendicular to the arm and can thereby improve contact reliability;
- the gripping collar (376, as shown in FIG. 9C) of the detachable elements is sized for enabling a user to obtain a reliable grip during release and fastening;
- the cage (372, as shown in FIG. 9C) can be retained by the assembly when coupled to a mixer head, even when the collar (376, as shown in FIG. 9C) is loosened for reducing risk of unsafe removal scenarios during operation.

It will be appreciated that the illustrated scraper whisk apparatus are suitable for use with a bench mixer appliance.

Power Outlet Drive Apparatus

Embodiments of an improved power outlet drive apparatus 400 are shown in FIG. 10A through FIG. 20. It would be understood that each embodiment power outlet drive apparatus can be releasablly couplable to a bench mixer 410.

Figure 10A:
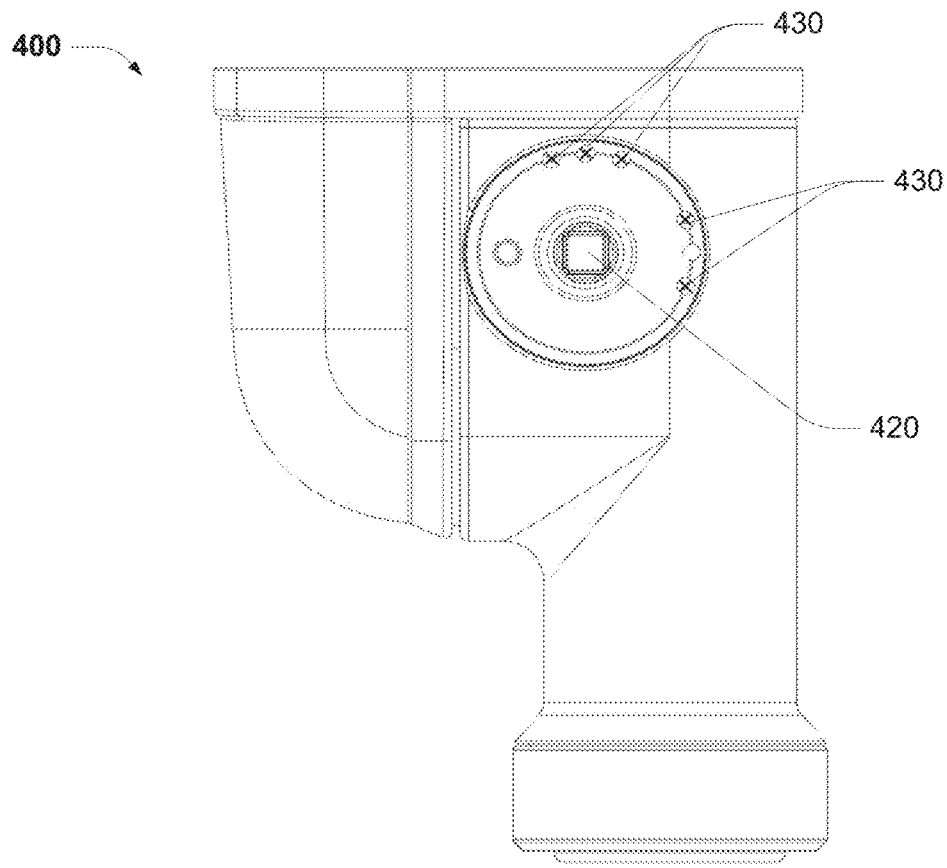
FIG. 10A-FIG. 10B are views of an embodiment power outlet drive apparatus according to the invention.
Figure 10B:
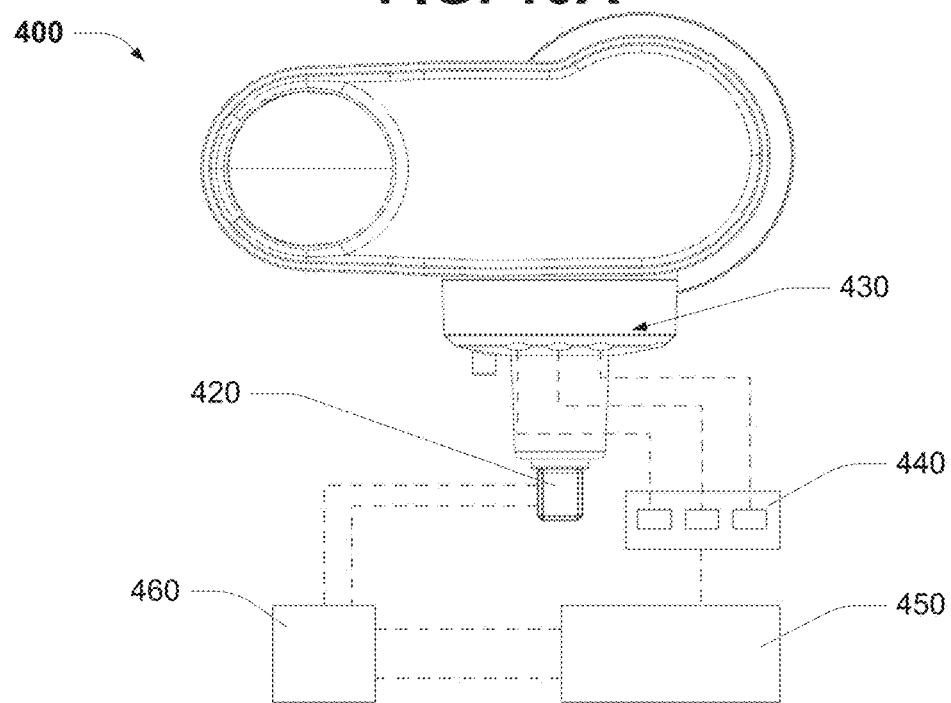

Referring initially to FIG. 10A and FIG. 10B, an embodiment power outlet drive apparatus can have an output drive coupling, and can be vertically or horizontally attached to a bench mixer. A male and/or female coupling 420 can be provided for an attachment to receive a power takeoff coupling from the bench mixer. Orientation can be mechanically sensed to reference an operating condition for the bench mixer motor. Alternatively, orientation can be passively sensed using one or more magnets used to reference an operating condition for the motor. For example, orientation can be coded by placing magnets in predetermined locations 430. Signal reference locations can be aligned to circumferential edge of collar, but other positioning arrangements may be used.

It will be appreciated that an electronic sensing means can include an element substantially flush to an attachment, and wherein sensing occurs within the mixer head. This can provide a non-contacting sensing means for detecting/sensing orientation and configuration of an attachment with respect to the mixer head. By way of example only, the magnet element mentioned above can be an embodiment sensing means. By way of example only, the sensing means could also be used to recognize other mixer attachments such as the scraper whisk at the mixer head.

The bench mixer can determine orientation of an attached power outlet drive apparatus using a plurality of sensors 440 corresponding to the mechanical or passive orientation method. For example, Hall Effect Sensors can be located on a Printed Circuit Board (PCB), for sensing magnets presented by an embodiment power outlet drive apparatus. The orientation can be coded in the respective location of the magnets presented to the Hall Effect Sensors. However, reed switch components could be used in an equivalent construction. By receiving and identifying signals from the Hall Effects sensors, orientation of the power outlet drive apparatus can be determined. Orientation signals are sent to a processor module 450.

The processor module 450 is adapted to receive the orientation signals, and compare them against a pre-determined reference matrix to determine orientation of the power outlet drive apparatus. A reference matrix can contain corresponding operating condition for motor 460 and outlet drive 420. The processor module 450 can regulate motor power output. The motor can receive and feedback information about and from operation.

By way of example, an orientation or configuration (pasta, mincing, grinding or juicing as determined by the processor module, can cause the processor module to present to a user only selected available speeds—of the generally available speeds.

In an embodiment, a user may be presented the opportunity to override factory settings for some attachments, if the instruction are generally not considered to create a detrimental condition for the motor or task. By way of example, when using a standard mixing head to perform a whisking operation the motor conditions appropriate to the reference signal are pre-determined, while excessive speed or prolonged whisking will result in the mixture collapsing a user may operate outside the usual parameters.

Figure 11A:
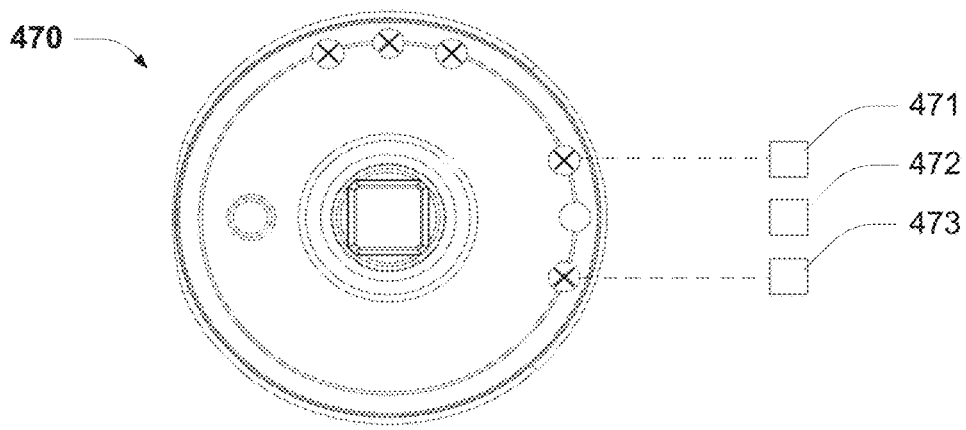
FIG. 11A-FIG. 11C show embodiment orientations of a power outlet drive apparatus.
Figure 11B:
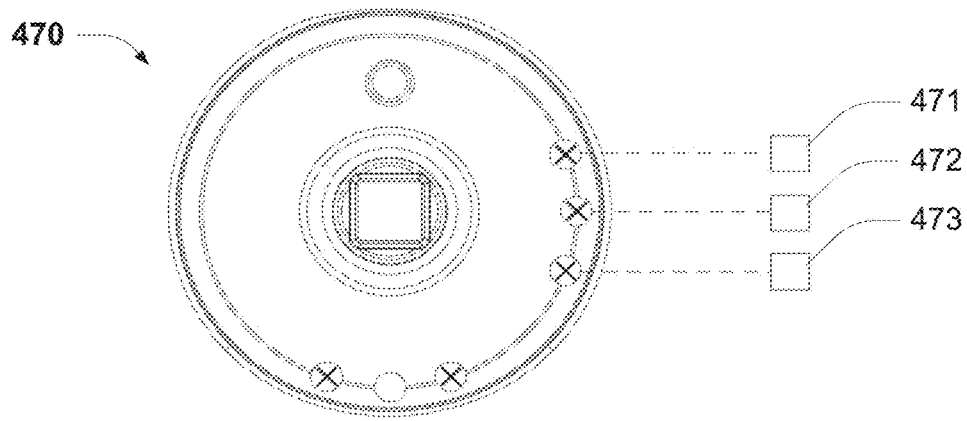
Figure 11C:
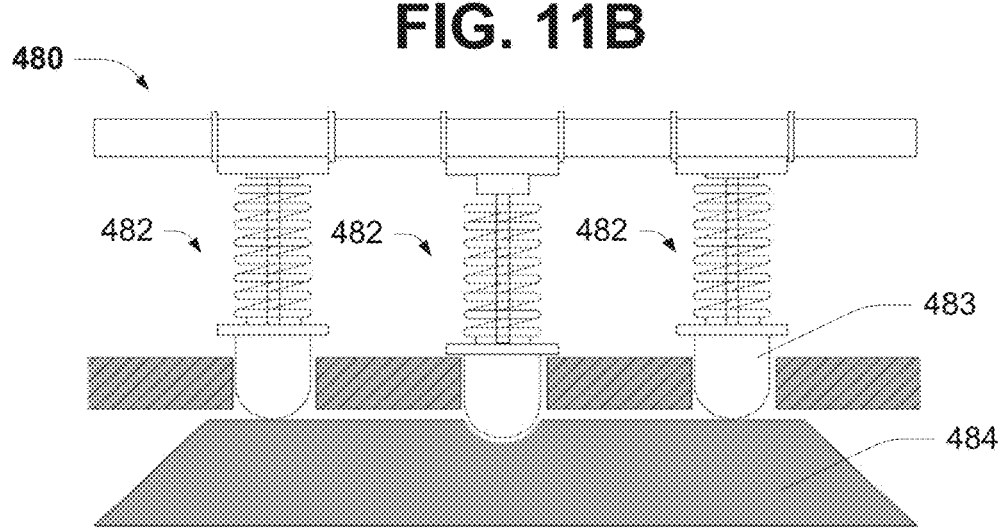

Referring to FIG. 11A through FIG. 11C: FIG. 11A shows or represents a first orientation and FIG. 11B shows or represents a second orientation. For vertical and horizontal attachment, one or a plurality references signal (magnets at predetermined location 430) may be used to reference an operating condition for the motor. Reference signal locations can be aligned to circumferential edge of a collar, but other positional arrangements may be used. If all reference locations have no signal, it can be assumed that an attachment is without operation restrictions (or competitor attachment), or an attachment is not coupled to the drive.

FIG. 11A shows a first orientation, wherein a first sensor pad and a third sensor pad will be activated. FIG. 11B shows a first orientation, wherein the attachment has been rotated (in this case 90 degrees) causing a first sensor pad and a second sensor pad and a third sensor pad to be activated. Accordingly, different sets of usage parameters are available to the user via the processor module.

FIG. 11C shows an alternative embodiment using "collar switch" assembly 480 comprising spring-ball switches 482. Depression of a ball 483 closes a respective contact on a PCB and signals to the processor module that a switch orientation signal is active. A ball that is not depressed (the centre one in this example) is read as inactive by the processor module. Accordingly, a collar 784 located on attachment can include an integral referencing system using depressions for receiving a ball switch. The array of depressions thereby change the reference signal generated by sensors arranged on PCB. As above, any attachment indicating a proprietary attachment would generate at least one orientation signal (having at least one depression), whereas an attachment without a depression (all switches pressed on) can be considered a competitors attachment, and or an attachment without operation restrictions.

Figure 12A:
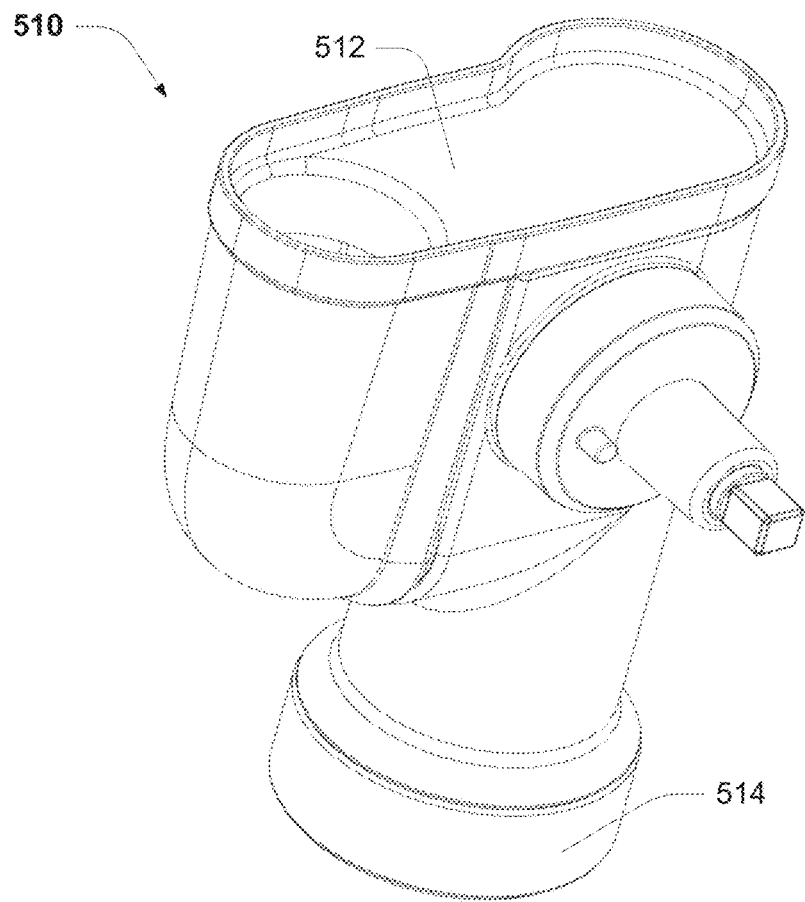
FIG. 12A-FIG. 12B show an embodiment pasta extruder attachment.
Figure 12B:
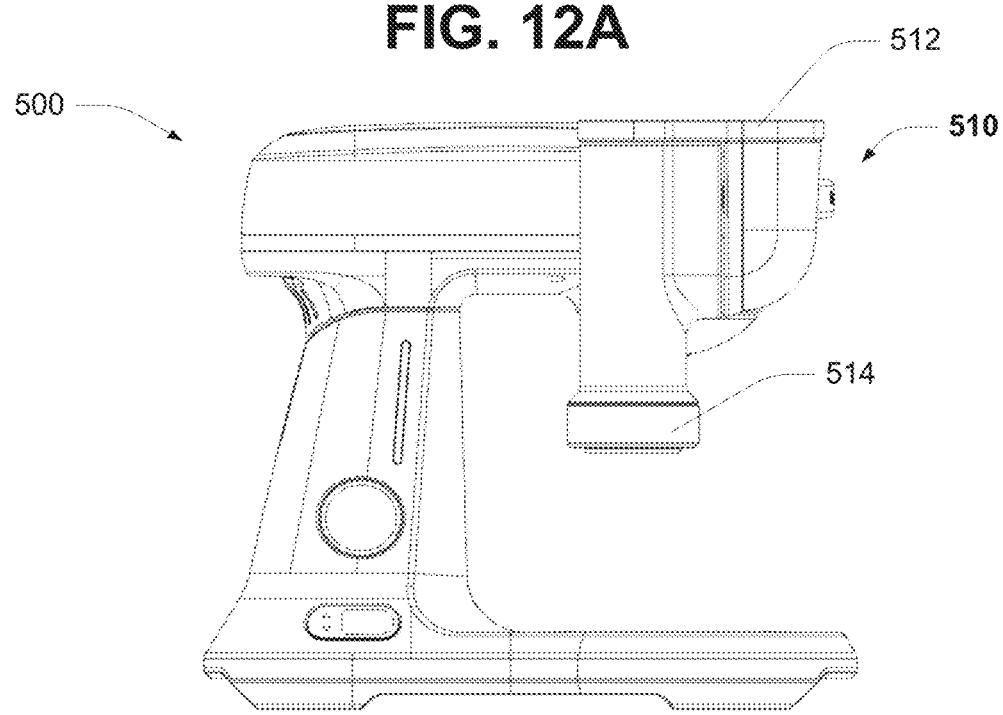

FIG. 12A and FIG. 12B show an embodiment pasta extruder attachment (or configuration) 510 for use with a bench mixer 500. In this embodiment, the pasta extruder includes a pasta hopper (tray and funnel) assembly 512 and a head assembly 514 with an interchangeable extrusion die to regulate type and size of pasta product. This attachment typically does not require reference feedback to controller for discreet motor control.

Figure 13A:
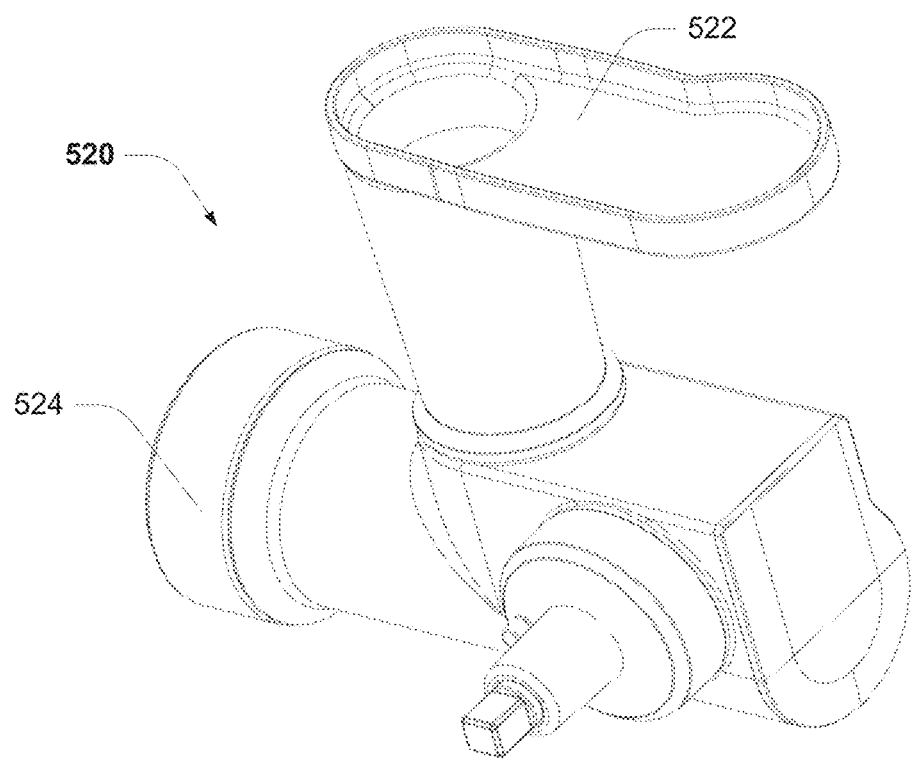
FIG. 13A-FIG. 13B show an embodiment meat grinder attachment.
Figure 13B:
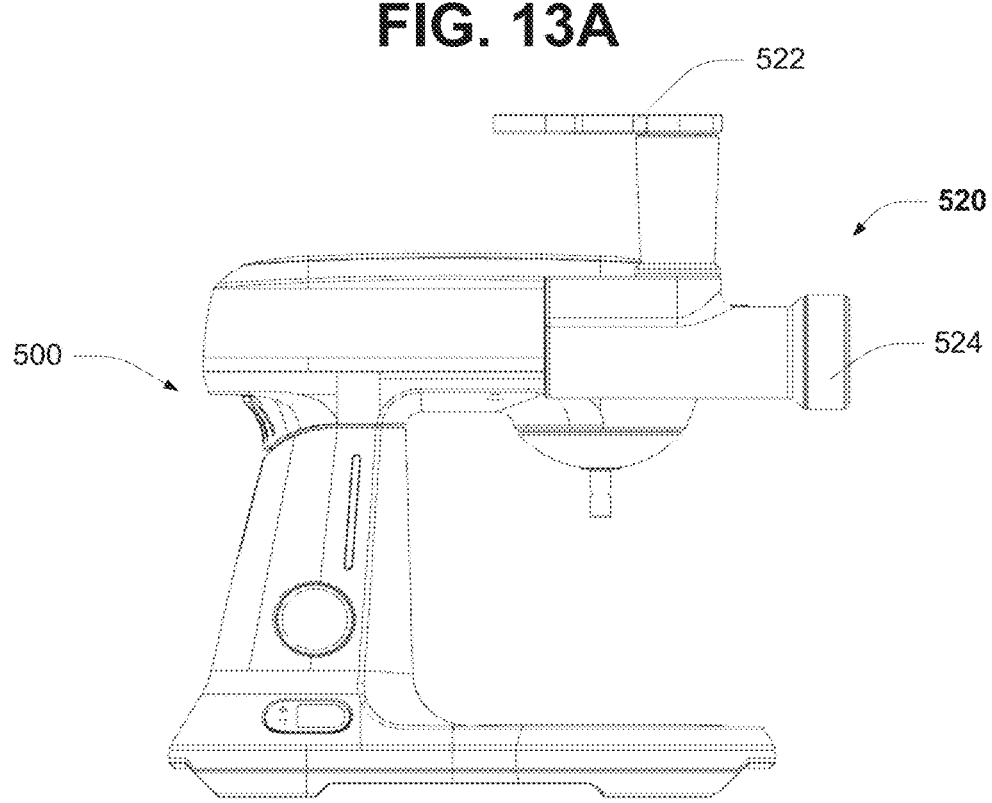

FIG. 13A and FIG. 13B show an embodiment meat grinder attachment (or configuration) 520 for use with a bench mixer 500. In this embodiment, the meat grinder includes a meat hopper (tray and funnel) assembly 522 and a head assembly 524 with an interchangeable extrusion die to regulate type and size of mince product.

Figure 14A:
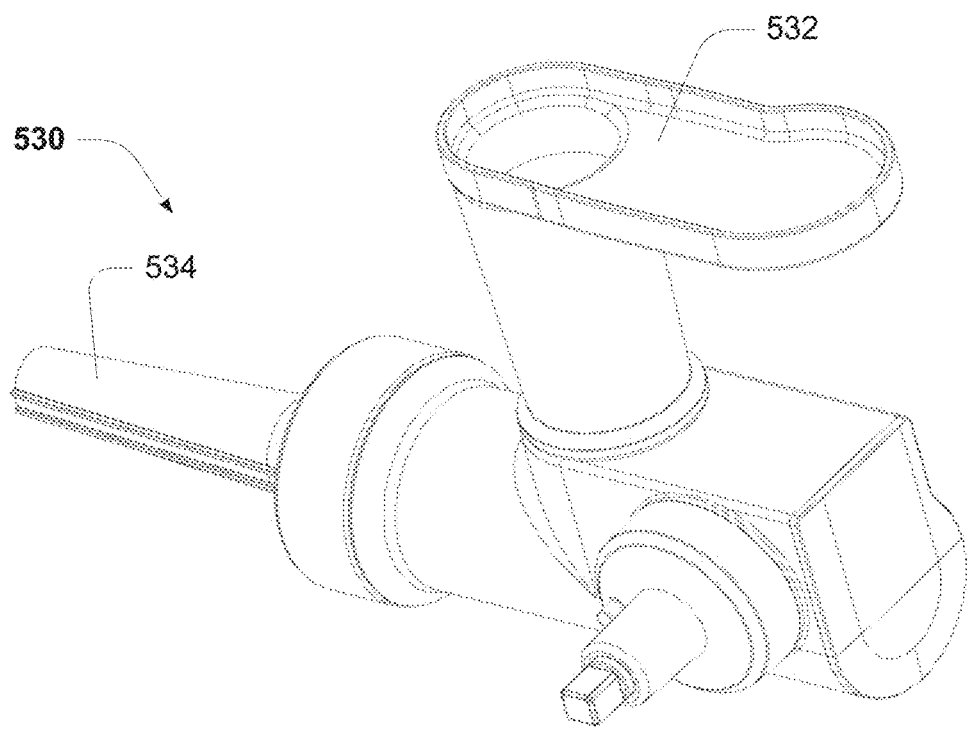
FIG. 14A-FIG. 14B show an embodiment sausage extruder attachment.
Figure 14B:
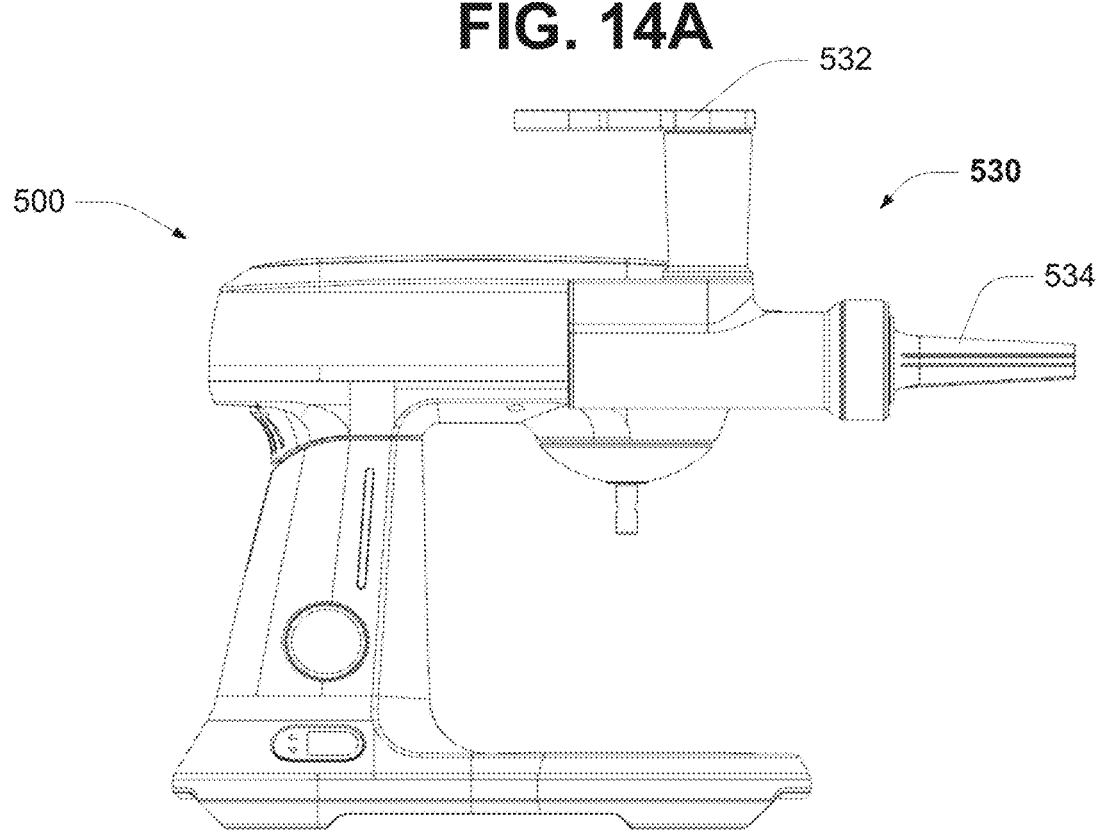

FIG. 14A and FIG. 14B show an embodiment sausage extruder attachment (or configuration) 530 for use with a bench mixer 500. In this embodiment, the meat grinder includes a meat hopper (tray and funnel) assembly 532 and a head assembly 534 with an interchangeable extrusion die to regulate type and size of sausage product.

It will be appreciated that the above three examples are not exhaustive. The invent can also be embodied in other attachments for preparing food, including but not limited to: a coffee grinder or a spice grinder.

Figure 15A:
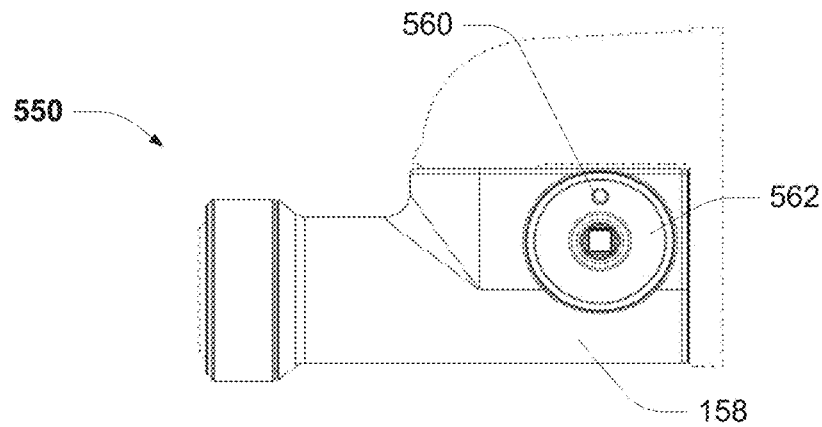
FIG. 15A-FIG. 15C show a common main body for embodiment power outlet drive apparatus.
Figure 15B:
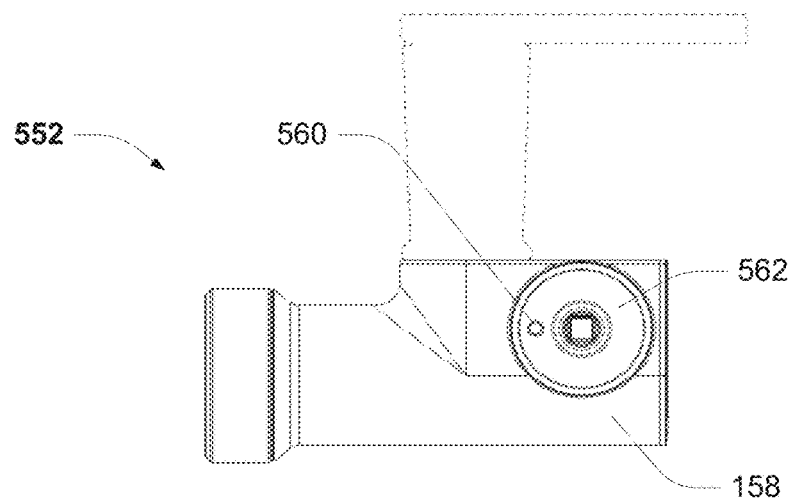
Figure 15C:
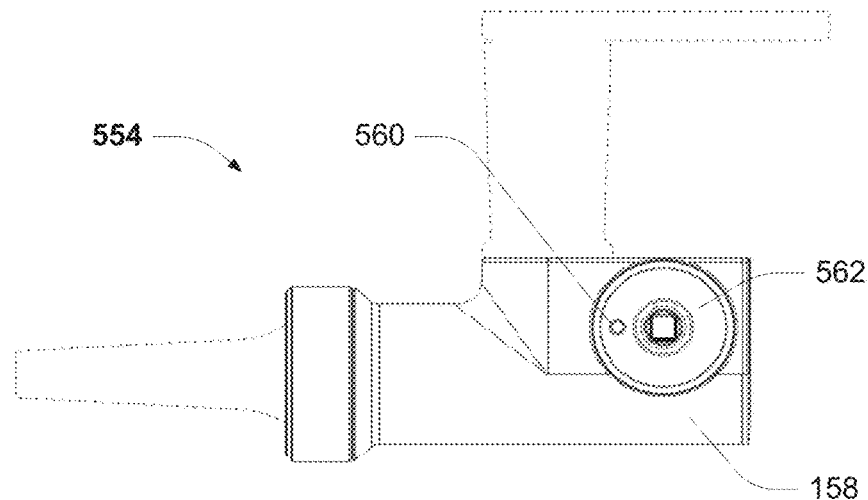

FIG. 15A through FIG. 15C show that each of the pasta extruder attachment 550, meat grinder attachment 552, and sausage extruder attachment 554 each have a common main body (non-dashed) 558 and a number of different parts (dashed) that can be used with the attachment main body to create different configurations. A pin 560 can be positioned on the collar 562 can be adjusted to suit the desired configuration. The pin can engage a bench mixer to define the coupled orientation for the attachment (horizontal or vertical)—wherein the collar can be rotated 90 degrees with respect to the main body to predetermine the orientation.

The above attachments are presented by way of example only. It will be appreciated by those skilled in the art that the teaching herein can be applied to, and embodied within, many other attachment forms.

FIG. 16A and FIG. 16B show an embodiment attachment body 600 having a single pin construction, in which rotation of the collar 610 (and pin 611) is limited to 90 degrees between a first position 612 and a second position 614. This embodiment construction presents two orientations and one pin, wherein the pin can be rotated to suit the desired orientation.

Referring to the sectional view of FIG. 16B, a drive train cover 620 is fastened to the main body (for example using 4 screws). This retains the main axle 622 and bearings (trust bearing 623 and general bearings 624, 625). The collar snap 626 is fastened (for example using 3 screws) to a rotating collar 627. The assembly that consists of the rotating collar and the collar snap can be pushed onto the drive chain cover which traps a click bearing detail 628 in place, and is retained in the correct position using four snap fit details. Rotation is limited to 90 degrees by the angle stop detail 629. The angle locator pin is a detail molded into the rotating collar element.

Figures 17A, 17B:
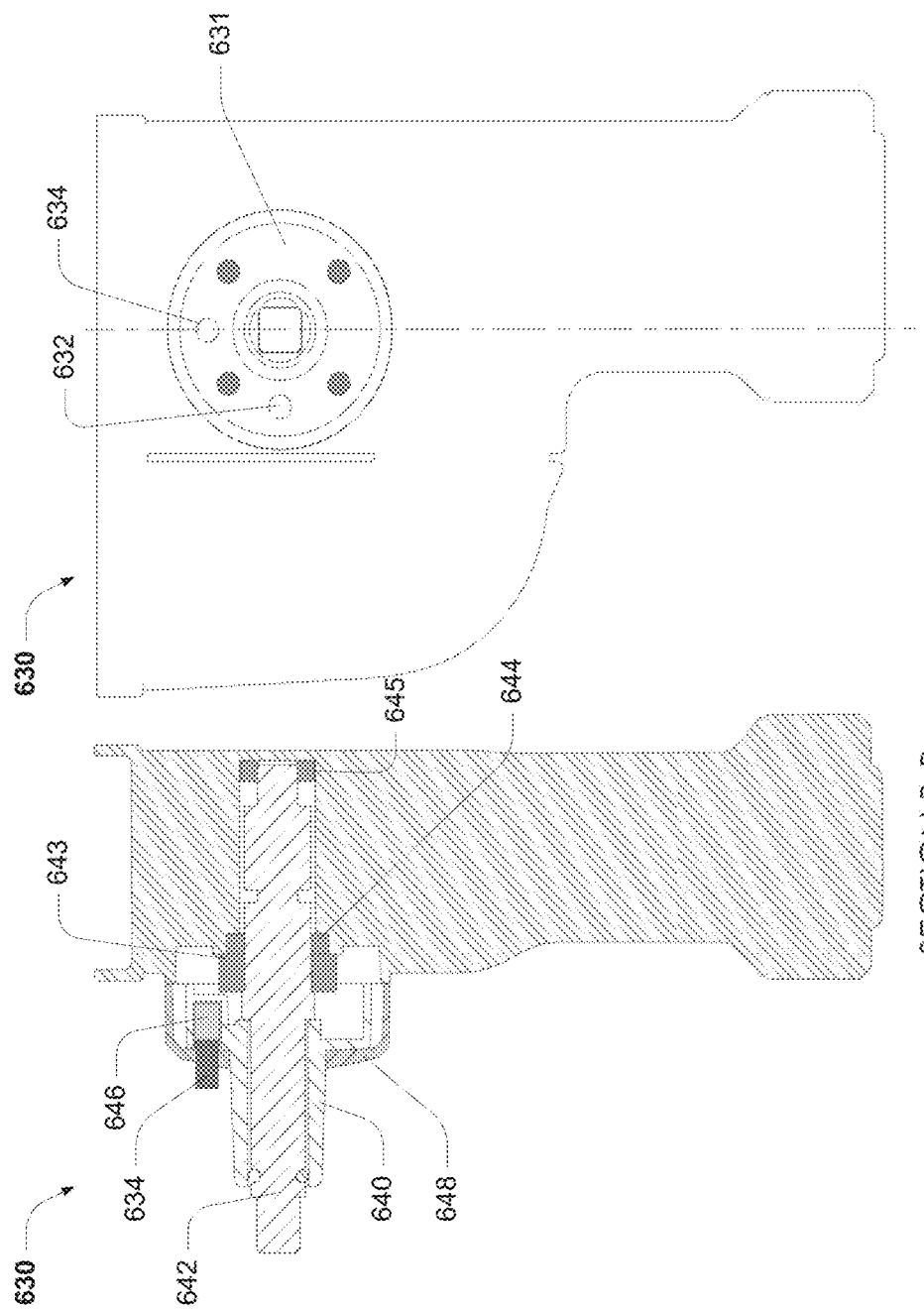
FIG. 17A-FIG. 17B shows an embodiment attachment body having a multi-pin construction.

FIG. 17A and FIG. 17B shows an embodiment attachment body 630 having a multi pin construction, in which a collar 631 has pins that can be pushed in if they are not required. By way of example only, a first angle locator pin 632 and a second angle locator pin 634 are shown. This embodiment construction presents two orientations each defined by a respective one of the two pins. There is one hole on the bench mixer that a pin can fit into. The pin that is not needed will be pushed in as the attachment is pushed onto the bench mixer and the pin that is needed will remain extended and enters the hole on the mixer to define the orientation.

Referring to the sectional view of FIG. 17B, a drive train cover 640 is fastened to the main body. This retains the main axle 642 and bearings (trust bearing 653 and general bearings 624, 625). Springs 646 are placed into angle locator pin cavities to outwardly bias a respective angle locator pin (e.g. 634). A collar 648 is placed over the drive chain cover to retain the angle locator pins in position. Screws are typically used to attached the collar and drive chain cover to the main body, wherein the screws pass through the drive train cover and pull the collar towards the main body and compress the assembly.

FIG. 18A through FIG. 18D show an embodiment attachment body 660 illustrating an example internal construction.

Figure 18B:
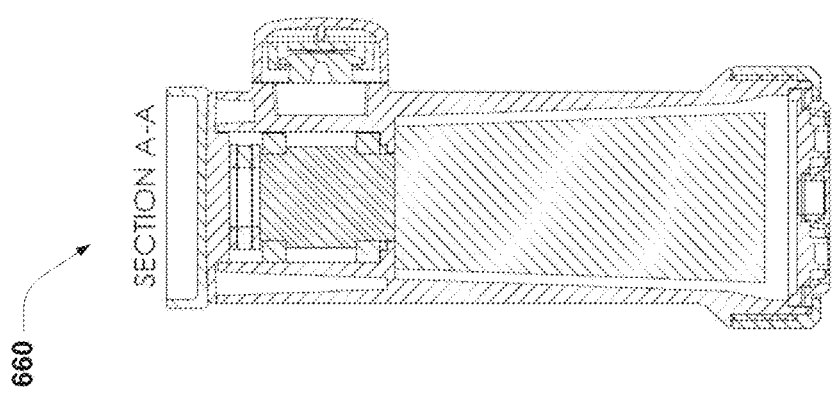
FIG. 18A-FIG. 18D show an internal construction of an embodiment attachment body.
Figure 18A:
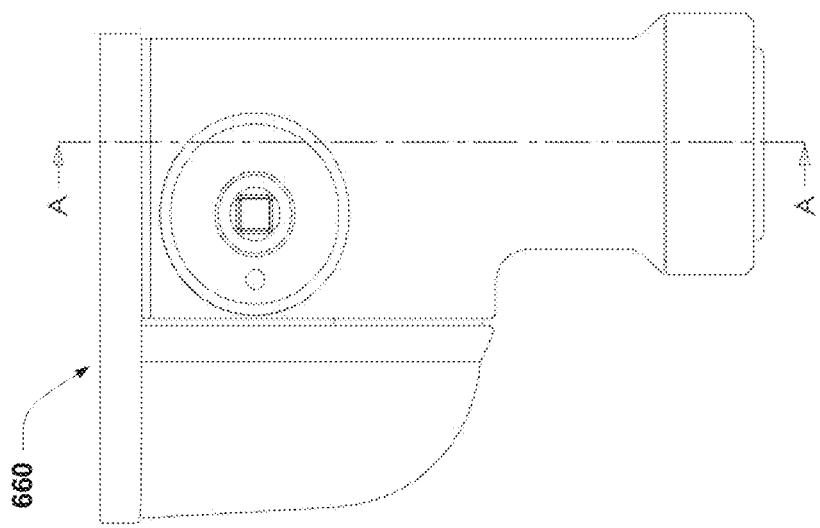
Figure 18D:
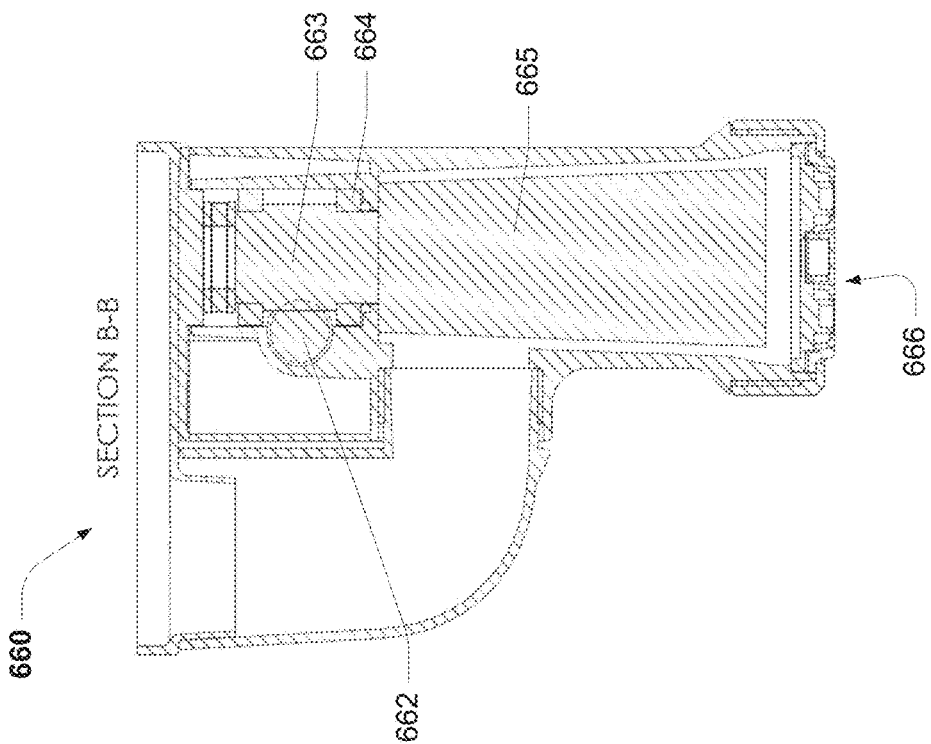
Figure 18C:
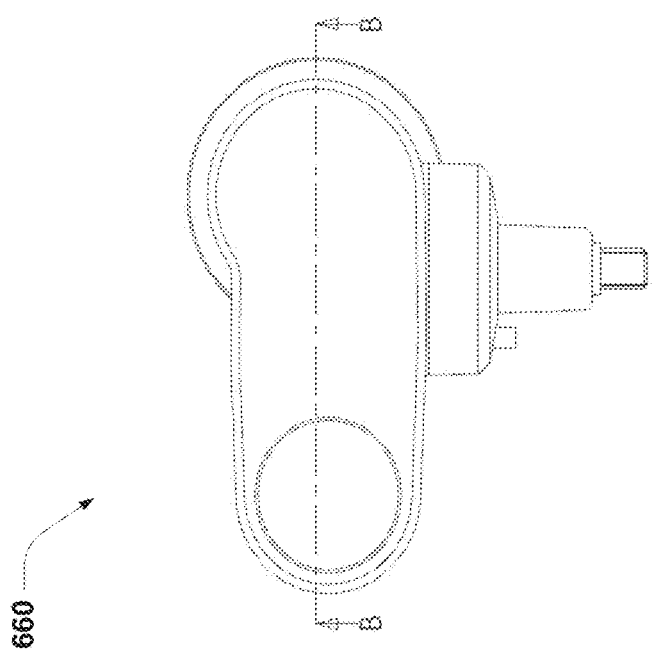

Referring to FIG. 18D, the embodiment drive train includes a main axle 662 coupled to a worm gear 663 (supported by a thrust bearing 664) and auger 665. A head assembly 666, includes a collar, die and screen.

FIG. 19 shows an embodiment construction 670, wherein the attachment 672 has one pin 673, and the bench mixer has two receiving holes on the mixer. Each hole corresponding to a specified orientation. The user selects which orientation they require and aligns the pin to that orientation.

It will be appreciated that the illustrated power outlet drive apparatus are suitable for use with a bench mixer appliance.

Motor Power Control Apparatus and Method

It will be appreciated that bench mixers typically have a small size universal motor (for example rated 350 W), wherein:

under low speed settings 1-3 with heavy load, the output speed can not be maintained.

under high speed setting with normal load, the output speed can not be maintained because of the limitation of motor torque capacity.

Motor size has to be carefully selected to minimise the risk that the motor rotor will lock under load, causing motor temperature to rapidly rise. Gearing can be damaged if unit runs on high speed setting with a high load.

Larger universal motors under low settings 1-3 with heavy load, the output speed can be maintained, but motor temperature can increases faster than a smaller motor under normal close loop speed control due to the motor input power being higher. This motor self heating rate is higher and motor efficiency is lower than small motor. The speed gap between the set low speed and the highest efficiency speed is greater than for smaller motor. For higher speed settings, motor temperature increased gradually within required temperature limit. Motor efficiency is higher. For higher speed setting with high load, the torque and speed generated by the motor can cause gear damage—for example strip gear teeth.

A universal motor, which is similar in size to a smaller motor, can not provide enough torque for low speed setting performance under heavy load with low motor temperature rise. Motor temperature rise is slower than large universal motor due to its smaller wattage rating. For high speed settings the motor can not provide enough torque to meet the setting speed under normal load.

A general universal motor control for a bench mixer can comprise one of two methods of motor speed close-loop control. These motor speed close-loop control methods are:

(a) Triac power (wattage) limiting driving circuit with a motor centrifugal switch providing speed feedback.

(b) Triac drive circuit with a hall-effect speed sensor providing speed feedback.

It will be appreciated that power limiting can be provided using Triac firing angle control.

Figures 20, 20A, 20B, 20C:
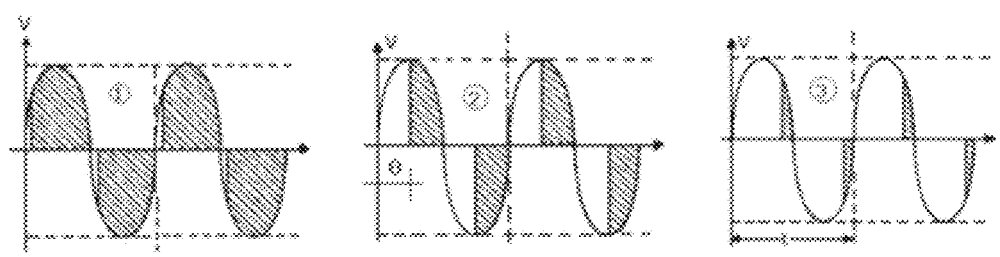
FIG. 20A-FIG. 20C show an output power waveform generated by selectively switching a Triac at different phase angle.

Referring to FIG. 20A through FIG. 20C, by selectively switching a Triac at different phase angle, average power (wattage) delivered to a motor can be controlled or set. The shaded area represents the power supplied to the motor (when the Triac is active). This selectively accesses a portion of an input power source AC waveform.

FIG. 20A shows a relatively small phase angle for selectively activating the Triac, switched on earlier after a zero crossing. It will be appreciated that the shaded area covers most sinusoidal voltage wave form 700—thereby providing a relatively high supplied/generated output power.

FIG. 20B shows a relatively intermediate phase angle for selectively activating the Triac, switched on at middle of two zero crossing. It will be appreciated that the shaded area covers half sinusoidal voltage wave form 702—thereby providing a relatively mid supplied/generated output power.

FIG. 20C shows a relatively large phase angle for selectively activating the Triac, switched on later after zero crossing. The shaded area covers relatively less sinusoidal voltage wave form 704—thereby providing a relatively low supplied/generated output power.

Referring to FIG. 21A through FIG. 21D, by using selective Triac AC wave chop control, average power (wattage) delivered to a motor can be controlled or set.

Figure 21A:
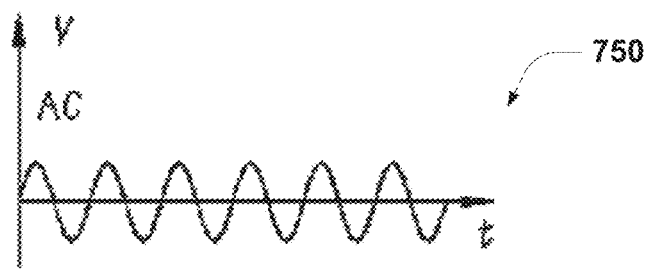
FIG. 21A-FIG. 21D, show an output power waveform generated by using selective Triac AC wave chop.

FIG. 21A shows a full AC voltage waveform 750. A processor module can detect an AC zero crossing, and switch on/off a Triac for one or more full half cycles of AC sinusoidal wave form.

Figure 21B:
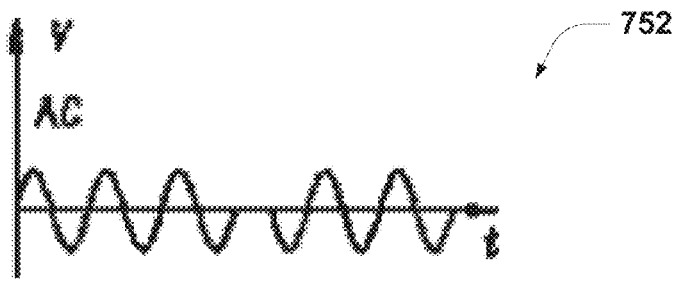

FIG. 21B shows an example voltage waveform 752 with a relatively low wave chopping—being one half cycle removed of total twelve half cycles, the wattage supplied by the voltage waveform has a relatively high value.

Figure 21C:
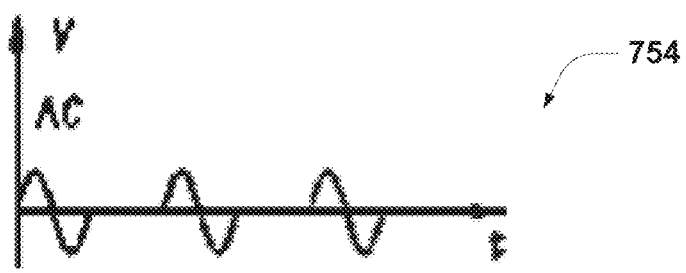

FIG. 21C shows an example voltage waveform 754 with 50% wave chopping—being six half cycles removed of total twelve half cycles, the wattage supplied by the voltage waveform has a relatively intermediate value.

Figure 21D:
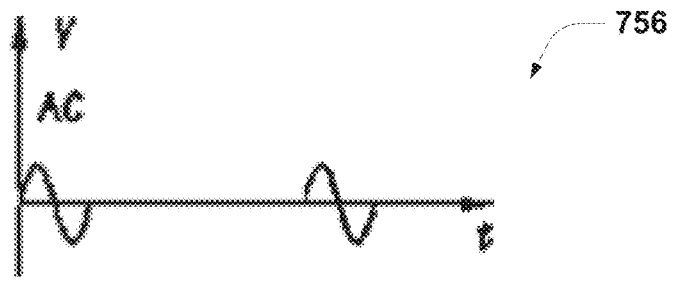

FIG. 21D shows an example voltage waveform 756 with a relatively high wave chopping—being eight half cycles removed of total twelve half cycles, the wattage supplied by the voltage waveform has a relatively low value.

An embodiment Triac power (wattage) limiting driving circuit with motor centrifugal switch as speed feedback is disclosed by way of example only. In this embodiment there are three levels of power limiting from the Triac driving circuit to limit the motor power to 80%, 75%, and 70%. The wattage percentage is done by the setting of Triac firing angle or switch on the Triac with a predetermined time delay after a zero-crossing of the a first half cycle of a supply AC sinusoidal wave.

80% can increase motor speed, if the motor speed is below the target speed.
85% will be used for target speed.
77% can decrease motor speed, if the motor speed is above the target speed.

A centrifugal switch can be used on the motor shaft to activate contact switches to set Triac wattage limiting level of the Triac driving circuit. With no switch contact, a motor will have 85% power to run the unit. With a first switch contact, a motor will have 80% power to run the unit. The distance between the centrifugal switch and the first switch contact will determine the unit output speed. With a second switch contact, a motor will have 75% power to run the unit.

It will be appreciated that a simple Triac driving circuit with mechanical speed setting to has less electronic component for speed control, but provides limited speed setting level and limited wattage adjusting level.

An embodiment Triac power (wattage) limiting driving circuit with a Hall-Effect speed sensor feedback is disclosed by way of example only. In this embodiment output speed is monitored by a hall-effect speed sensor. Wattage to the motor will be adjusted by the Triac through the comparison calculation from a control IC. Wattage adjustment can be provided by either Triac firing angle control or Triac AC wave form chopping. It will be appreciated that, under light load, minimum power will be applied to the motor to generate required torque—while under heavy load, full power will be applied to the motor to generate required torque and speed. In this embodiment, a motor can be full powered to utilise motor capacity and motor speed can be maintained as long as motor rating is sufficient. With a sufficient motor size, the unit output speed can be maintained for all speed settings. However, under heavy load at low speed settings, full power or near full power will be delivered to the motor, causing motor temperature to rises quickly (due to the low efficiency under low speed with high torque output). Under high speed setting with low speed setting, for loads such as dough mixing, the torque and speed generated by the motor causes gear damage.

An embodiment motor power control apparatus and method for the motor driving Triac comprises setting different wattage limitations applied to the motor for each of a plurality of speed settings, which is used to achieve high unit speed output, overcome motor fast temperature rise under heavy load at low speed setting, and overcome unit gear damage under high speed setting with low speed setting load.

Wattage limitation are established by setting/predefining a minimum firing angle of the Triac as controlled by a processor module, with a hall-effect speed sensor as speed feedback. Triac firing angle can be adjusted above the minimum angle according to the unit output speed reference to the set target speed of a speed setting. Alternatively, wattage limitation can be established setting/predefining a maximum number (or percentage) of half AC cycles enabled (for example, across a plurality of AC cycles). The remaining half AC can then be enabled or disabled according to the unit output speed reference to establish a set target speed for a speed setting.

It will be appreciated that, a wattage limitation can be set just above normal load wattage requirement for unit speed and torque output. Under light load and normal load, the motor can runs to a minimum amount of power, taking a longer time to reach a temperature limit. Typically, this time for reaching a motor temperature limit is set as a maximum running time for a respective speed setting. Under heavy load, a motor can require maximum power to reach the required speed, with the wattage limiting, the control limits the motor capacity to reach the target speed while enabling the motor to operate relatively longer before reach a temperature limit.

It will be appreciated that, a wattage limitation can be set just below normal load wattage requirement for unit torque output after recipe time. After recipe time, unit no longer needs to deliver the set load torque, but needs to maintain operation. With this further wattage limitation, the unit can last longer before reaching its motor temperature limit.

Figure 22:
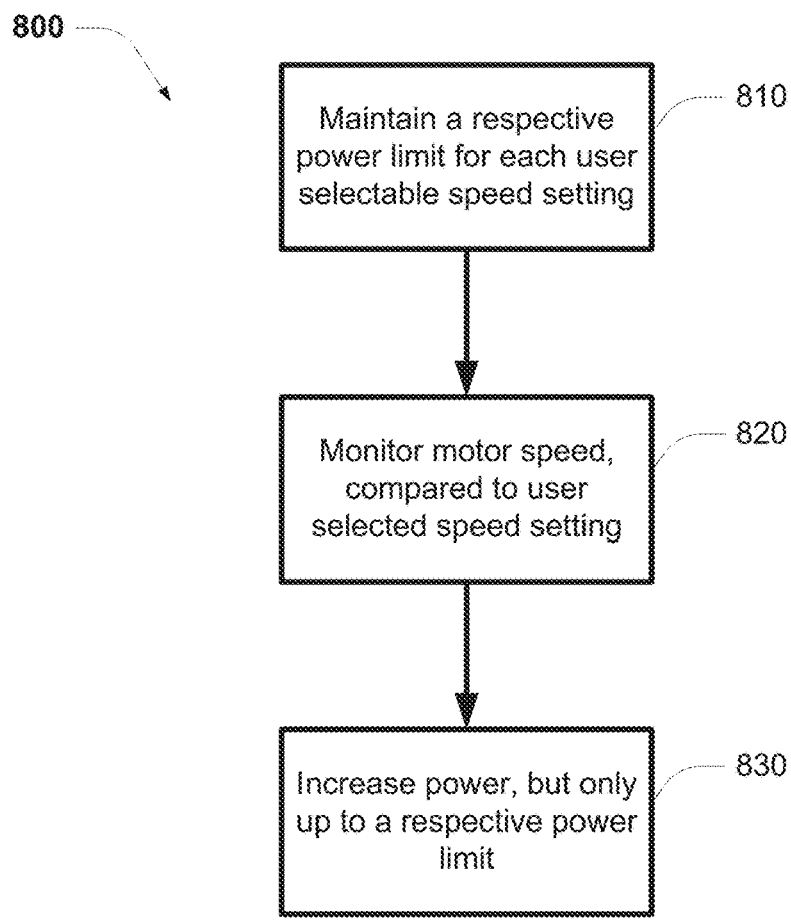
FIG. 22 shows a flowchart for a method of motor power control.

FIG. 22 shows a flowchart 800 for a method of motor power control. The method comprising the steps of:

STEP 810: maintaining data indicative of a respective power limit to be applied to a motor for each of a plurality of user selectable speed setting;

STEP 820: monitoring motor speed, comparing against the user selected speed setting;

STEP 830: if the current speed is lower than the user selected speed setting, increasing power applied to the motor, up to a respective power limit.

Figure 23:
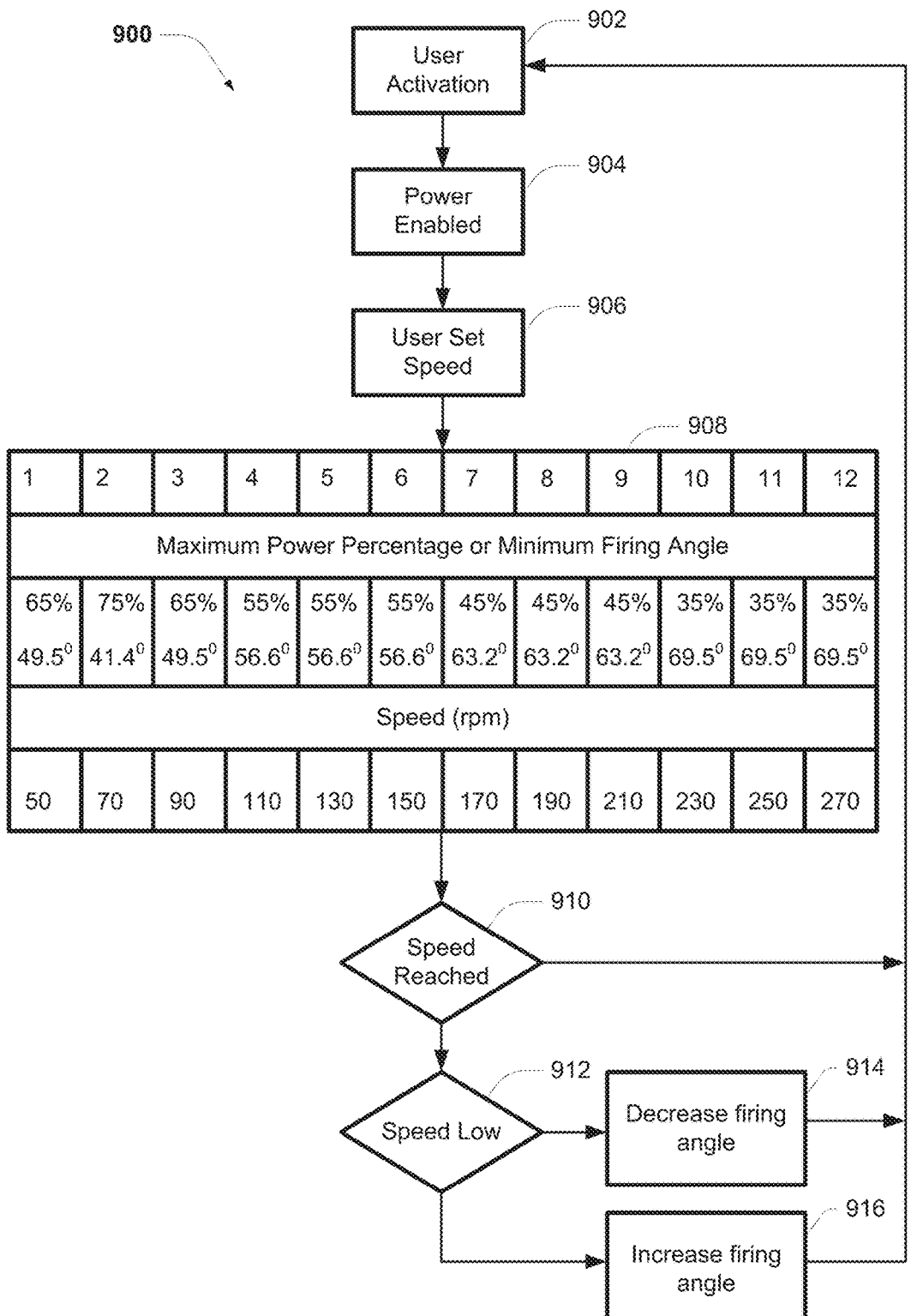
FIG. 23 shows a flowchart 900 for a method of motor power control.

FIG. 23 shows a flowchart 900 for a method of motor power control. The method comprising the steps of:

STEP 902: the device is enabled by the user;

STEP 904: the device has power enabled;

STEP 906: Identify a user set speed.

STEP 908: upon identification of the user selected speed setting (for example from '1'—low speed to '12'-high speed, determine a respective minimum firing angle or maximum wattage limit;

STEP 910: monitor speed setting—if the device is operating that the set speed, return to STEP 902 to continue monitoring user selected speed; is the device is not operating at the set speed, continue to STEP 912;

STEP 912: identify is the device speed is lower than the set speed, if lower continue to step 914; otherwise continue to STEP 916;

STEP 914: decrease the firing angle—but not less than the previously determined' minimum firing angle (for increasing motor speed), return to STEP 902 to continue monitoring user selected speed;

STEP 916: increase the firing angle (for decreasing motor speed), return to STEP 902 to continue monitoring user selected speed;

It will be appreciated that, if a user does not change the speed setting, the same target speed will be monitored to tune the Triac firing angel to increase/decrease motor speed toward the target unit output speed. Under heavy load, if the speed can not meet the target speed, the firing angle can not be reduced below the minimum limit to protect gear and prevent motor over heat during the operation.

The speed setting is determined by different mixing performance from dough mixing or cake mixing at heavy load low speed mixing to egg white mixing at light load high speed mixing. There are four speed bands from heavy load to light load: band 1—fold knead (speeds 1, 2, 3), band two—light mix (speeds 4, 5, 6), band 3—cream beat (speeds 7, 8, 9), and band four Aerate Whip (speeds 10, 11, 12).

The phase angle can be pre-determined for controlling lower motor temperature rise and maximum capability of the gear assembly under one speed setting.

For example, at band one:
motor temperature rise is recorded under most heavy dough load under no wattage limit, 75% wattage limit, 65% wattage limit, and 55% wattage limit.
based on the time duration for the motor to reach 120° C. from 25° C., find the wattage percentage control with the longest duration.
65% wattage limit is chosen as this provides the longest time duration for motor to reach its temperature limit.
further decreasing the wattage percentage limit may increase the change of motor lock rotor to heat up motor more quickly.
After recipe time, wattage percentage limit may be further reduced below 65% to keep motor running while reducing motor heating.
gear assembly can handle the maximum load and speed setting as speed is slow.

For example, at band two:
motor temperature rise is recorded under most heavy dough load under no wattage limit, 75% wattage limit, 65% wattage limit, and 55% wattage limit.
based on the time duration for the motor to reach 120° C. from 25° C., find the wattage percentage control with the longest duration.
75% wattage limit is chosen as this provides the longest time duration for motor to reach its temperature limit. A higher wattage limit reference to band one allows better cooling for the motor.
After recipe time, wattage percentage limit may be further reduced below 65% to keep motor running while reducing motor heating.
Gear assembly can handle the maximum load and speed setting as speed is slow.

For example, at band three:
gear assembly cannot handle the heaviest dough recipe under no wattage limit and 75% wattage limit.
motor temperature rise is recorded under most heavy dough load under 65% wattage limit, and 55% wattage limit.
based on the time duration for the motor to reach 120° C. from 25° C., find the wattage percentage control with the longest duration.
65% wattage limit is chosen as this provides the longest time duration for motor to reach its temperature limit, and provides increased driving torque comparing to 55% wattage limit.
After recipe time, wattage percentage limit may be further reduced below 65% to keep motor running while reducing motor heating.

For example, at band four:
motor temperature rise is recorded under most heavy dough load under 65% wattage limit, 55% wattage and 45% wattage limit.
based on the time duration for the motor to reach 120° C. from 2543° C., find the wattage percentage control with the longest duration.
45% wattage limit is chosen as this as this provides the longest time duration for motor to reach its temperature limit and it presents a greater driving torque comparing to 55% wattage limit.
After recipe time, wattage percentage limit may be further reduced below 65% to keep motor running while reducing motor heating.

Referring to FIG. 23, by way of example only:
for setting 1, with the firing angle set at 49.5° a motor has only about 65% of full average power, which can be sufficient for the unit normal operation for its speed and torque capacity. Under abnormal heavy load, as less power into the motor, the motor temperature rises is slowed (e.g. 12 minutes) compared to no power limit (e.g. 5 minutes).
for setting 2 with the firing angle set at 41.4° a motor has only about 75% of full average power, which can be sufficient for the unit normal operation for its speed and torque capacity. Under a maximum dough recipe load, as less power into the motor, the motor temperature rises is slowed (e.g. 41 minutes) compared to no power limit (e.g. 10 minutes)
For setting 3 with the firing angle set at 49.5° a motor has only about 65% of full average power, which is enough for unit normal operation for its speed and torque capacity.

Under abnormal load (e.g. maximum dough recipe load) gear breakage, can be reduced, and the motor temperature well kept below its respective limit for the units maximum running time.

It will be appreciated that, for higher speed setting from 4 to 12, further power (wattage) limits can be applied to prevent gear damage and motor over temperature.

It will be further appreciated that, a relatively larger motor size (e.g. 550 W) can be selected for a bench mixer. Advantages can include any one or more of the following:
  improvement in motor running time;
  reduced risk of gear damaged for inappropriate setting of the speed under heavy load;
  maintaining required unit output speed and torque under normal operation load;
  enable utilising of a larger capacity motor while limiting torque if used for abnormal heavy load—reducing the risk of a rotor lock condition;
  improved cost effectiveness when compared to using a high torque small size motor.

A universal motor can be controlled as discussed above, to take advantage of improved/reduction in motor temperature rise, and reducing the risk of unit gear damage on high speed setting.

Figure 24:
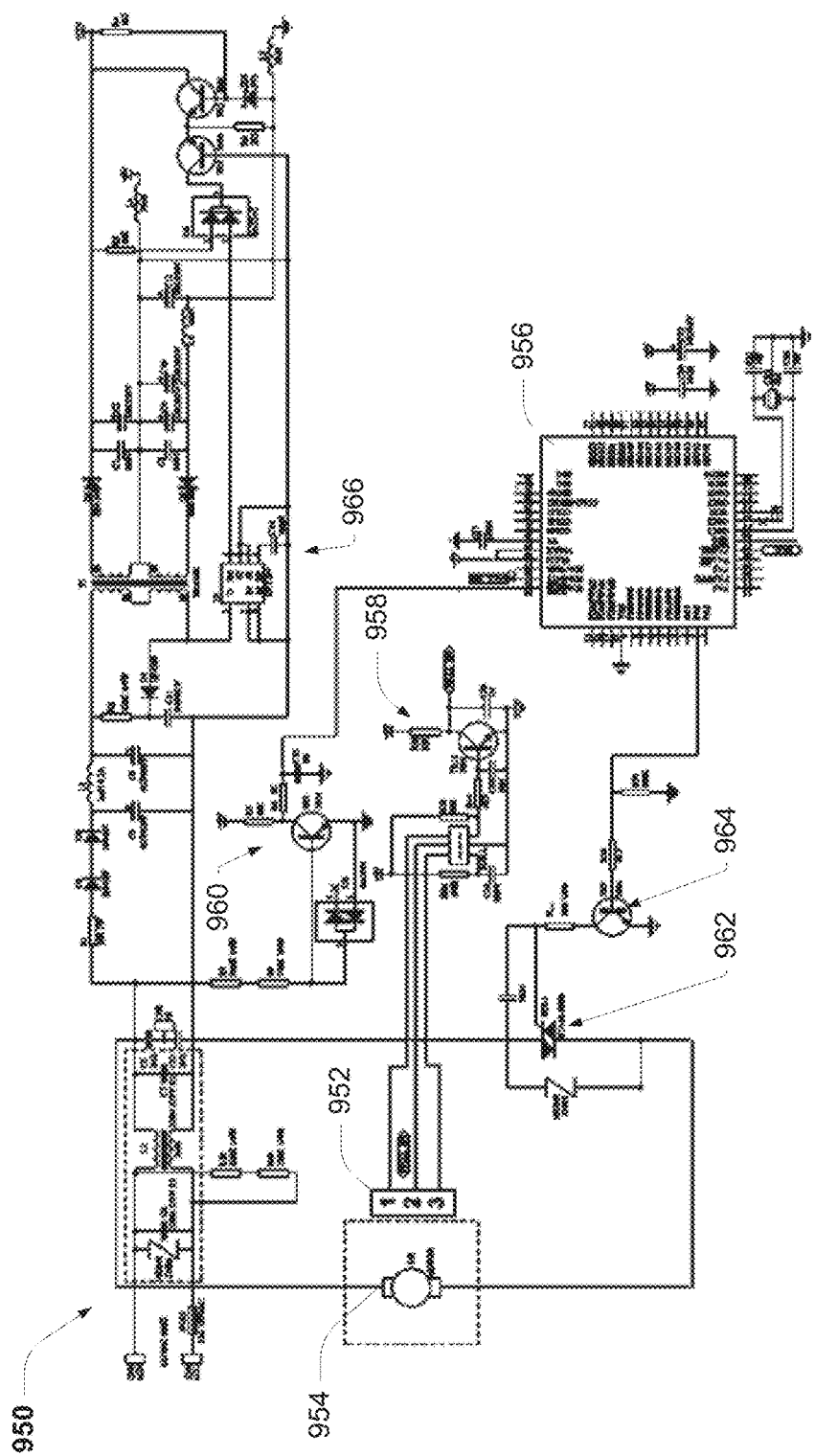
FIG. 24 shows a schematic diagram of a Triac power (wattage) limiting driving circuit.

FIG. 24 shows a schematic diagram of a Triac power (wattage) limiting driving circuit 950 with a hall-effect speed sensor providing speed feedback. The hall-effect sensor 952 monitors a magnet disc on the motor shaft 954 to detect motor speed, and provides a speed signal to a processor module 956 (through TR11 958).

An AC zero crossing signal is provided to the processor module 956 (through TR3 960). A Triac 962 is controlled (switched on/off) by processor module 956 (through TR7 964), which provides power to the motor. A switch mode power supply IC 966 generate DC 12V and 5V.

It will be appreciated that the illustrated motor power control apparatus and method are suitable for use with a bench mixer appliance.

Figure 25:
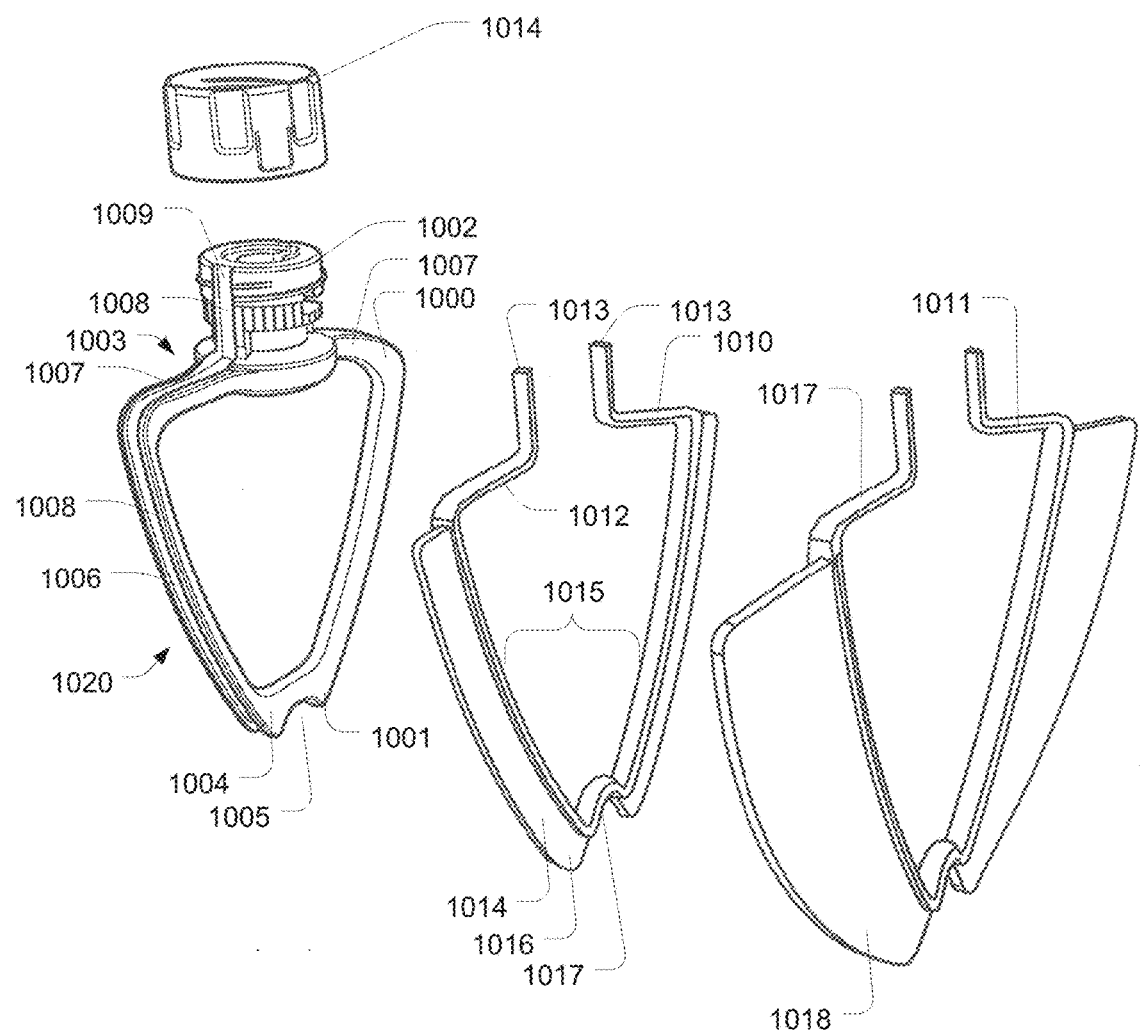
FIG. 25 is a perspective view of a mixer attachment having an accessory frame and two separate accessories.

FIGS. 25-35 illustrate various embodiments of mixer attachments that use interchangeable working components operating in conjunction with a common accessory frame. As shown in FIG. 25, an accessory frame 1000 comprises a rigid yoke 1001 that is affixed to or integral with a hub 1002. The hub 1002 is adapted to be attached to the output spindle of a mixer. In this example, the frame 1000 is wider at the top 1003 than at the bottom 1004. The lower terminal portion of the frame comprises a concave or notch 1005. In this example, the frame 1000 has two descending limbs 1006. The limbs are attached to the hub 1002 by a pair of cross-members 1007. In preferred embodiments, a continuous groove 1008 follows and conforms to the exterior surface of the hub 1002, each of the cross-members 1007, each of the limbs 1006 and the concave 1005. The groove is preferably centred between the sides of each of the cross members, limbs and concave. As shown in FIG. 25, the terminal portions 1009 of the groove 1008 extend at least partially if not completely along the vertical length of the hub 1002. The groove 1008 is adapted to receive any one or a number of accessories or accessory blades 1010, 1011. As shown in FIG. 25, one accessory 1010 comprises a body 1012 that is adapted to fit into the groove 1008. The body 1012 terminate in a pair of generally parallel extension 1013 that fit within that portion of the grooves which extends along the hub 1002. The extensions 1013 are retained by a threaded cap 1014 that screws over cooperating threads formed on the hub 1002. In this way, the accessory 1012 is immobilised and confined to the groove 1008. A first accessory has, for example, narrow width flexible or rigid blades 1014 that extend along each lateral edge 1015 of the accessory but do not occupy that portion of the accessory corresponding to the cross-members 1007 or the concave 1005. Each narrow blade 1014 terminates in a rounded tip 1016. The rounded tip 1016 extends below the lower most part of the accessory's body and thus, below the lost part of the concave portion 1017 that fits into the concave section 1005 of the groove 1008. A second accessory 1017 also has a body that fits within the groove and conforms to its shapes, but features a pair of wide, flexible or rigid scraping blades 1018. The blades 1018 are wider than the blades 1014. Thus, a single mixer attachment 1020 can accept two different accessories, each with a different width blade or different blade configuration.

Figure 26:
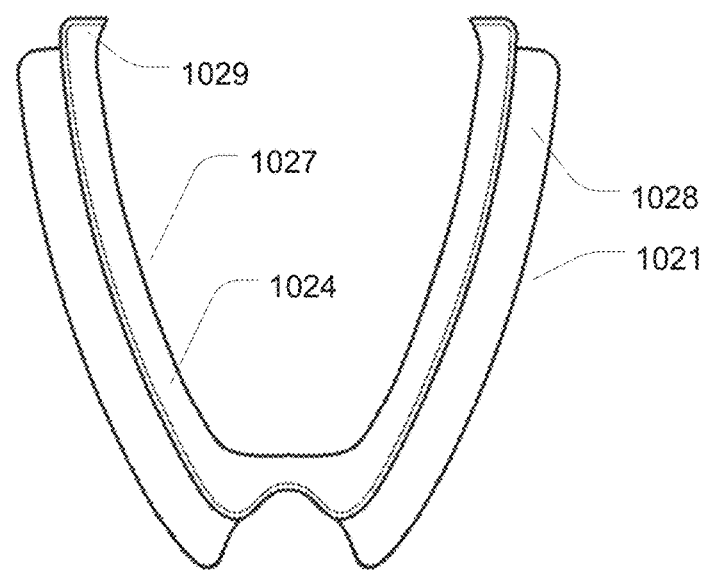
FIG. 26 is a front elevation view of an accessory for an accessory frame.
Figure 27:
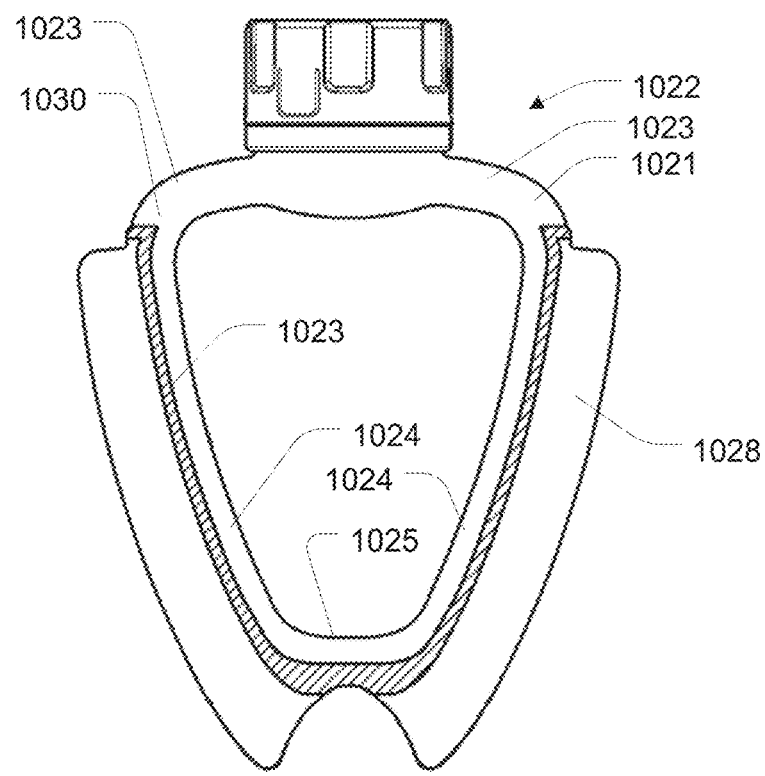
FIG. 27 is a front elevation of the accessory of FIG. 26 attached to an accessory frame.
Figure 28:
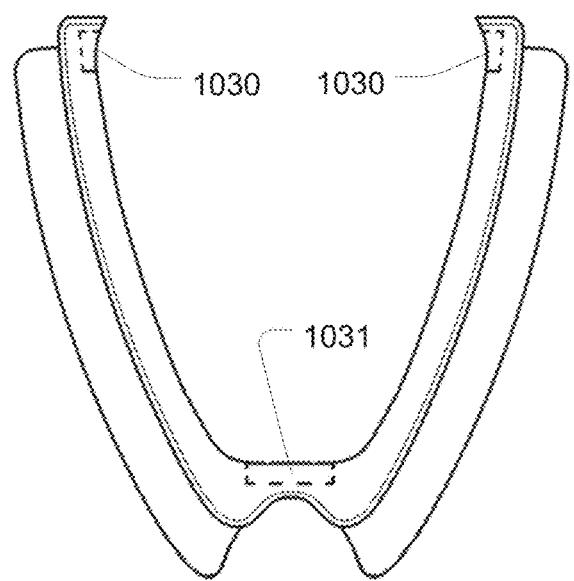
FIG. 28 is another embodiment of an accessory.
Figure 29:
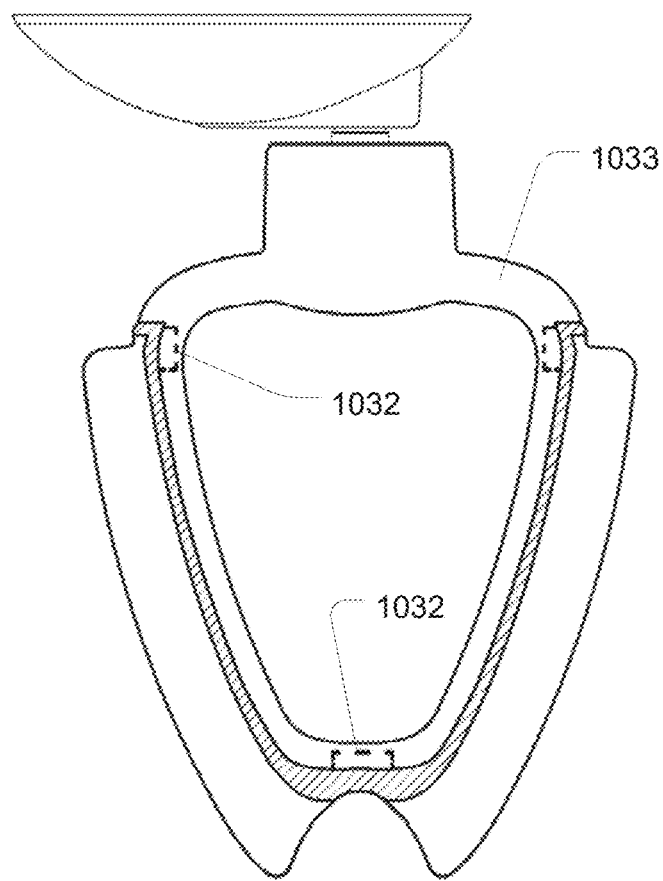
FIG. 29 is a front perspective view of an accessory and accessory frame having magnetic attraction.

An alternate way of joining an accessory to an accessory frame 1021 of a mixer attachment 1022 is shown FIGS. 26 and 27. In this example, the construction of the accessory frame 1021 is similar to that depicted in FIG. 27, but the receiving groove 1023 for the accessory need not extend across the cross-members 1023 as suggested by FIG. 27, the medial groove in the accessory frame extends along both limbs 1024 and across a lower segment 1025 of the accessory frame. As shown in FIG. 26, the accessory 1027 is generally U shaped and has flexible or rigid scrapper blades 1028 formed on the exterior surfaces of each of the side edges 1024. Each side edge or limb 1024 has an upper termination 1029. In this example, the upper terminations 1029, clip into a cooperating region of the accessory frame 1030 (as shown in FIG. 27). Thus, the accessory is retained by an interlocking action, clipping action or friction. As suggested in FIGS. 28 and 29, the aforementioned means of attachment of the accessory to the accessory frame can be enhanced by or essentially replaced by magnetic attraction. As shown in FIG. 28, either magnets or steel inserts 1030 can be formed into, for example, the upper extent of each of the lateral sides of the accessory or alternately imbedded, moulded into or inserted into a lower portion of the accessory located between the side edges 1031. As shown in FIG. 29, the accessory frame has complementary magnet or steel inserts 1032 imbedded, inserted or moulded into corresponding locations so as to retain the insert in the outward facing peripheral groove formed on the accessory frame 1033.

As shown in FIGS. 30-33, the bond between a scrapping blade of an accessory 1040 and the accessory substrate 1041 to which it is permanently attached can be enhanced by providing an array of pins 1042 to be formed integral with or moulded into the substrate in the area of interconnection between the substrate 1041 and the blade 1040. In this example, the array comprises equally spaced protruding pins 1042 that are located within a channel 1043. In this example, the substrate is a relatively rigid polymer such as copolymer TRITAN™ and the blade 1040 is over-moulded to the copolymer substrate using, for example, food grade elastomer such as a Hi-Tril™ (Santoprene). As suggested by FIGS. 30 and 31, the accessory body may be attached to the accessory frame 1001 in the manner suggested by FIGS. 26-29. In the alternative, but not limited to this alternative, the accessory body 1044 may be attached to the accessory frame 1045 in the manner suggested by FIG. 27.

Figure 31A:
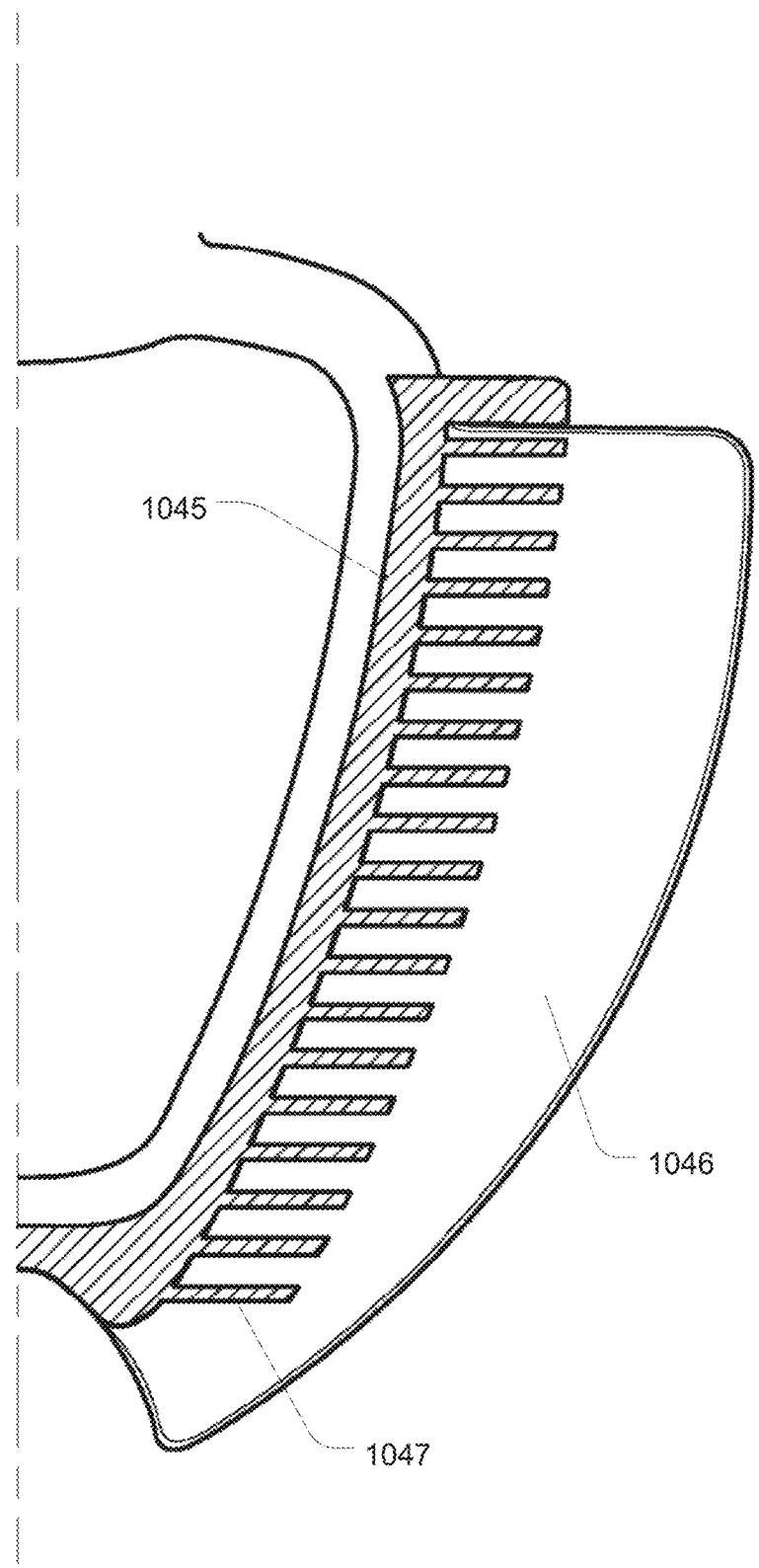
FIG. 31A is a front elevation of an accessory, partially sectioned.
Figure 32:
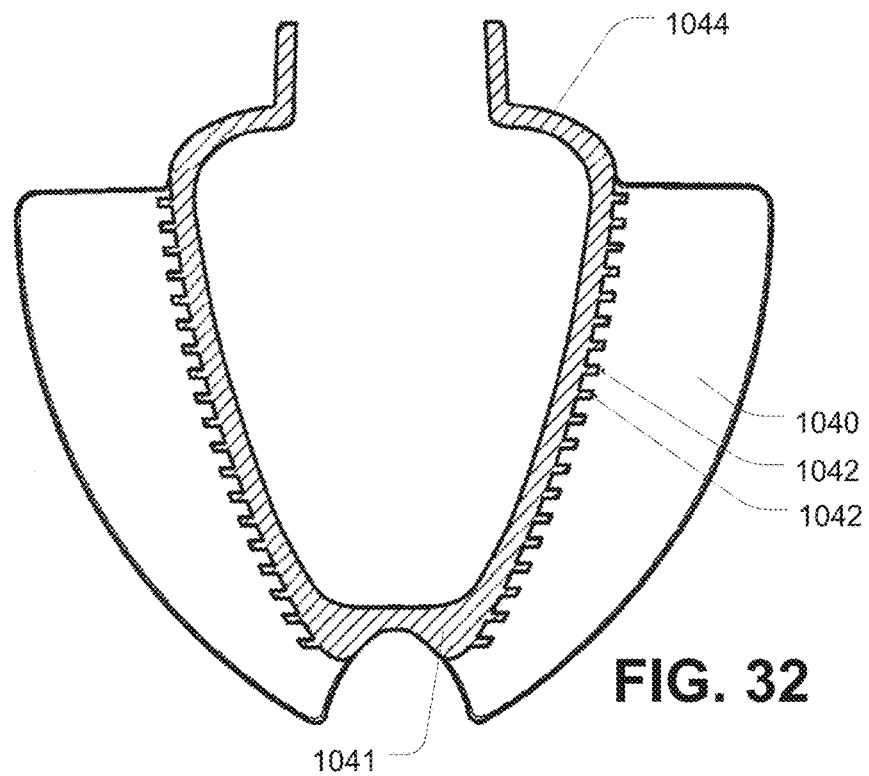
FIG. 32 is a cross sectional view of an accessory having scraper blades.
Figure 33:
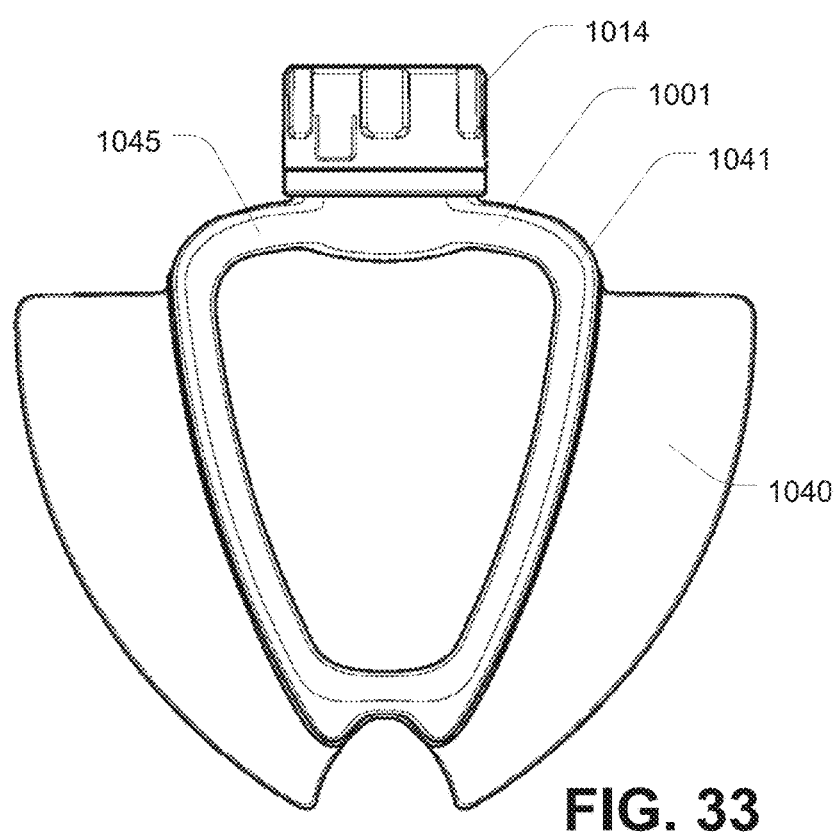
FIG. 33 is a front perspective view of an accessory shown in FIG. 32, mounted onto an accessory frame having a hub.

As shown in FIG. 31 (a), the attachment between the accessory body 45 and its over-moulded scrapper blade 1046 can be further improved by making the pins 1047 in the array of pins, extend further into the extent of the blade 1046. In this example, the pins 1047 extend into the blade 1046 by approximately one third, the maximum width of the blade 1046.

Figure 34:
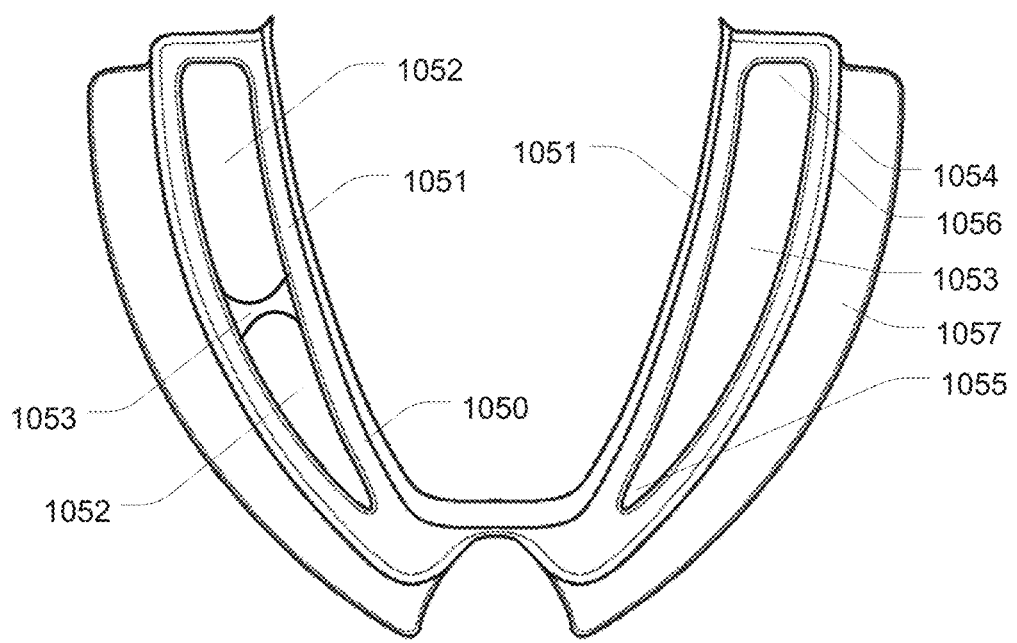
FIG. 34 is a front elevation of an accessory having a scraper blade and through openings.
Figure 35:
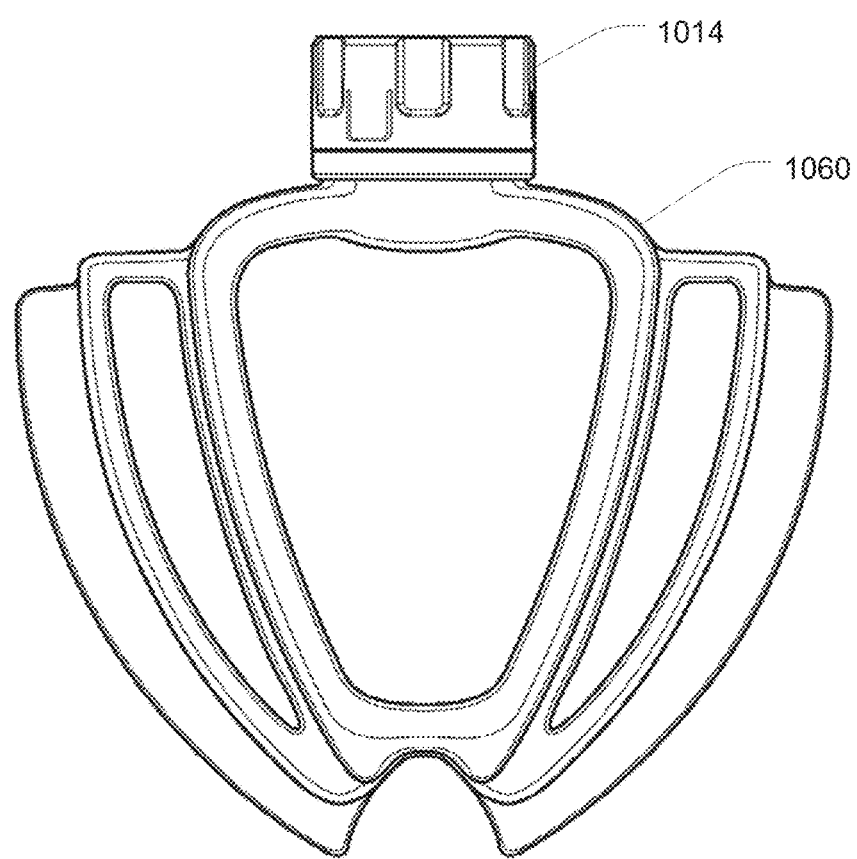
FIG. 35 is a front elevation of an attachment having an accessory frame, accessory and hub.

As shown in FIGS. 34 and 35, another style accessory can be received in the accessory frame of a mixer attachment in the manner previously suggested by FIG. 25 and FIGS. 26-29. FIG. 34 suggested a generally 'U' accessory body 1050 that is adapted to cooperate with an accessory frame as disclosed with reference to FIGS. 26-29. In may be used with or without magnet attraction features. In this example, the accessory body comprises interconnected sides 1051, each side having at least one through opening 1052, 1053. In the example of the single through opening 1053, the opening extends along the bulk of the length of the side 1051 of the accessory body. The opening 1053 is wider at the top 1054 than it is at the bottom 1055. The outermost limb 1056 of the side 1051 has an outer surface to which is attached a rigid or flexible blade 1057, as previously described. In the alternative, a side of an attachment body can feature one or more through openings 1052 that are divided from each other by transverse webs 1053. In the example of FIG. 35, the accessory body 1060 has upright terminal extensions similar to the examples of FIG. 25 that are retained by a tap 1014, threaded or otherwise.

Figure 36:
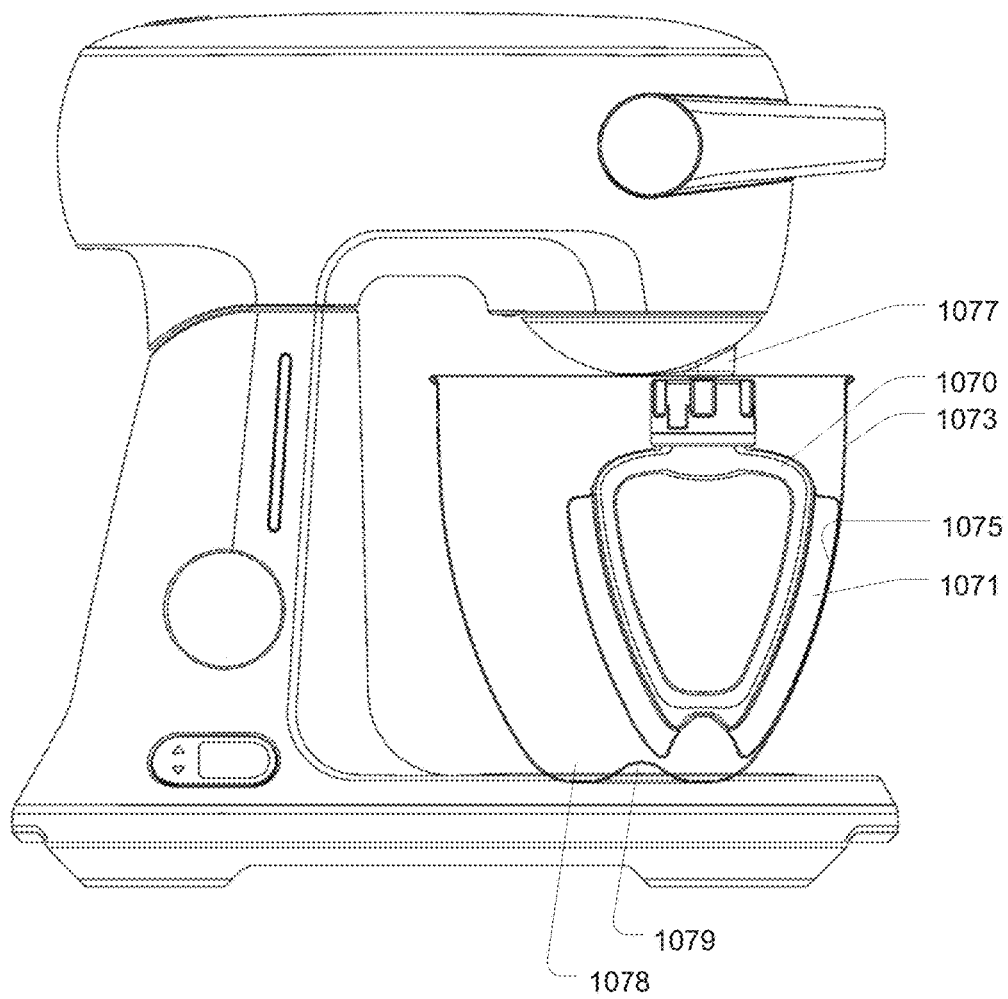
FIG. 36 is a side elevation of a planetary mixer, bowl and attachment, with the bowl sectioned to reveal the attachment.
Figure 37:
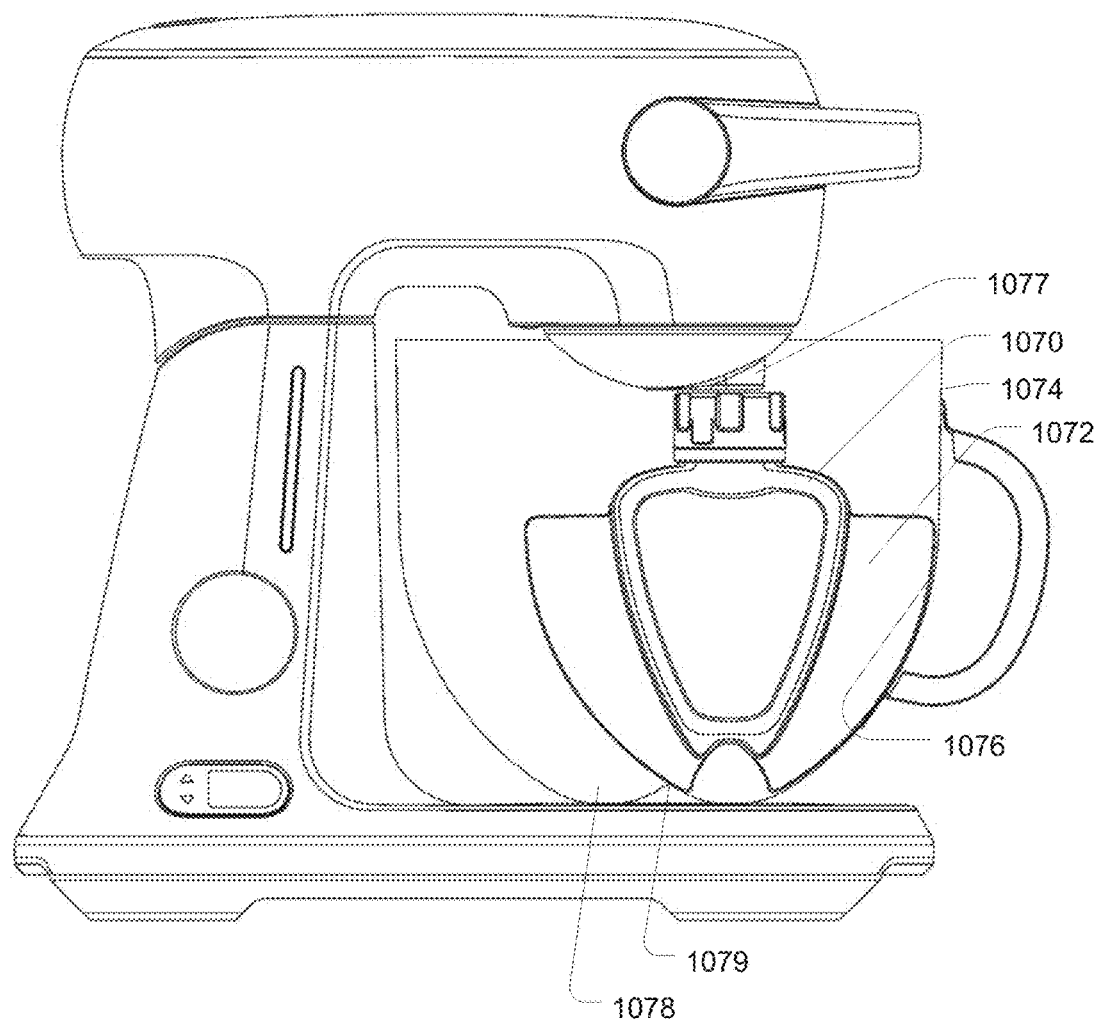
FIG. 37 is a side elevation of a planetary mixer, bowl and attachment, with the bowl sectioned to reveal the attachment.

As shown in FIGS. 36 and 37, the teachings provided by way of FIGS. 25-35 allow for a single mixer accessory frame 1070 to accommodate accessory scrapping blades 1071, 1072 of two different widths. This allows a single accessory frame 1070 to be used in conjunction with two different mixing bowls, each having a different effective diameter 1073, 1074. With respect to each size mixing bowls 1073, 1074, the lateral edges of each blade 1075, 1076 are in close proximity, in line contact with, or otherwise in intimate contact with the interior sides of its respective bowl along substantially the entire length of the blade 1071, 1072. In the examples of FIGS. 36 and 37, the mixer attachment comprising the accessory frame 1070 is used in conjunction with an output spindle 1077 having a planetary mixing action. The planetary mixer depicted in FIGS. 36 and 37 is used in conjunction with a specially adapted bowl having a through at the bottom of the bowl 1078 characterised by a central high point 1079.

Figure 38:
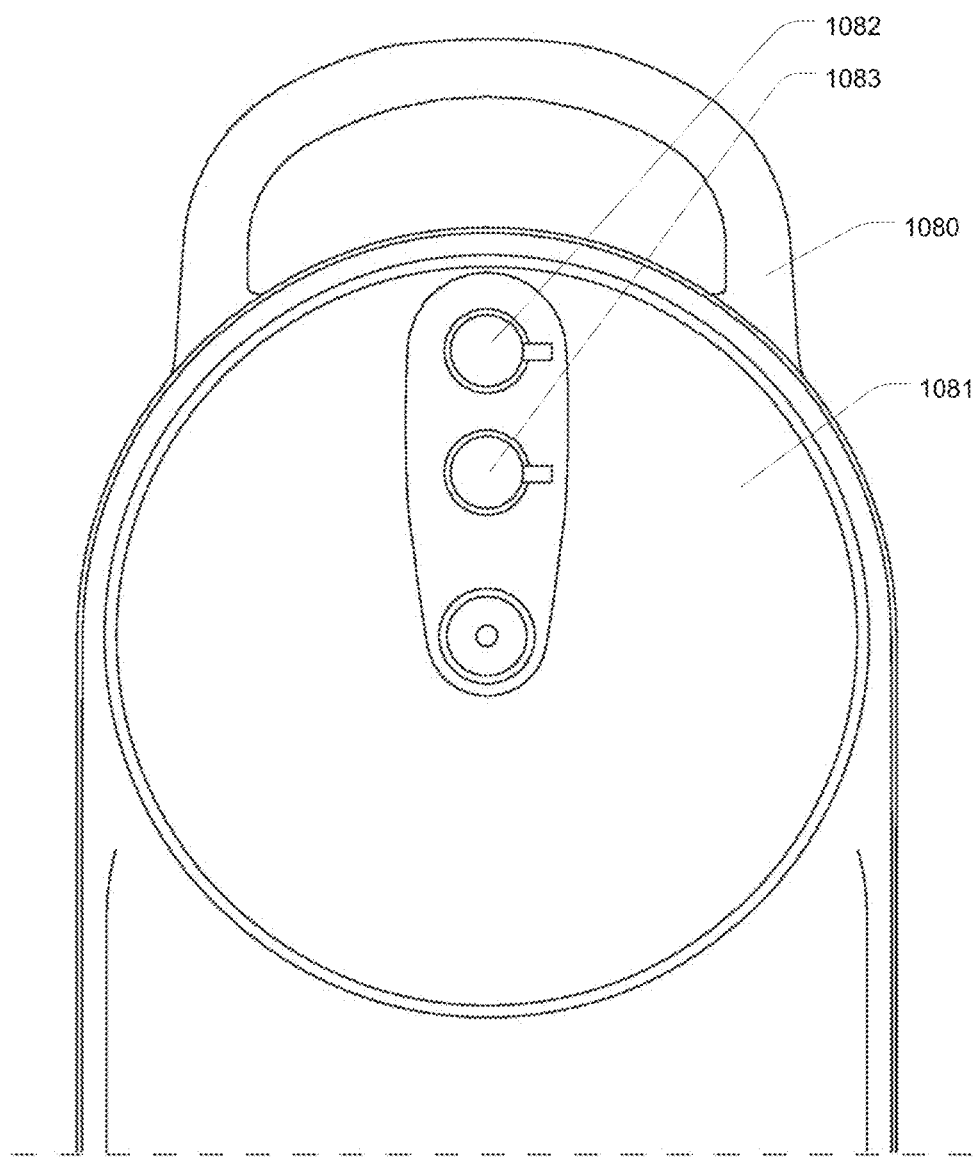
FIG. 38 is an underside plan view of a planetary head of a mixer having two output spindles.

As previously mentioned, the teaching of the present specification pertains primarily to planetary type bench mixers. As shown with more particularity in FIG. 38, a planetary mixer 1080 has a rotating head 1081 through which protrudes, at least one rotating output shaft or spindle 1082. As will be discussed below, the present technology contemplates a planetary mixer head having one or more rotating output spindles 1082; 1083.

Figure 39:
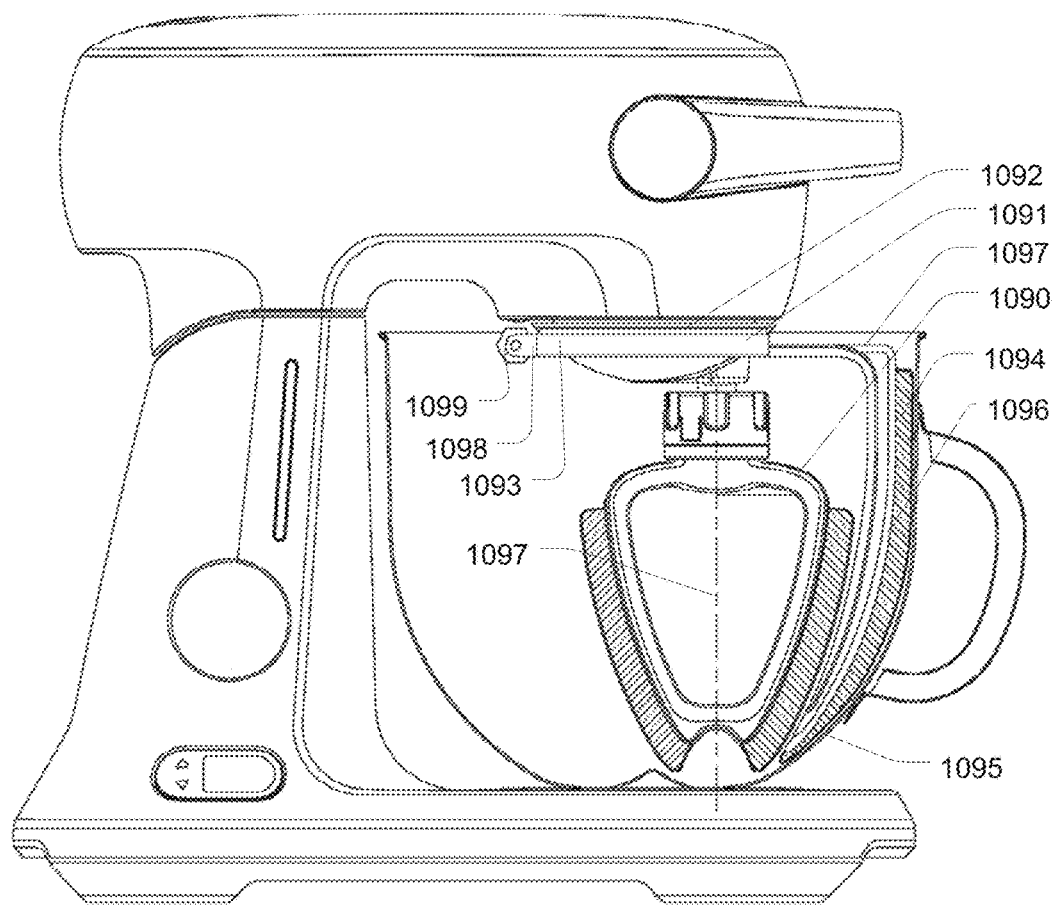
FIG. 39 is a side elevation of a planetary mixer and attachment, with the bowl partially sectioned to reveal the attachment and a secondary attachment that is affixed to the planetary head.
Figure 40:
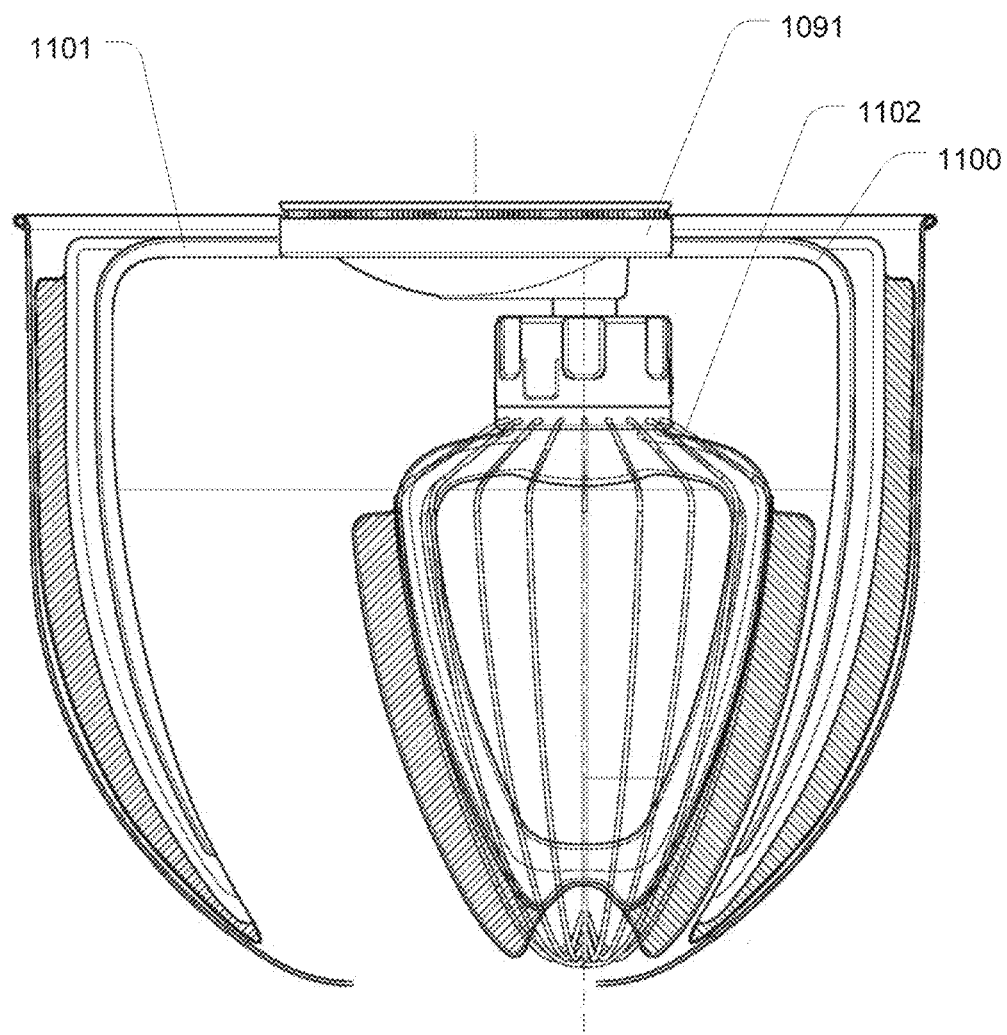
FIG. 40 is a cross sectioned view of a mixing bowl and planetary head illustrating a whisk and scraper attachment used in conjunction with a secondary accessory affixed to the planetary head.

As shown in FIGS. 39 and 40, in addition to the primary mixing attachment 1090 (being a mixing, scrapping or whisk attachment etc), a secondary scrapping accessory 1091 may be affixed to the rotating planetary head 1092. In the examples of FIGS. 39 and 40, the secondary accessory 1091 is carried by a yoke or collar 1093 that clamps, snaps on to or is otherwise affixed to the rotating head 1092 without interfering with the action of the primary accessory 1090. In the example of FIG. 39, the accessory comprises a secondary scrapper blade 1094 that is attached to the collar or yoke 1093. The secondary scrapper blade 1094 is configured to make line contact or intimate contact with the interior surface of a cooperating mixing bowl 1095. The blade portion of the secondary accessory comprises a generally vertical and curved substrate 1096 to which the working part of the scrapper blade 1094 is attached. This substrate 1096 is preferably attached to a horizontal arm 1097 that is attached to or formed integrally with the clamping collar 1093. In some embodiments, the collar 1093 is split and the adjacent terminal portions 1098 are affixed to one other with a fastener 1099 that can be tightened or loosened to install or remove the secondary accessory. Thus, the primary accessory 10 will follow a circular orbit about the vertical centre line of the bowl 1095 simultaneously having a second rotational movement about the longitudinal access 1097 of the attachment 1090. As suggested by FIG. 40 the attachment yoke or collar 1091 can have two or more accessory blades 1100, 1101 attached to it, preferably the blades being equally spaced from one another. In this example, the secondary scrapper or scrappers 1100 1101 are used on conjunction with a whisk attachment 1102 carried by one of the mixer's output spindles.

Figure 41:
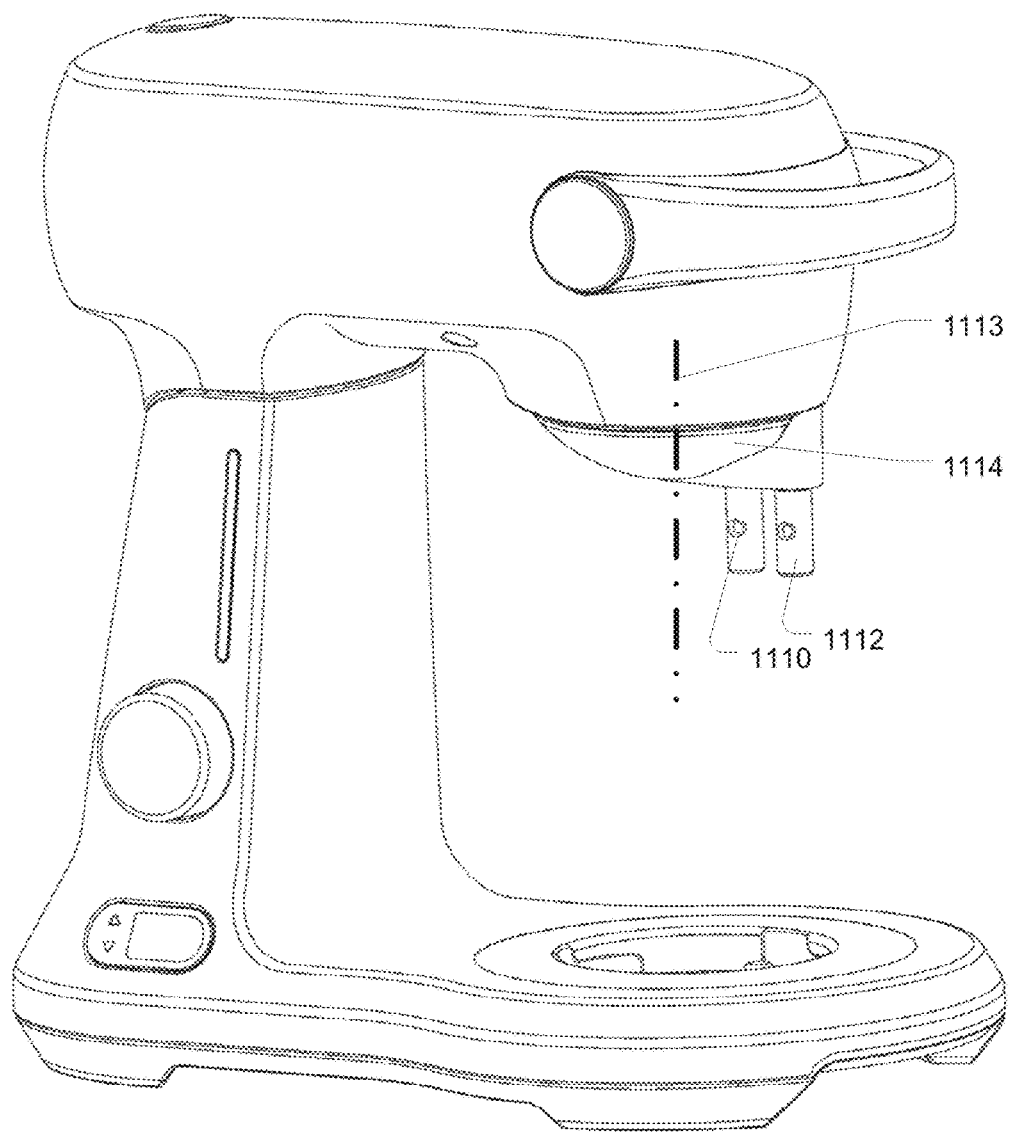
FIG. 41 is a perspective view of a planetary mixer showing two separately rotating output spindles.
Figure 42:
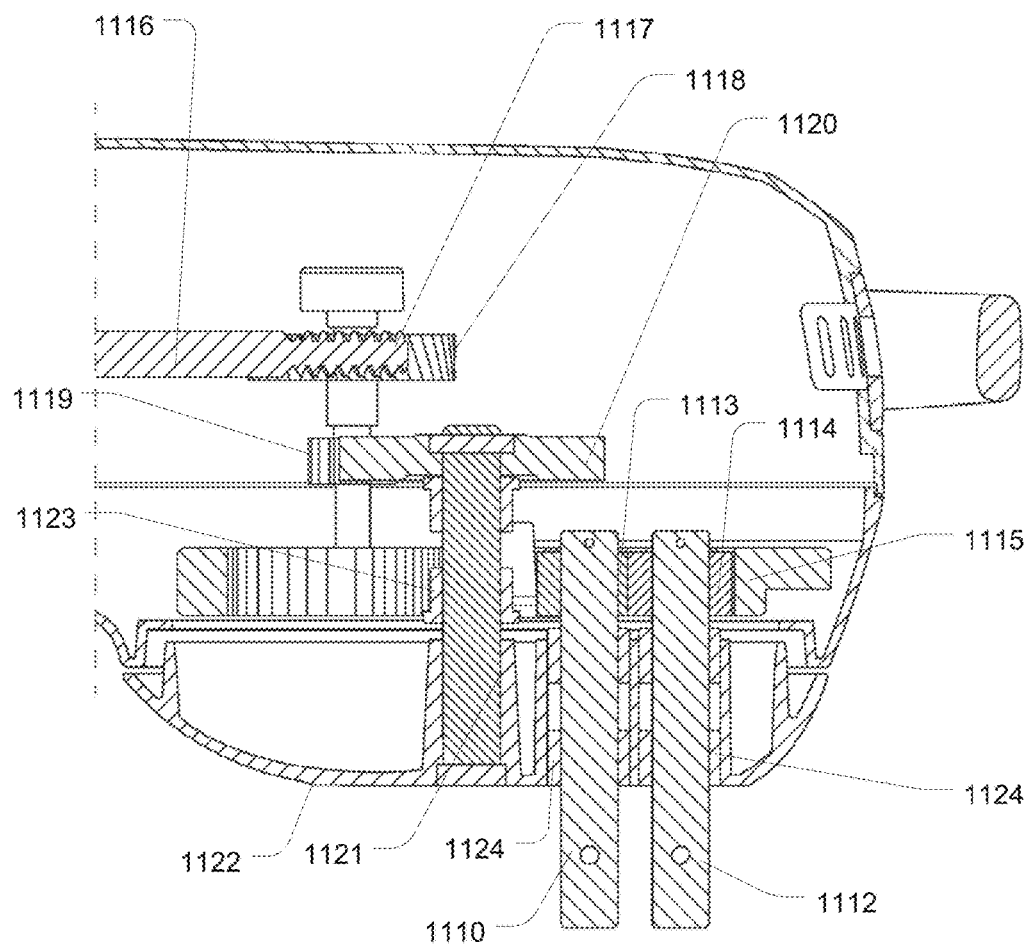
FIG. 42 is a cross section of the planetary head depicted in FIG. 41.
Figure 43:
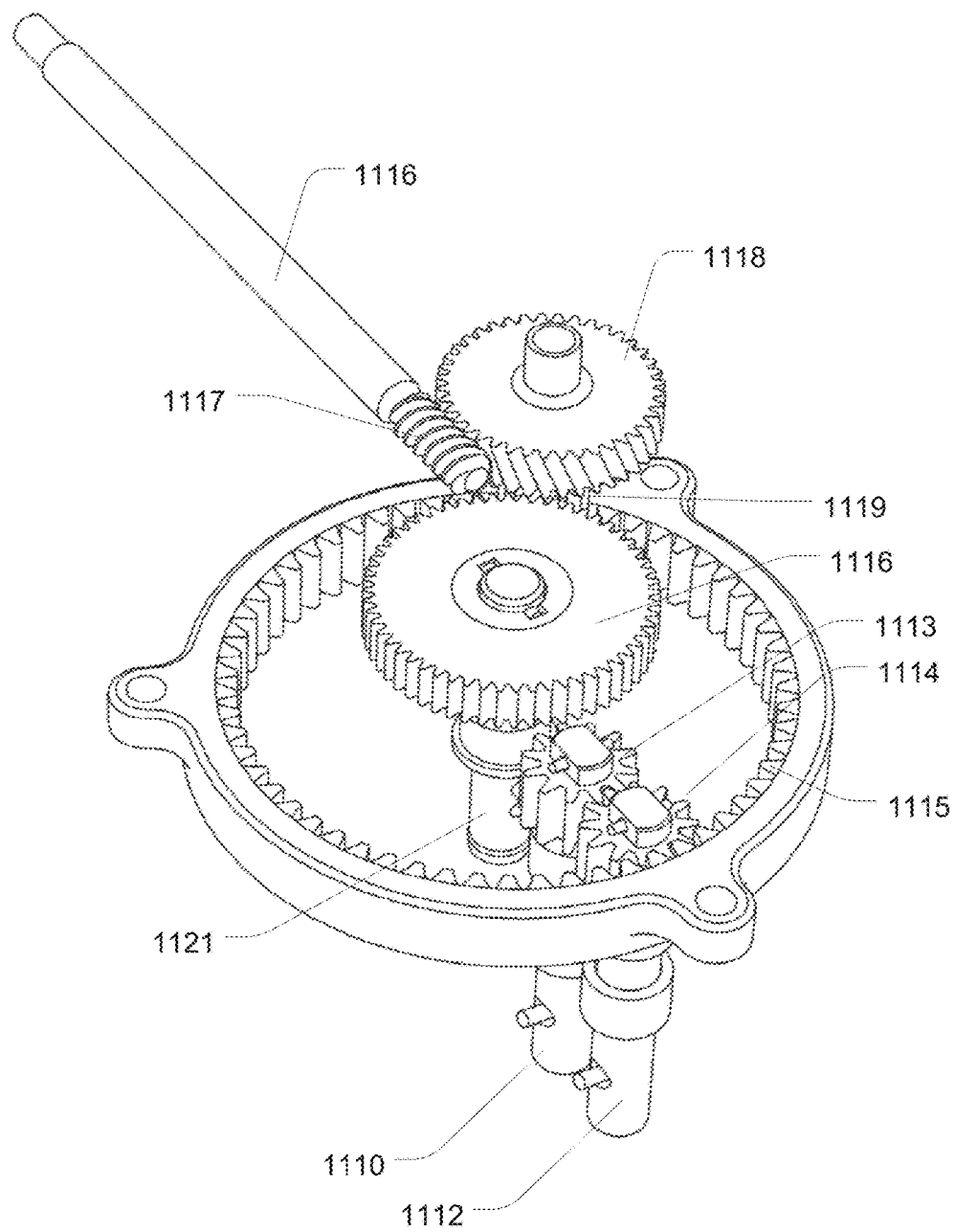
FIG. 43 is a perspective view of the internal gearing arrangement of the planetary head depicted in FIGS. 41 and 42.

As shown in FIGS. 41-43, a planetary type mixer can be provided with two separately rotating output spindles 1110, 1112. This provides the mixer with a capability to rotate two different attachments at the same time (each having a planetary action) or to rotate a single accessory in one of two different locations. With reference to the rotational centre line 1113 of the planetary head 1114, one output spindle 1112 can be seen as located radially outward of the other output spindle 1110. As suggested by FIGS. 42 and 43, each output spindle 1110, 1112 is carried by its own planet gear 1113, 1114. The two planet gears 1113, 1114 intermesh and are commonly driven by the connection between one the plant gears 1114 and the stationary orbit or ring gear 1115. As shown in FIGS. 42 and 43, a primary drive shaft 1116 terminates in a helical worm 1117 that cooperates with a worm gear 1118. The helical worm gear 1118 is carried on a vertical shaft that also carries a reduction gear 1119. The reduction gear 1119 drives a sun gear 1116 that is carried by a vertical shaft 1121 to which is attached the planetary head 1122. A journals or bearing 1123 supports the vertical shaft 1121 so that the planetary head 1122 moves in unison with the sun gear 1120. The rotating action of the planetary head 1122 thus drives both the output spindles 1110, 1112 owing to the intermeshing of the planet gear 1114 with the stationary orbital ring gear 1115. Each of the spindles 1110, 1112 is supported by journals or bearings 1124 carried within the head 1122.

By providing two rotating output spindles 1110, 1112 the device provides two distinct planetary orbits for its accessories, each orbit having a different maximum effective diameter of orbit. Thus, for example, two different bowl sizes can be easily accommodated.

Figure 44:
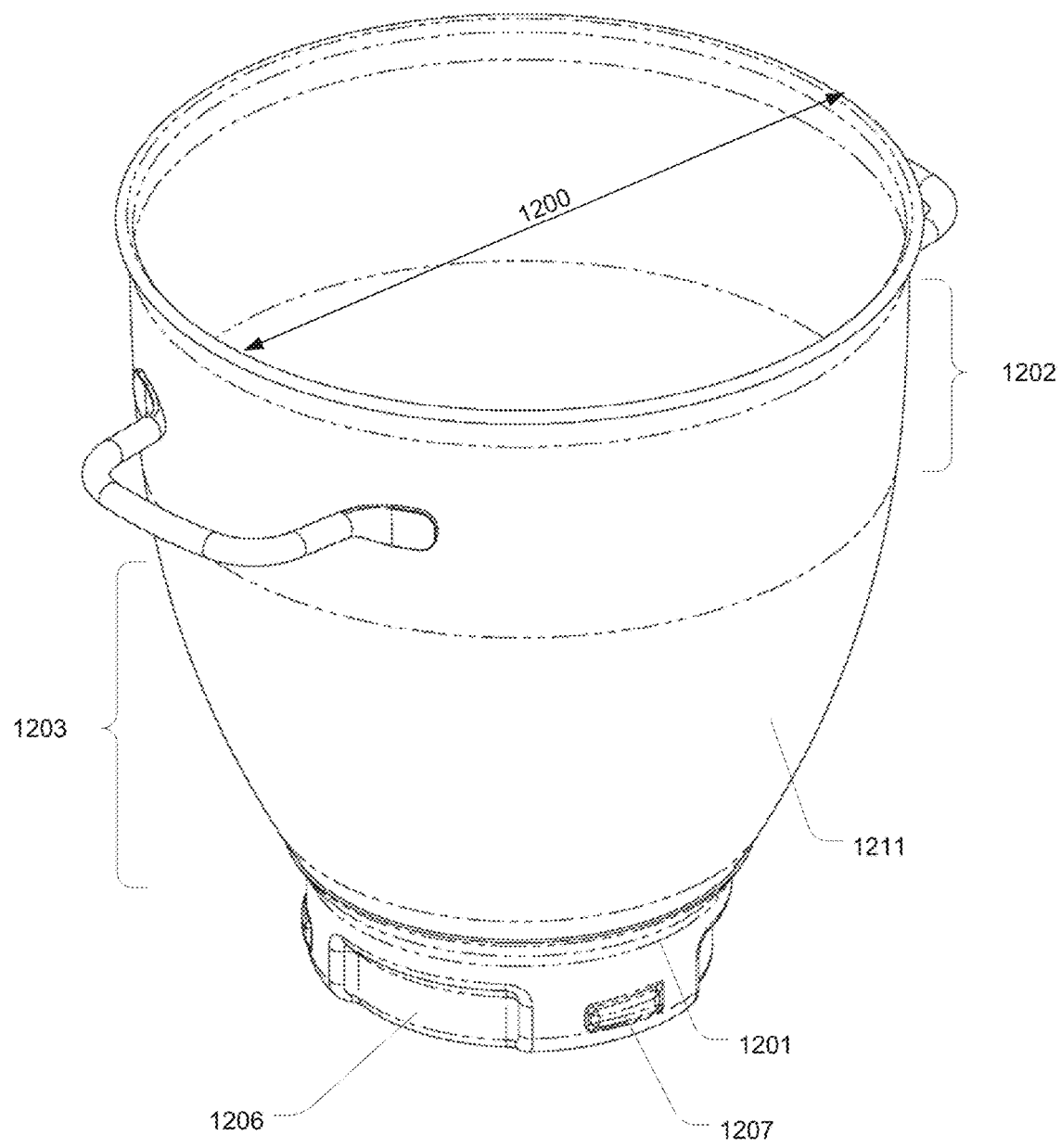
FIG. 44 is a perspective view of a mixing bowl.
Figure 45:
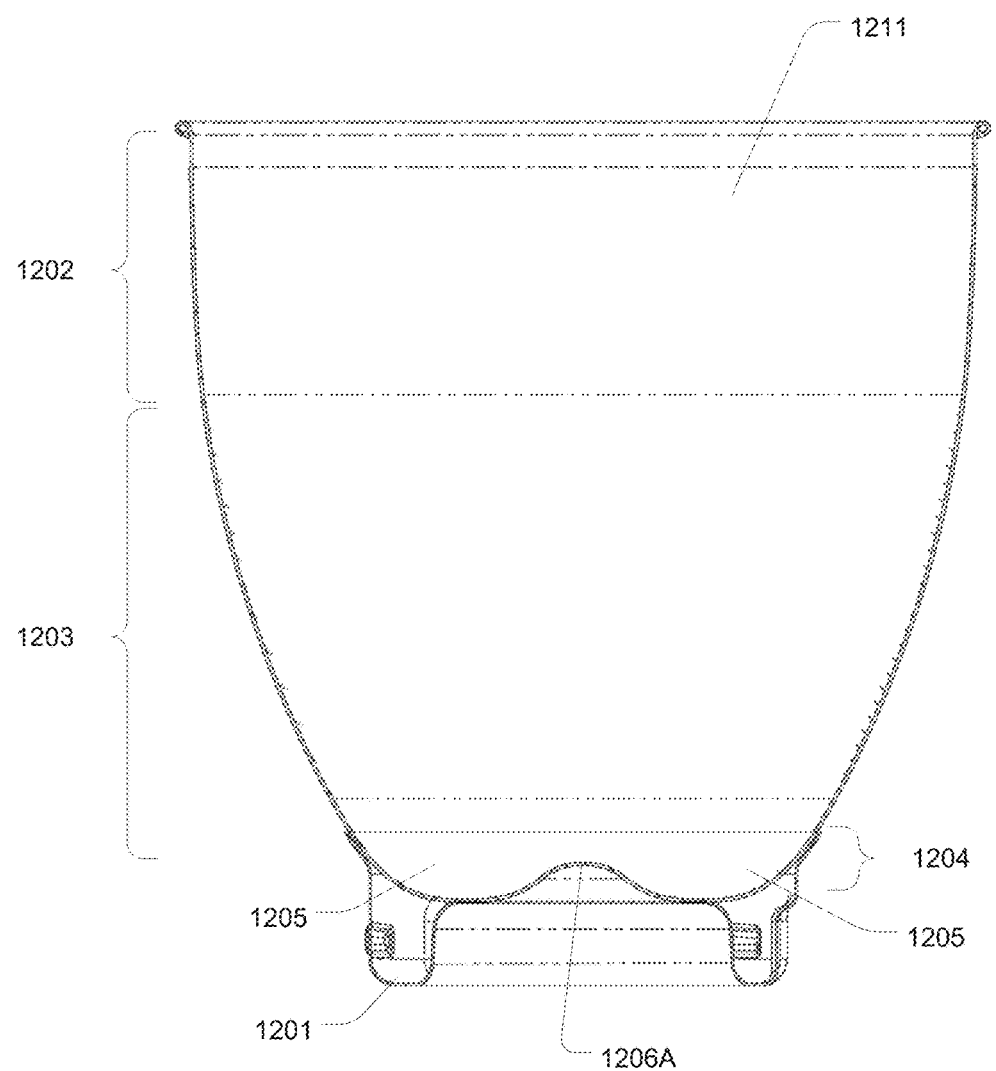
FIG. 45 is a cross sectional view of the bowl shown in FIG. 44.

A deep, narrow diameter bowl has been specifically developed for the whisking of egg whites, as shown in FIG. 44. Whereas a conventional mixing bowl for a planetary mixer will have overall maximum mouth diameter of 220 mm, the bowl of FIG. 44 has a maximum mouth diameter 1200 of 171 mm. Whereas a conventional mixing bowl has an overall height (including the base) of 178 mm, the overall height of the bowl depicted in FIG. 4 is 188 mm including the height of the base 1201. As suggested in FIGS. 44 and 45, an upper portion of the bowls profile is approximately vertical. The lower portion 1203 tapers, approximately parabolically and incorporates a lower most portion 1204 that incorporates a narrow torroidal trough 1205 having a central raised portion 1206A. The lower most portion 1204 is supported by and attached to the base 1201. As will be further explained, the base 1201 can be mounted into the base of the mixer in three distinct orientations. As such, the bowl in the example of FIGS. 44 and 45 has a base 1201 that incorporate three equidistant recesses 1206A and is provided with one or more protrusions 1207 that cooperate with female bayonet features in the base of the mixer.

Figure 46:
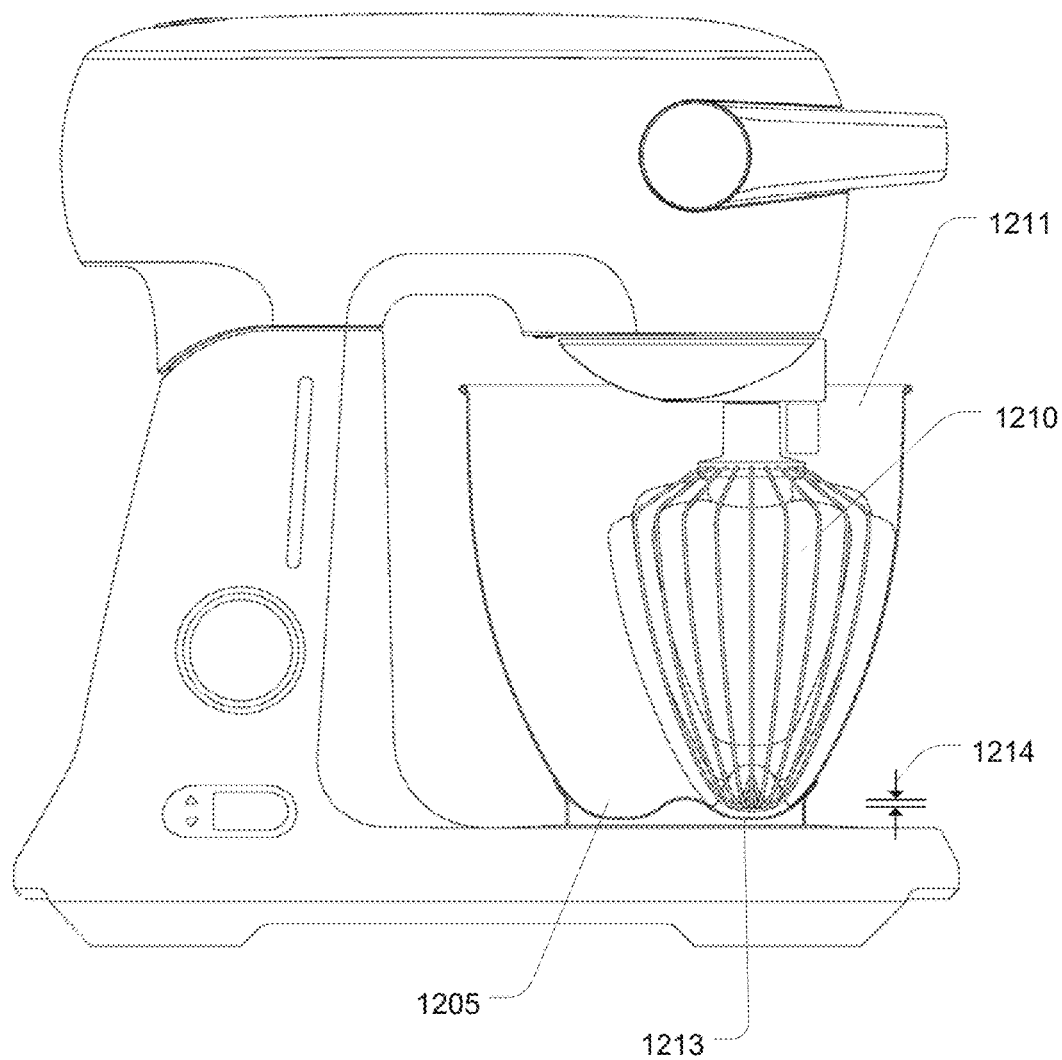
FIG. 46 is a side elevation of a planetary mixer, bowl (partially sectioned) and attachment.

As shown in FIG. 46, in order to promote better contact between a whisk attachment 1210 and a food ingredient such as egg white that may be at the bottom of the narrow bowl 1211, the conventional clearance between the lower most tip of the whisk 1210 and the lowest point 1213 of the trough 1205 is minimised. In this example, once assembled, the clearance 1214 is about 4 mm. In this example, the pitch circle or diameter represented by the lowest point 1213 of the trough 1205 is about 51.2 mm. This reduced diameter bowl is approximately 3-4 quarts. A standard bowl is approximately 5-6 quarts. A 3 quart bowl is particularly useful for the beating of eggs or the mixing of small volumes of ingredients.

Figure 47:
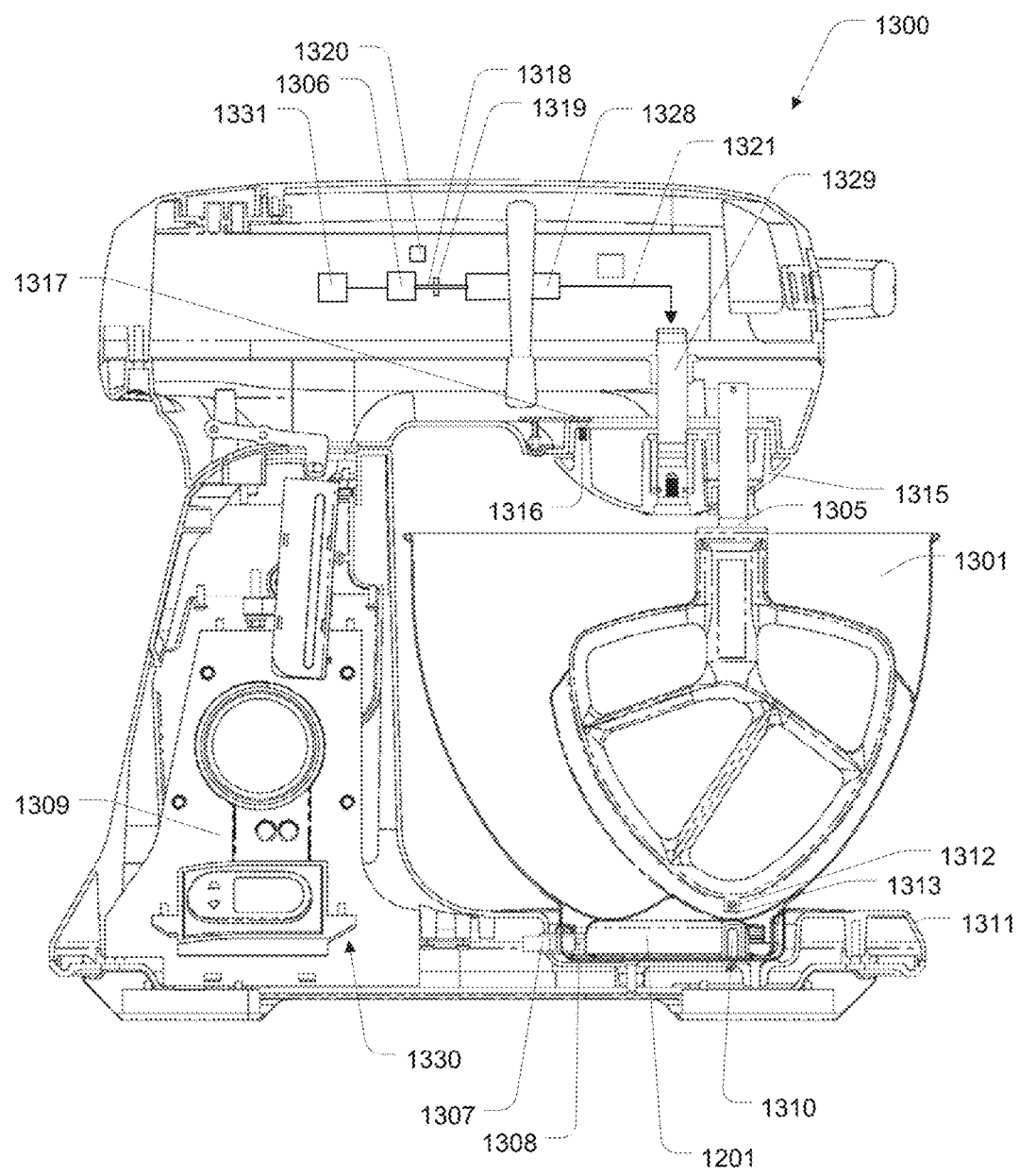
FIG. 47 is a cross sectional view of a planetary mixer and bowl.

As shown in FIG. 47, a planetary type bench mixer 1300 that is adapted to cooperate with bowls of different sizes 1301, 1302 can benefit by sensing which accessory 1303, 1304 is attached to the planetary head's output spindles or spindles 1305. This is primarily because the attempted use of a large diameter accessory 1303 has the potential to interfere with or create other difficulties when used in combination with a narrow diameter bowl 1302 for which it is not intended. In this example, the bench mixer 1300 is adapted to detect the type and therefore the size of the bowl and then compare the type of bowl detected to the type of accessory that is detected. If the bowl and the accessory are incompatible, the user will not be able to activate the mixer's drive motor 1306. As previously discussed and with reference to FIG. 44, a particular bowl such as a narrow diameter bowl has one or more recesses 1206A formed into the bowl's base 1201. The presence or absence of the recess 1206A can be detected by a mechanical sensor 1307 located adjacent to the opening 1308 that receives the bowl's base 1201. Preferably, the mechanical sensor 1307 is oriented radially and includes a micro switch that is either tripped, or not, depending on whether or not the bowl's base includes a recess 1206A. Other forms of sensors 1307 can be used to detect distinguishing characteristics of a bowl base. The information from the sensor 1307 is provided to the mixer's microprocessor control unit 1309. Thus, the MCU is provided with an indication of which bowl has been successfully inserted by a user. The MCU compares this information with the output of an attachment sensor 1310. The attachment sensor 1310 is located in the base 1311 of the mixer, within the confines of the receiving opening for the bowl 1308 and preferably close to the forward most point of the opening 1308. When the vertical or longitudinal access of an accessory 1303 is directly above the sensor 1310, this is referred to as both the 'start' and 'finish' orientation of the accessory 1303. In this orientation, an accessory 1303 can be introduced into and removed from the bowl 1301 while the accessory is still attached to the output spindle 1305. In this example, a scrapper blade 1303 has been provided with a magnet 1312 that is located on the longitudinal centre line of the attachment 1303 and adjacent to a lower most portion of the attachment 1313. When the magnet 1312 is above the sensor 1310 (such as a Hall sensor or reed switch) the sensor 1310 provides a signal or pulse to the MCU 1309. Thus, a signal or pulse generate by the sensor 1310 indicates that an accessory 1303 with a magnet 1312 is in position above the sensor 1310. The absence of a signal indicates to the MCU that either no accessory is present or that the accessory has no magnet 1312. In this example, the sensor is located directly below the lowest portion of the torroidal trough associated with the bowl 1301 that has been inserted into the receiving opening 1308.

In addition, FIG. 47 illustrates that the mixer 1300 can be provided with functionality to bring the accessory 1303 into the start or finish orientation automatically. In order to do this, the MCU 1309 must be able to detect the rotational orientation of the planetary head 1315. To do this, the planetary head is provided with a magnet 1316 and the body of the mixer 1300 is provided with a sensor 1317 that can detect the presence or proximity of the magnet 1316. Further, the mixer's primary motor 1306 has an output shaft 1318 on which is mounted a magnet ring 1319. A Hall effect sensor 1320 cooperates with the magnetic ring 1319 to send a signal to the MCU 1309 that is interpreted as a direct reading of the speed of the output shaft 1318. In preferred embodiments, the output shaft 1318 drives a reduction gearbox 1328 which forms part of the mechanical drive train 1321 that connects the motor 1306 to the main shaft 1329.

The cooperation between the motors 1306 shaft speed sensing apparatus 1319, 1320 and the position sensing apparatus 1316, 1317 allow the MCU 1309 to bring the attachment 1303 into the start or finish orientation automatically after the user switches the motor's power off. This is usually done with a switch externally mounted on the mixer's user interface 1330. After the stop button is pressed on the interface 1330, power to the motor is cut off. However, because of inertia of the motor and the drive train, the motor continues to rotate. The Hall effect sensor 1320 continues to provide motor shaft speed information to the MCU 1309. The MCU then looks for a signal from the head position sensor 1317. It uses the signal from the position sensor 1317 as an index to an initial position. The MCU will then perform a calculation based on the motor's output shaft speed as detected by the sensor 1320 to estimate how much time or how many rotations of the motor are required to bring the planetary head 1315 into the start or finish orientation, that is, with the attachments magnet 1312 directly above the attachment sensor 1310. If the motor speed is not fast enough (after the motor is switched off) for the head position magnet 1316 to reach the position sensor 1317, the MCU will calculate a time and appropriate speed for the motor to run so that the initial or index position of the head 1315 can be detected. In this particular example, the ratio of motor rotations to rotation's of the planetary head 1315 is about 64 to 1. The magnet ring on the motor shaft has four pairs of magnets. Accordingly, one turn of the motor shaft gives four pulses through the sensor 1320. Thus, 256 pulses indicate one full rotation of the planetary head 1315. Thus, having detected the index position via the sensor 1317, the MCU can control the motor predictably, so as to bring the accessory 1303 into the start or finish orientation. A look up table can be used MCU to correlate motor shaft speed with the rotational rate of the planetary head 1315. Thus the motor on time duration and power level depends on the motor shaft speed detected and the result of the data contained in the look up table or stored algorithm. In some embodiments, the motor speed controller 1331, under the control of the MCU 1309 can supply the motor with reverse power so as to brake the motor down to the required speed level, the extent and duration of the reverse power, supply to the motor by the controller 1331 is determined by the MCU's determination of shaft speed as provided by the sensor 1320. The provision of motor braking prevents excessive rotation of the planetary head 1315 after the motor's power has been switched off. In some embodiments, the indexing function provided by the sensor 1317 that detects the position of the planetary head 1315 can be replaced by the sensor 1310 that detects the presence of the magnet 1312 on the accessory 1303. The MCU uses the pulse provided by the attachment sensor 1310 for the index function that was previously described in reference to the head position sensor 1317.

Because the mixer can locate an accessory in a predetermined position once the user returns the speed dial to the 'off' position, it is possible to align the accessory so that it is able to be released from the bowl in a specific orientation.

Interpretation

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Relationships of parts describing male and female components, for example mechanical connections and bayonet connections and spindles or shafts with cooperating receiving openings or holes will be understood to be interchangeable unless indicated otherwise.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment, wirelessly or otherwise.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this to specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

What is claimed is:

1. A scraper whisk apparatus for a mixer appliance, the scraper whisk apparatus being releasably couplable to the mixer appliance, the apparatus comprising:
   a scraper element having one or more scraper arm portions, each scraper arm portion having a scraper blade portion;

a coupling assembly that is releasably couplable to the mixer appliance; and a whisk cage element having a plurality of wire whisk elements; a first flange element and a second flange element couples respective ends of the plurality of wire whisk elements, such that each of the plurality of wire whisk elements starts at the first flange element and terminates at the second flange element;

wherein the scraper element has the coupling assembly for releasably coupling to the mixer appliance, and is separately releasably coupled to the whisk cage element.

2. The apparatus of claim 1, wherein the scraper element comprises one or more a scraper arm portions, each scraper arm portions having a scraper blade portion.

3. The apparatus of claim 1, wherein the scraper element comprises at least two scraper arm portions, each scraper arm portions having a scraper blade portion.

4. The apparatus of claim 3, wherein a lower end of each of the at least two scraper arm portions are joined by a bridging portion.

5. The apparatus of claim 4, wherein the bridging portion is located above a lower junction of the whisk cage element, such that the bridging portion does not contact the wire whisk elements.

6. The apparatus of claim 2, wherein each scraper arm portions and scraper blade portion includes a substantially straight portion that is angled such that, in use with a mixture in a bowl, the top leads into the direction of rotation to direct mixture located on a bowl wall back down into the mixture.

7. The apparatus of claim 1, wherein a domed portion is located under the coupling assembly to promote viscous debris to runoff.

8. The apparatus of claim 1, the apparatus further including a central hub portion, wherein the coupling assembly is formed on the hub portion, and the scraper element comprising one or more a scraper arm portions that extend from the hub; and the whisk cage element being separately removably couplable to the hub portion.

9. The apparatus of claim 1, the apparatus further including a central hub portion, wherein the coupling assembly is formed on the hub portion, and the scraper element comprising one or more a scraper arm portions are integrally formed with the hub portion, the whisk cage element being separately removably couplable to the hub portion.

10. The apparatus of claim 9, wherein the hub further comprises a locking element for separately retaining the whisk cage element.

11. The apparatus of claim 10, wherein the locking element is in the form of a locking collar threadedly engaged about the hub; and the first flange element and the second flange element abut the hub, such that rotation of the collar about the hub cause the collar to ride over and retain the whisk cage element.

12. The apparatus according to claim 1, wherein a locking element is associated with the scraper element for retaining the whisk cage element.

13. The apparatus according to claim 12, wherein the locking element is threadedly engaged to the scraper element and can be rotated to retain the whisk cage element.

14. The apparatus according to claim 13, wherein the locking element is a collar located proximal to the coupling assembly.

15. The apparatus according to claim 14, wherein the first flange element and the second flange element are each arcuate and sized to fit about the coupling assembly.

16. The apparatus according to claim 15, wherein locking element is drawn down over the flange to retain the first flange element and the second flange element.

17. The apparatus according to claim 16, wherein a lower end of each of the at least two scraper arm portions are joined by a bridging portion.

18. The apparatus according to claim 17, wherein the bridging portion is located above a lower junction of the whisk cage element, such that the bridging portion does not contact the wire whisk elements.

19. The apparatus according to claim 11, wherein the first flange element opposes the second flange element.

20. The apparatus according to claim 19, wherein first flange element and the second flange element each have an 'L' shape cross section.

21. The apparatus according to claim 11, wherein the first flange element and the second flange element are each in the form of an 'L' shaped arcuate flange.

* * * * *